United States Patent
Dohring et al.

(10) Patent No.: US 11,380,211 B2
(45) Date of Patent: *Jul. 5, 2022

(54) PERSONALIZED MASTERY LEARNING PLATFORMS, SYSTEMS, MEDIA, AND METHODS

(71) Applicant: Age of Learning, Inc., Glendale, CA (US)

(72) Inventors: Doug C. Dohring, Glendale, CA (US); David A. Hendry, La Crescenta, CA (US); Sunil Gunderia, Calabasas, CA (US); Diana Hughes, Los Angeles, CA (US); Victoria E. Owen, Los Angeles, CA (US); Daniel E. Jacobs, Glendale, CA (US); Anastasia Betts, Fontana, CA (US); William Salak, Newbury Park, CA (US)

(73) Assignee: AGE OF LEARNING, INC., Glendale, CA (US)

( * ) Notice: Subject to any disclaimer, the term of this patent is extended or adjusted under 35 U.S.C. 154(b) by 312 days.

This patent is subject to a terminal disclaimer.

(21) Appl. No.: 16/575,319

(22) Filed: Sep. 18, 2019

(65) Prior Publication Data

US 2020/0098280 A1 Mar. 26, 2020

Related U.S. Application Data

(60) Provisional application No. 62/732,999, filed on Sep. 18, 2018.

(51) Int. Cl.
*G09B 5/06* (2006.01)
*G06Q 50/20* (2012.01)
*G09B 7/02* (2006.01)
*G09B 7/06* (2006.01)

(52) U.S. Cl.
CPC ............ *G09B 5/065* (2013.01); *G06Q 50/20* (2013.01); *G09B 7/02* (2013.01); *G09B 7/06* (2013.01)

(58) Field of Classification Search
None
See application file for complete search history.

(56) References Cited

U.S. PATENT DOCUMENTS

| 971,263 | A | 9/1910 | Eva |
| 6,484,010 | B1 | 11/2002 | Sheehan |
| 6,793,498 | B1 | 9/2004 | Nunes |

(Continued)

OTHER PUBLICATIONS

U.S. Appl. No. 15/462,573 Office Action dated Dec. 5, 2017.

(Continued)

*Primary Examiner* — Nathan Hillery
(74) *Attorney, Agent, or Firm* — Wilson Sonsini Goodrich & Rosati

(57) ABSTRACT

Disclosed herein are systems, media, methods, and platforms for providing personalized mastery learning utilizing: a knowledge map; a plurality of learning activities, each learning activity comprising dynamically variable scaffolding, feedback, and content; a learning activity selection module selecting one or more learning activities for the learner; and a learning activity modification module dynamically varying one or more of the scaffolding, feedback, and content of at least one selected learning activity based on performance of the learner.

29 Claims, 55 Drawing Sheets

(56) References Cited

U.S. PATENT DOCUMENTS

| | | |
|---|---|---|
| 8,380,121 B2 | 2/2013 | Bradford et al. |
| 8,600,926 B2 | 12/2013 | Flinn et al. |
| 8,672,686 B2 | 3/2014 | Ferreira |
| 8,719,213 B2 | 5/2014 | Flinn et al. |
| 8,750,782 B2 | 6/2014 | Scandura |
| 8,818,931 B2 | 8/2014 | Flinn et al. |
| 9,149,719 B2 | 10/2015 | Guan et al. |
| 9,165,259 B2 | 10/2015 | Flinn et al. |
| 9,171,262 B2 | 10/2015 | Flinn et al. |
| 2003/0232318 A1 | 12/2003 | Altenhofen et al. |
| 2006/0286519 A1 | 12/2006 | Burnham et al. |
| 2007/0099161 A1* | 5/2007 | Krebs ............ G09B 5/00 434/322 |
| 2007/0288513 A1* | 12/2007 | Jenkins ............ G06Q 50/20 |
| 2008/0050711 A1* | 2/2008 | Doswell ............ G09B 23/28 434/350 |
| 2008/0261191 A1 | 10/2008 | Woolf et al. |
| 2010/0003659 A1 | 1/2010 | Edmonds |
| 2010/0190142 A1 | 7/2010 | Gal et al. |
| 2011/0065082 A1* | 3/2011 | Gal ............ G09B 7/02 434/365 |
| 2011/0177480 A1 | 7/2011 | Menon et al. |
| 2012/0214147 A1 | 8/2012 | Ernst et al. |
| 2012/0244507 A1* | 9/2012 | Tu ............ G09B 7/00 434/362 |
| 2012/0254097 A1 | 10/2012 | Flinn et al. |
| 2013/0226845 A1* | 8/2013 | Gobert ............ G09B 5/02 706/12 |
| 2014/0120511 A1* | 5/2014 | Hall ............ G09B 5/14 434/350 |
| 2014/0220540 A1* | 8/2014 | Burgin ............ G09B 7/07 434/362 |
| 2014/0242565 A1* | 8/2014 | Abts ............ G09B 5/00 434/350 |
| 2014/0335497 A1 | 11/2014 | Gal et al. |
| 2014/0358842 A1 | 12/2014 | Flinn et al. |
| 2015/0147741 A1 | 5/2015 | Spagnola et al. |
| 2015/0170536 A1 | 6/2015 | Lan et al. |
| 2015/0206441 A1 | 7/2015 | Brown |
| 2016/0253912 A1* | 9/2016 | Heilman ............ G06F 3/1454 434/309 |
| 2017/0293845 A1* | 10/2017 | McAllister ............ H04L 47/10 |
| 2018/0268727 A1 | 9/2018 | Dohring et al. |
| 2019/0236967 A1 | 8/2019 | Dohring et al. |
| 2020/0043355 A1* | 2/2020 | Kwatra ............ G06Q 50/20 |

OTHER PUBLICATIONS

U.S. Appl. No. 15/462,573 Office Action dated Jun. 16, 2017.
U.S. Appl. No. 15/462,573 Office Action dated Mar. 22, 2019.
U.S. Appl. No. 15/462,573 Office Action dated Sep. 21, 2018.

* cited by examiner

FIG. 7F

Number Sequence Rules:

Number Sequences are always 5 numbers at a time. In every dataset besides 1 - 5, the first slot cannot be blank. For example, if the player is in dataset 1 - 5 they can see "_ 2 3 4 5". However, if the player is in dataset 6 - 10 they cannot see "_ 7 8 9 10." Instead, they will see "5 _ 7 8 9". There can never be two blanks directly next to each other in ALL datasets.

Learning Objective Type: Data
Node Algorithm: Mistakes

Answer Key Rules per Level:

*Instructional* - Uses PE and PH rules
*Practice Easy* - Matches the Number Sequence
*Practice Medium* - 3 numbers in dataset and scrambled
*Practice Hard* - 3 numbers in dataset and scrambled
*Boss* - 3 numbers in dataset and scrambled

Problems per Dataset

1 - 5

| Easy | Medium | Hard | Boss |
|---|---|---|---|
| 1 2 3 4 _ | 1 2 3 4 _ | 1 _ 3 _ 5 | 1 _ 3 _ 5 |
| 1 2 3 _ 5 | 1 2 3 _ 5 | 1 2 _ 4 _ | 1 2 _ 4 _ |
| 1 2 _ 4 5 | 1 2 _ 4 5 | 1 _ 2 3 _ | 1 _ 2 3 _ |
| 1 _ 3 4 5 | 1 _ 3 4 5 | _ 2 _ 4 5 | _ 2 _ 4 5 |
| _ 2 3 4 5 | _ 2 3 4 5 | _ 2 3 _ 5 | _ 2 3 _ 5 |

6 - 10

| Easy | Medium | Hard | Boss |
|---|---|---|---|
| 6 7 8 9 _ | 6 7 8 9 _ | 6 _ 8 _ 10 | 6 _ 8 _ 10 |
| 6 7 8 _ 10 | 6 7 8 _ 10 | 6 7 _ 9 _ | 6 7 _ 9 _ |
| 6 7 _ 9 10 | 6 7 _ 9 10 | 6 _ 8 9 _ | 6 _ 8 9 _ |
| 6 _ 8 9 10 | 6 _ 8 9 10 | 5 _ 7 _ 9 | 5 _ 7 _ 9 |
| 5 _ 7 8 9 | 5 _ 7 8 9 | 5 _ 7 8 _ | 5 _ 7 8 _ |

11 - 15

| Easy | Medium | Hard | Boss |
|---|---|---|---|
| 11 12 13 14 _ | 11 12 13 14 _ | 11 _ 13 _ 15 | 11 _ 13 _ 15 |
| 11 12 13 _ 15 | 11 12 13 _ 15 | 11 12 _ 14 _ | 11 12 _ 14 _ |
| 11 12 _ 14 15 | 11 12 _ 14 15 | 11 _ 12 13 _ | 11 _ 12 13 _ |
| 11 _ 13 14 15 | 11 _ 13 14 15 | 10 _ 12 _ 14 | 10 _ 12 _ 14 |
| 10 _ 12 13 14 | 10 _ 12 13 14 | 10 _ 12 13 _ | 10 _ 12 13 _ |

16 - 20

| Easy | Medium | Hard | Boss |
|---|---|---|---|
| 16 17 18 19 _ | 16 17 18 19 _ | 16 _ 18 _ 20 | 16 _ 18 _ 20 |
| 16 17 18 _ 20 | 16 17 18 _ 20 | 16 17 _ 19 _ | 16 17 _ 19 _ |
| 16 17 _ 19 20 | 16 17 _ 19 20 | 16 _ 18 19 _ | 16 _ 18 19 _ |
| 16 _ 18 19 20 | 16 _ 18 19 20 | 15 _ 17 _ 19 | 15 _ 17 _ 19 |
| 15 _ 17 18 19 | 15 _ 17 18 19 | 15 _ 17 18 _ | 15 _ 17 18 _ |

Adaptivity Thresholds

Instructional
Auto Pass

Easy
Pass: 3 out of 3
Stay: 2 out of 3
Fail: 0 or 1 out of 3

Medium
Pass: 3 out of 3
Stay: 2 out of 3
Fail: 0 or 1 out of 3

Hard
Pass: 3 out of 3
Stay: 2 out of 3
Fail: 0 or 1 out of 3

Boss
Pass: 4 out of 5
Stay: 3 out of 5
Fail: 0, 1, or 2 out of 5

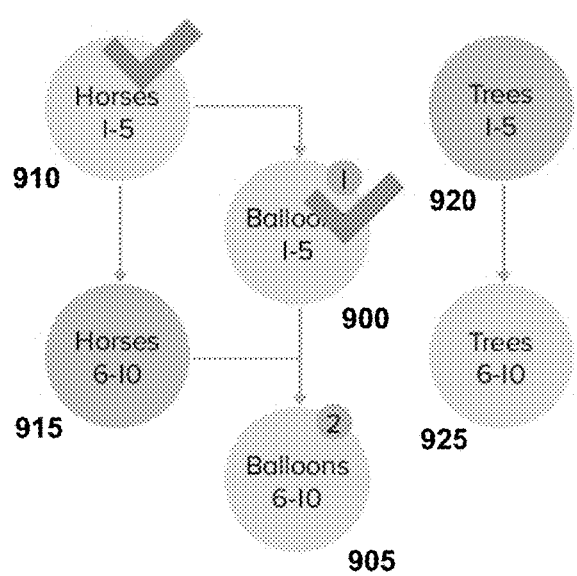
FIG. 15A
FIG. 15B

PERSONALIZED MASTERY LEARNING PLATFORMS, SYSTEMS, MEDIA, AND METHODS

CROSS-REFERENCE

This application claims priority to U.S. Provisional Application No. 62/732,999, filed Sep. 18, 2018, which is incorporated herein by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Adaptive learning is an educational method using computers to adapt the presentation of educational material according to individuals' learning needs, as indicated by their responses to questions, tasks, and experiences.

SUMMARY OF THE INVENTION

Despite the potential for online/mobile learning (e.g., e-learning) systems to utilize computing power to deliver effective adaptive learning, existing e-learning technologies do not adequately provide true mastery learning. By way of example, current systems do not base learning on a thoughtfully planned map of learning objectives for each subject at each level of learning that acknowledges the hierarchical and prerequisite relationships between objectives. By way of further example, current systems fail to include adequate or effective checks for learner understanding before allowing a learner to advance from one prerequisite concept to another to progress along a map of objectives. By only testing for surface results, the state of the art fails to discover and address deficiencies that may exist in a learner's more fundamental skill set that must come into play for each top-level learning objective. By way of still further example, current systems fail to provide learning activities that adequately adapt, in a dynamic way, to a learner's level of mastery. Specifically, learning activities that are not only selected based on a learners level of mastery, but also evolve in terms of scaffolding, feedback, and content to address each learner's immediate needs. Moreover, current graphic user interface technologies are inadequate in providing a seamless interface for the learner to interact with the content and provide appropriate scaffolding assistance accordingly (e.g., relocating, adjusting, adding, removing, transforming, modifying graphic user interface visual elements on the graphic user interface properly). Hence, a technological tool to address these concerns is appropriate.

Advantages offered by personalized learning mastery systems described herein include, for example, a foundational knowledge map describing each subject or topic at each level of learning, which represents learning objectives arranged hierarchically and so as to represent prerequisite relationships between learning objectives and associates one or more of the objectives with one or more interactive online or mobile learning activities (e.g., e-learning). Further advantages of the subject matter described herein include, inter alia, a plurality of learning activities, wherein activities are selected for each learner based on their individual level of mastery and their progression through each knowledge map. Importantly, as described herein, each learning activity includes dynamically variable scaffolding, feedback, and/or content that is configured to adapt to each learner's level of mastery as indicated by the learner's performance and, optionally, the preference of the learner.

In one aspect, disclosed herein are computer-implemented systems comprising: a digital processing device comprising: at least one processor, an operating system configured to perform executable instructions, a memory, and a computer program including instructions executable by the digital processing device to create a personalized mastery learning application comprising: a knowledge map describing a subject or topic at a level of learning or proficiency, the knowledge map comprising a plurality of nodes, each node representing at least one learning objective, wherein the nodes are arranged in the knowledge map hierarchically and so as to represent prerequisite relationships between learning objectives; a plurality of learning activities, each learning activity comprising dynamically variable scaffolding, feedback, and/or content; a data storage associating one or more of the nodes with one or more of the learning activities; a learning activity selection module identifying at least one current node on the map for a particular learner based on performance of the learner and using the at least one current node and the data storage to select one or more learning activities for the learner; and a learning activity modification module dynamically varying one or more of the scaffolding, feedback, and content of at least one selected learning activity based on performance of the learner. In some embodiments, the application comprises a plurality of knowledge maps. In some embodiments, the data storage is a prerequisite map. In further embodiments, each node of the knowledge map is associated in the prerequisite map with one or more learning activities. In some embodiments, each learning activity comprises interactive instructions. In some embodiments, the subject or topic is math, reading, science, social studies, art, music, language arts, foreign language, or a combination thereof. In some embodiments, the level of learning is pre-K. In other embodiments, the level of learning is a K-12 grade level. In some embodiments, the level of learning is a proficiency level, a fluency level, a competency level, a mastery level, or a combination thereof. In some embodiments, the learning activity selection module identifies the at least one current node as the node immediately subsequent to the highest node in a portion of the hierarchy for which the learner has demonstrated mastery. In some embodiments, the learning activity selection module identifies the at least one current node after completion of each learning activity. In other embodiments, the learning activity selection module identifies the at least one current node after each learner interaction with a learning activity. In yet other embodiments, the learning activity selection module continuously identifies the at least one current node. In some embodiments, each learning activity comprises a content type and wherein the learning activity selection module selects a content type for the learner. In further embodiments, the content type is directed to a learning objective associated with a concept, a principle, a skill, or data. In some embodiments, the learning activity selection module selects a plurality of learning activities for the learner and presents a choice of learning activities to the learner. In some embodiments, the learning activity modification module varies the one or more selected learning activities after each learner interaction with a learning activity. In other embodiments, the learning activity modification module continuously varies the one or more selected learning activities. In some embodiments, the application further comprises an offline mode, wherein in the offline mode performance data for the learner is cached and the learning activity selection module and the learning activity modification module access the cached performance data. In some embodiments, the learning activity selection module and the learning activity modification module access the performance data for the learner occasionally, when a network connection is available, or once, upon installation of the application, to enable an offline mode.

In another aspect, disclosed herein are non-transitory computer-readable storage media encoded with a computer program including instructions executable by a processor to create a personalized mastery learning application comprising: a knowledge map describing a subject or topic at a level of learning or proficiency, the knowledge map comprising a plurality of nodes, each node representing at least one learning objective, wherein the nodes are arranged in the knowledge map hierarchically and so as to represent prerequisite relationships between learning objectives; a plurality of learning activities, each learning activity comprising dynamically variable scaffolding, feedback, and/or content; a data storage associating one or more of the nodes with one or more of the learning activities; a learning activity selection module identifying at least one current node on the map for a particular learner based on performance of the learner and using the at least one current node and the data storage to select one or more learning activities for the learner; and a learning activity modification module dynamically varying one or more of the scaffolding, feedback, and content of at least one selected learning activity based on performance of the learner. In some embodiments, the application comprises a plurality of knowledge maps. In some embodiments, the data storage is a prerequisite map. In further embodiments, each node of the knowledge map is associated in the prerequisite map with one or more learning activities. In some embodiments, each learning activity comprises interactive instructions. In some embodiments, the subject or topic is math, reading, science, social studies, art, music, language arts, foreign language, or a combination thereof. In some embodiments, the level of learning is pre-K. In other embodiments, the level of learning is a K-12 grade level. In some embodiments, the level of learning is a proficiency level, a fluency level, a competency level, a mastery level, or a combination thereof. In some embodiments, the learning activity selection module identifies the at least one current node as the node immediately subsequent to the highest node in a portion of the hierarchy for which the learner has demonstrated mastery. In some embodiments, the learning activity selection module identifies the at least one current node after completion of each learning activity. In other embodiments, the learning activity selection module identifies the at least one current node after each learner interaction with a learning activity. In yet other embodiments, the learning activity selection module continuously identifies the at least one current node. In some embodiments, each learning activity comprises a content type and wherein the learning activity selection module selects a content type for the learner. In further embodiments, the content type is directed to a learning objective associated with a concept, a principle, a skill, or data. In some embodiments, the learning activity selection module selects a plurality of learning activities for the learner and presents a choice of learning activities to the learner. In some embodiments, the learning activity modification module varies the one or more selected learning activities after each learner interaction with a learning activity. In other embodiments, the learning activity modification module continuously varies the one or more selected learning activities. In some embodiments, the application further comprises an offline mode, wherein in the offline mode performance data for the learner is cached and the learning activity selection module and the learning activity modification module access the cached performance data. In some embodiments, the learning activity selection module and the learning activity modification module access the performance data for the learner occasionally, when a network connection is available, or once, upon installation of the application, to enable an offline mode.

In another aspect, disclosed herein are computer-implemented methods for personalized mastery learning comprising: providing, in a computer storage, a knowledge map describing a subject or topic at a level of learning or proficiency, the knowledge map comprising a plurality of nodes, each node representing at least one learning objective, wherein the nodes are arranged in the map hierarchically and so as to represent prerequisite relationships between learning objectives; providing, in the computer storage, a plurality of learning activities, each learning activity comprising dynamically variable scaffolding, feedback, and/or content; maintaining, in the computer storage, a database associating one or more of the nodes with one or more of the learning activities; identifying, by a computer, at least one current node on the map for a particular learner based on performance of the learner and using the at least one current node and the data storage to select one or more learning activities for the learner; and dynamically varying, by the computer, one or more of the scaffolding, feedback, and content of at least one selected learning activity based on performance of the learner. In some embodiments, the method comprises providing a plurality of knowledge maps. In some embodiments, the database is a prerequisite map. In further embodiments, each node of the knowledge map is associated in the prerequisite map with one or more learning activities. In some embodiments, each learning activity comprises interactive instructions. In some embodiments, the subject or topic is math, reading, science, social studies, art, music, language arts, foreign language, or a combination thereof. In some embodiments, the level of learning is pre-K. In other embodiments, the level of learning is a K-12 grade level. In some embodiments, the level of learning is a proficiency level, a fluency level, a competency level, a mastery level, or a combination thereof. In some embodiments, identifying the at least one current node comprises identifying the node immediately subsequent to the highest node in a portion of the hierarchy for which the learner has demonstrated mastery. In some embodiments, identifying the at least one current node is performed after completion of each learning activity. In other embodiments, identifying the at least one current node is performed after each learner interaction with a learning activity. In yet other embodiments, identifying the at least one current node is performed continuously. In some embodiments, each learning activity comprises a content type and wherein the method further comprises selecting a content type for the learner. In further embodiments, the content type is directed to a learning objective associated with a concept, a principle, a skill, or data. In some embodiments, a plurality of learning activities are selected for the learner and a choice of learning activities is presented to the learner. In some embodiments, varying the one or more selected learning activities is performed after each learner interaction with a learning activity. In other embodiments, varying the one or more selected learning activities is performed continuously. In some embodiments, the method is implemented in an offline environment, wherein in the offline environment performance data for the learner is stored locally and the identification of the at least one current node and the dynamic variation of the learning activity is based on the locally stored performance data. In some embodiments, the performance data for the learner is accessed occasionally, when a network connection is available, or once, upon installation of the application, to enable implementation of the method in an offline mode.

In another aspect, disclosed herein are personalized mastery learning platforms comprising: a server-side learning activity selection application comprising: a knowledge map describing a subject or topic at a level of learning or proficiency, the knowledge map comprising a plurality of nodes, each node representing at least one learning objective, wherein the nodes are arranged in the map hierarchically and so as to represent prerequisite relationships between learning objectives; a plurality of learning activities, each learning activity comprising dynamically variable scaffolding, feedback, and/or content; a data storage associating one or more of the nodes with one or more of the learning activities; and instructions, which when executed by one or more processors, causes the one or more processors to perform: identifying at least one current node on the map for a particular learner based on performance of the learner and using the at least one current node and the data storage to select one or more selected learning activities for the learner; a client-side learning activity modification application comprising instructions, which when executed by one or more processors, causes the one or more processors to perform: dynamically varying one or more of the scaffolding, feedback, and content of the one or more selected learning activities based on performance of the learner. In some embodiments, the server-side learning activity selection application is hosted on a server, on a plurality of servers, or on a cloud computing platform or service. In some embodiments, the client-side learning activity modification application is a component of a learner web application or a learner mobile application. In some embodiments, the data storage is a prerequisite map. In further embodiments, each node of the knowledge map is associated in the prerequisite map with one or more learning activities. In some embodiments, the server-side learning activity selection application comprises a plurality of knowledge maps. In some embodiments, each learning activity comprises interactive instructions. In some embodiments, the subject or topic is math, reading, science, social studies, art, music, language arts, foreign language, or a combination thereof. In some embodiments, the level of learning is pre-K. In other embodiments, the level of learning is a K-12 grade level. In some embodiments, the level of learning is a proficiency level, a fluency level, a competency level, a mastery level, or a combination thereof. In some embodiments, the learning activity selection application identifies the at least one current node as the node immediately subsequent to the highest node in a portion of the hierarchy for which the learner has demonstrated mastery. In some embodiments, the learning activity selection application identifies the at least one current node after completion of each learning activity. In other embodiments, the learning activity selection application identifies the at least one current node after each learner interaction with a learning activity. In yet other embodiments, the learning activity selection application continuously identifies the at least one current node. In some embodiments, each learning activity comprises a content type and wherein the learning activity selection module selects a content type for the learner. In further embodiments, the content type is directed to a learning objective associated with a concept, a principle, a skill, or data. In some embodiments, a plurality of learning activities are selected for the learner and a choice of learning activities is presented to the learner. In some embodiments, the learning activity modification module varies the one or more selected learning activities after each learner interaction with a learning activity. In other embodiments, the learning activity modification module continuously varies the one or more selected learning activities. In some embodiments, the application further comprises an offline mode, wherein in the offline mode performance data for the learner is cached and the learning activity selection module and the learning activity modification module access the cached performance data. In some embodiments, the learning activity selection module and the learning activity modification module access the performance data for the learner occasionally, when a network connection is available, or once, upon installation of the application, to enable an offline mode.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 7F shows a non-limiting example of back end game design parameters for a learning activity; in this case, back end game design parameters for the learning activity of FIGS. 7A-7E.

FIGS. 9A-21B show a non-limiting exemplary user experience with an adaptive learning system; in this case, a user experience illustrating a student's progress through an exemplary prerequisite map for the subject of number sense, specifically for the numbers 1-10, at the Pre-K level;

FIG. 31 shows a non-limiting summary of a learning activity; in this case, a game summary of composition up to 20;

FIG. 33 shows a non-limiting summary of a learning activity; in this case, a game summary of counting forward and backward in a row on a hundred chart;

DETAILED DESCRIPTION OF THE INVENTION

Figure 1:
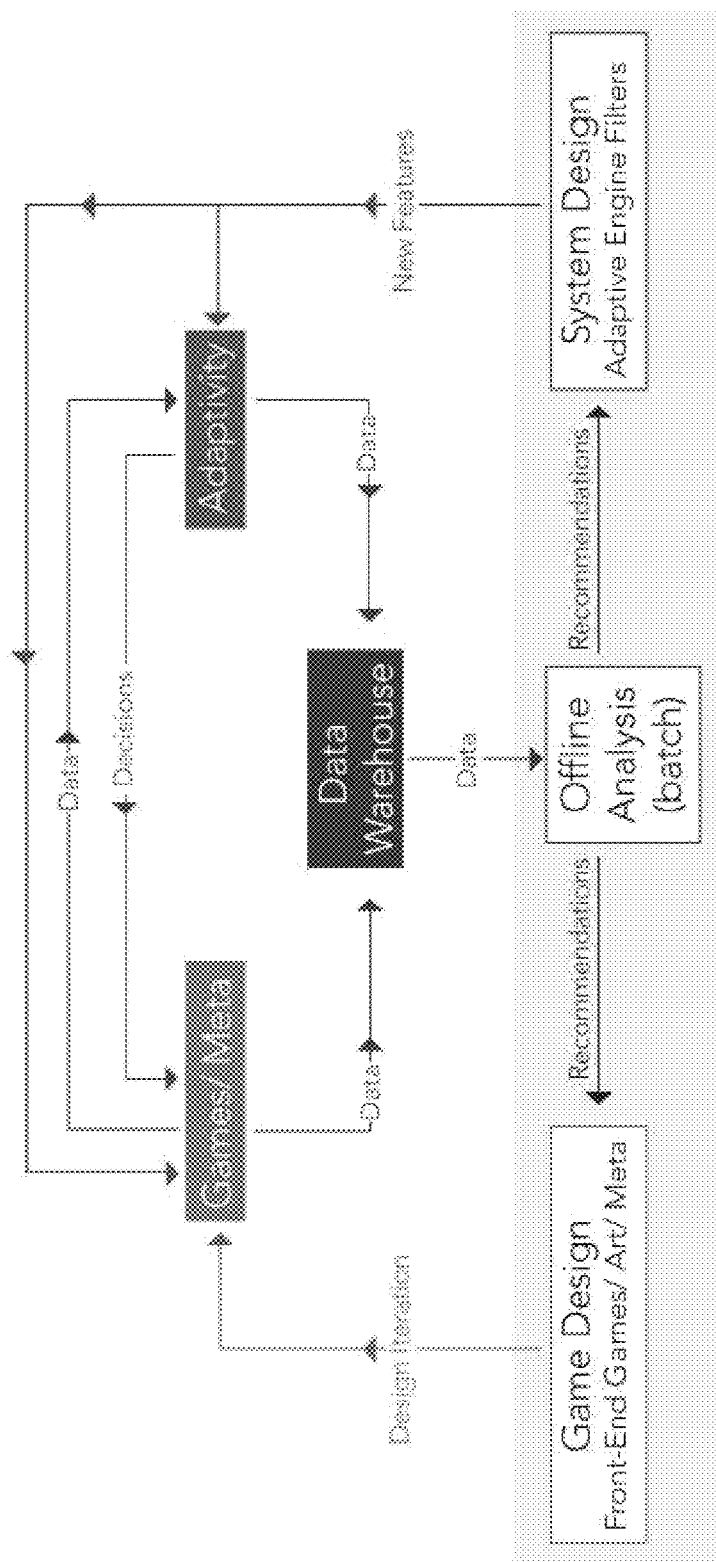
FIG. 1 shows a non-limiting example of a flow diagram; in this case, a diagram illustrating an analytics engine for an adaptive learning system described herein and describing the flow of data.

Described herein, in certain embodiments, are computer-implemented systems comprising: a digital processing device comprising: at least one processor, an operating system configured to perform executable instructions, a memory, and a computer program including instructions executable by the digital processing device to create a personalized mastery learning application comprising: a knowledge map describing a subject or topic at a level of learning, the knowledge map comprising a plurality of nodes, each node representing at least one learning objective, wherein the nodes are arranged in the knowledge map hierarchically so as to represent prerequisite relationships between learning objectives; a plurality of learning activities, each learning activity comprising dynamically variable scaffolding, feedback, and content; a data storage associating one or more of the nodes with one or more of the learning activities; a learning activity selection module identifying at least one current node on the map for a particular learner based on performance of the learner and using the at least one current node and the data storage to select one or more learning activities for the learner; and a learning activity modification module dynamically varying one or more of the scaffolding, feedback, and content of at least one selected learning activity based on performance of the learner.

Also described herein, in certain embodiments, are non-transitory computer-readable storage media encoded with a computer program including instructions executable by a processor to create a personalized mastery learning application comprising: a knowledge map describing a subject or topic at a level of learning, the knowledge map comprising a plurality of nodes, each node representing at least one learning objective, wherein the nodes are arranged in the knowledge map hierarchically so as to represent prerequisite relationships between learning objectives; a plurality of learning activities, each learning activity comprising dynamically variable scaffolding, feedback, and content; a data storage associating one or more of the nodes with one or more of the learning activities; a learning activity selection module identifying at least one current node on the map for a particular learner based on performance of the learner and using the at least one current node and the data storage to select one or more learning activities for the learner; and a learning activity modification module dynamically varying one or more of the scaffolding, feedback, and content of at least one selected learning activity based on performance of the learner.

Also described herein, in certain embodiments, are computer-implemented methods for personalized mastery learning comprising: providing, in a computer storage, a knowledge map describing a subject or topic at a level of learning, the knowledge map comprising a plurality of nodes, each node representing at least one learning objective, wherein the nodes are arranged in the map hierarchically so as to represent prerequisite relationships between learning objectives; providing, in the computer storage, a plurality of learning activities, each learning activity comprising dynamically variable scaffolding, feedback, and content; maintaining, in the computer storage, a database associating one or more of the nodes with one or more of the learning activities; identifying, by a computer, at least one current node on the map for a particular learner based on performance of the learner and using the at least one current node and the data storage to select one or more learning activities for the learner; and dynamically varying, by the computer, one or more of the scaffolding, feedback, and content of at least one selected learning activity based on performance of the learner.

Also described herein, in certain embodiments, are personalized mastery learning platforms comprising: a server-side learning activity selection application comprising: a knowledge map describing a subject or topic at a level of learning, the knowledge map comprising a plurality of nodes, each node representing at least one learning objective, wherein the nodes are arranged in the map hierarchically so as to represent prerequisite relationships between learning objectives; a plurality of learning activities, each learning activity comprising dynamically variable scaffolding, feedback, and content; a data storage associating one or more of the nodes with one or more of the learning activities; and instructions, which when executed by one or more processors, causes the one or more processors to perform: identifying at least one current node on the map for a particular learner based on performance of the learner and using the at least one current node and the data storage to select one or more selected learning activities for the learner; a client-side learning activity modification application comprising instructions, which when executed by one or more processors, causes the one or more processors to perform: dynamically varying one or more of the scaffolding, feedback, and content of the one or more selected learning activities based on performance of the learner.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, "mastery" refers to a high degree of proficiency, demonstrated consistently over time that transfers and does not decay. The meaning of "mastery learning," in some cases, includes the educational principle that mastery in prerequisite knowledge should be achieved before moving forward to learn subsequent information.

As used herein, "knowledge map" refers to a visual representation of the hierarchical and sequential relationships of granular learning objectives for a subject, or a subset of a subject. In addition to showing the learning objectives, it indicates prerequisite relationships between said objectives. In some cases, a knowledge map is used to plan needed content for the personalized mastery learning system described herein, as well as to inform a related prerequisite map.

As used herein, "prerequisite map" refers to a map, related to a knowledge map, comprising nodes, wherein each node corresponds to a learning objective from a related knowledge map, and contains activities that address said learning objective. In some cases, nodes also have data sets associated with them. In some cases, a prerequisite map described herein is built into the adaptive engine's logic, and is used to determine what activities a learner should see next. In some cases, nodes are optionally associated with learning objective types; the system uses this information to determine which adaptive algorithms to apply.

As used herein, "node," on a prerequisite map, refers to collection of associated data including a learning objective from a knowledge map and a plurality of activities of increasing difficulty that address said learning objective. Some difficulty levels, in some cases, have more than one option for activities to present to the learner. In some case, nodes also have internal logic for how a learner can progress through their content, before proceeding to the next node. In some cases, one or more nodes are optionally keynodes that have priority over other nodes in a map. In some cases, where a plurality of keynodes are present, the keynodes optionally have the same priority. In some cases, where a plurality of keynodes are present, the keynodes optionally have ranked priority (e.g., priority 1>priority 2>priority 3, etc.).

As used herein, "scaffolding" refers to modifying the underlying parameters of the learning activity itself until the learner achieves mastery. In some embodiments, scaffolding is distinguishable from merely providing a generic hint to a task, removing incorrect answers, automatically providing the right answer, utilizing a simplistic binary push/pull mechanism, or providing voiceover translations. In some embodiments, the deficiencies in such approaches is that the learner is merely nudged towards the correct answer rather than actually equipping the learner with deep, fundamental skills and understanding required to develop mastery of the particular subject, topic, or level of learning. In contrast, in some embodiments, scaffolding as described in the instant application modifies the learning task itself (i.e., the scaffolding is organically and/or seamlessly integrated within the learning activity itself rather than providing hints, removing incorrect answers, automatically providing the right answer, etc. in a separate window or pane from the learning activity) to accommodate the learner's skill level while providing an improved graphic user interface experience for the learner. In some embodiments, the scaffold modification takes place based on real-time learner interaction. In some embodiments, instructional scaffolding or support given during the learning process which is tailored to the needs of the learner with the intention of helping the student achieve one or more learning objectives. These supports may include, by way of examples, granted access to resources, modeling a task, giving advice, providing encouragement, coaching, templates, and/or guides, or any combination thereof. These supports are, in some cases, gradually modified or removed as students develop mastery.

Adaptive Learning

In some embodiments, the platforms, systems, media, and methods described herein include adaptive learning technologies, or use of the same. The learning experience provided adapts to the learner in multiple ways simultaneously. By way of example, the knowledge map is selected or determined, at least in part, based on performance of the learner and their individual level of mastery demonstrated. By way of further example, the learning content is selected or determined, at least in part, based on performance of the learner and their individual level of mastery demonstrated. In some cases, the content adapts via changes in type, difficulty, and/or quantity, as well as by media used to present the content. By way of still further example, the scaffolding provided is selected or determined, at least in part, based on performance of the learner and their individual level of mastery demonstrated. In some cases, the scaffolding adapts via changes in type, frequency, detail, and/or degree as well as by media used to convey the scaffolding (e.g., text, graphics, animations, videos, sound effects, music, and/or voice overs, etc.). By way of yet further example, the feedback provided is selected or determined, at least in part, based on performance of the learner and their individual level of mastery demonstrated. In some cases, the feedback adapts via changes in type, frequency, detail, and/or degree as well as by media used to convey the feedback (e.g., text, graphics, animations, videos, sound effects, music, and/or voice overs, etc.).

Tracking learner performance and building a database of learner data are keys to determining an individual learner's level of mastery, the learner's current node(s) on a prerequisite map, and determining what type of adaptations, and what degree of adaptation, would be most effective for a particular learner at any given moment.

Many types of learner data are suitable for making these determinations. By way of non-limiting examples, suitable learner data includes, specific learning activities completed, successful interactions with learning activities (e.g., tasks completed successfully, questions answered successfully, assessments completed successfully, etc.), number of learning activities completed, types of learning activities completed, and the like. By way of further non-limiting examples, suitable learner data includes, specific learning activities undertaken unsuccessfully, unsuccessful interactions with learning activities (e.g., tasks undertaken unsuccessfully, questions answered unsuccessfully, assessments undertaken unsuccessfully, etc.), number of learning activities undertaken unsuccessfully, types of learning activities undertaken unsuccessfully, and the like. By way of still further non-limiting examples, suitable learner data includes, learning activities abandoned, incomplete interactions with learning activities, number of learning activities abandoned, types of learning activities abandoned, and the like. In some embodiments, suitable learner data includes learner preferences, mentor (e.g., teacher, parent, etc.) preferences, and the like.

Referring to FIG. 1, in a particular embodiment, an analytics engine underlays the adaptive learning technologies described herein. In this embodiment, a data warehouse fuels an offline batch analysis module, which in turn informs both game design (including games, art, and associated metadata) and system design (including adaptive engine filters). Further, in this embodiment, data generated by game play is utilized by the adaptivity features and the decisions of the adaptation engine are utilized by the games.

Figure 2:
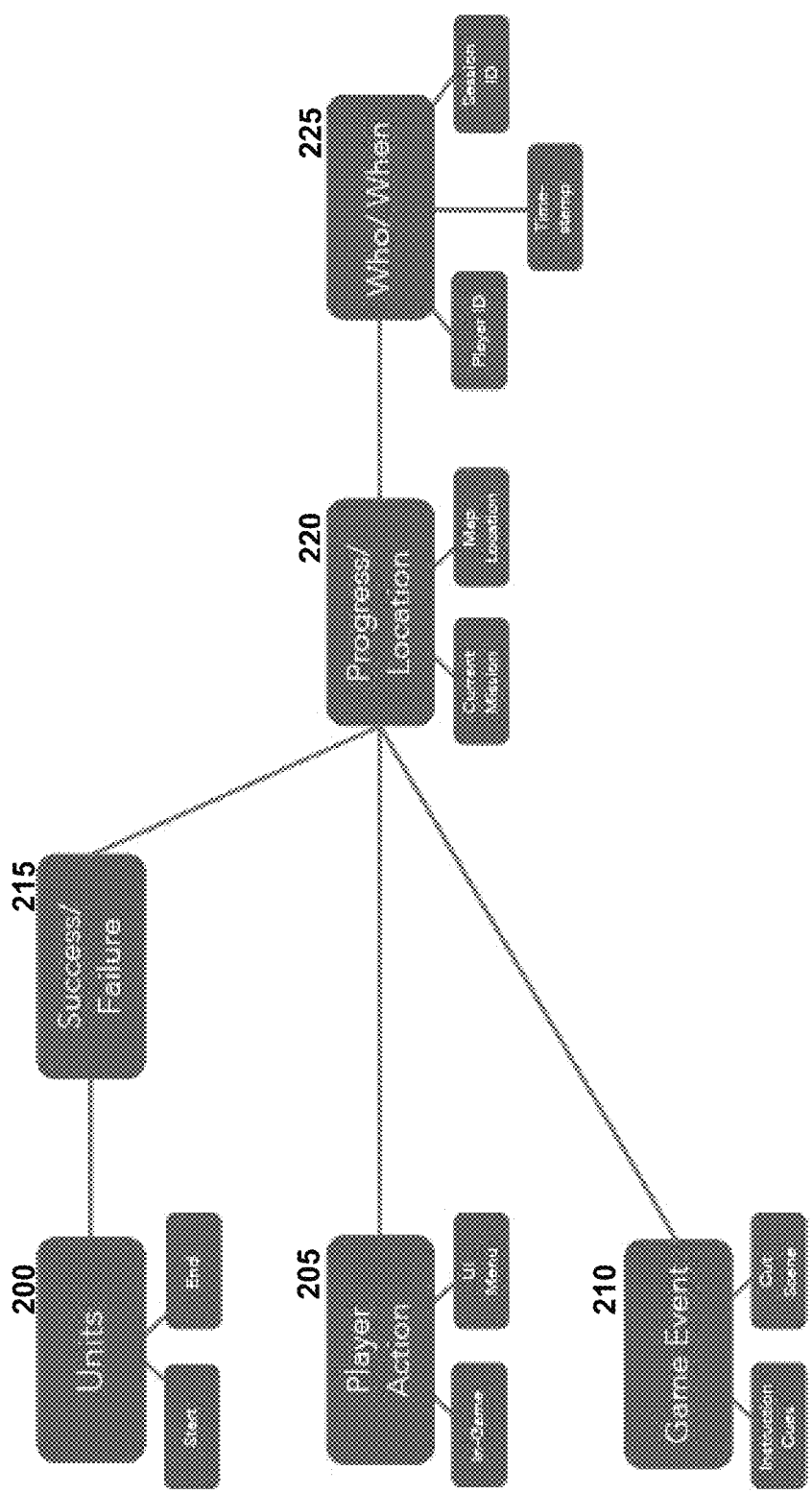
FIG. 2 shows a non-limiting example of a flow diagram; in this case, a diagram illustrating a framework for the relationships between data utilized in an adaptive learning system described herein.

Referring to FIG. 2, in a particular embodiment, a data framework is utilized to generate learner data for a data warehouse. In this embodiment, progress through learning units 200, learner actions 205, and game events 210 are all tracked to determine location 220 for a particular learner 225 in the current knowledge map. Further, in this embodiment, the identity of the learner 225 is tracked via player ID, date/time stamps on events, and session ID. With regard to progress through learning units 200, the start and the end of each unit is optionally stored as well as the learner's success or failure in each unit 215. With regard to learner actions 205, one or more of in-game actions and UI menu interactions are optionally tracked. Finally, with regard to game events 210 one or more of instruction cues and cut scenes are optionally utilized.

Knowledge Map

In some embodiments, the platforms, systems, media, and methods described herein include one or more knowledge maps, or use of the same. In some embodiments, a knowledge map comprises a plurality of nodes. In further embodiments, a node in a knowledge map represents at least one learning objective within the topic or subject. Knowledge maps, in some cases, are simple and comprise a limited number of nodes. In other cases, knowledge maps are complex and comprise a large number of nodes. In various embodiments, a knowledge map suitably comprises 2, 3, 4, 5, 6, 7, 8, 9, 10, 11, 12, 13, 14, 15, 16, 17, 18, 19, 20, 21, 22, 23, 24, 25, or more nodes. In other various embodiments, a knowledge map suitably comprises about 5, 10, 20, 30, 40, 50, 60, 70, 80, 90, 100, or more nodes, including increments therein. In yet other various embodiments, a knowledge map suitably comprises about 25, 50, 75, 100, 125, 150, 175, 200, 225, 250, 275, 300, 325, 350, 375, 400, 425, 450, 475, 500, or more nodes, including increments therein. In yet other various embodiments, a knowledge map suitably comprises about 100, 200, 300, 400, 500, 600, 700, 800, 900, 1000, or more nodes, including increments therein.

In some embodiments, a knowledge map is directed to a topic. In other embodiments, a knowledge map is directed to a subject. In further embodiments, a knowledge map is directed to a particular level of learning for a subject. Many subjects are suitable and include, by way of non-limiting examples, math, reading, science, social studies, art, music, language arts, foreign language, and combinations thereof. Similarly, many levels of learning are suitable and include, by way of non-limiting examples, a pre-K, level, a Kindergarten level, a first grade level, a second grade level, a third grade level, a fourth grade level, a fifth grade level, a sixth grade level, a seventh grade level, an eighth grade level, a ninth grade level, a tenth grade level, an eleventh grade level, a twelfth grade level, and the like, including intermediate levels between. In other embodiments, a level of learning is not linked to a school grade level, but instead is a proficiency level, a fluency level, a competency level, a mastery level, or a combination thereof. In some embodiments, the knowledge map comprises topics, subjects, or levels of learning for a subject that must be completed before the learner may proceed to the next portion of the knowledge map. In some embodiments, the knowledge map does not comprise a plurality of learning objects connected via a plurality of learning vectors. In some embodiments, the knowledge map does not rely on learning vectors or rely on tracking learning vectors' magnitude (whether such magnitude is constant or not constant or whether any such magnitude of the learning vector corresponds to the length of time required to complete a learning vector). In contrast, in some embodiments, the knowledge map is immutable (e.g., depicting a fixed ordering of topics, subjects, or levels of learning interconnected via nodes that must be completed before moving onto the next topic, subject, or level of learning). In other embodiments, additional nodes representing additional subjects, topics, or levels of learning may be appended at the beginning, end, or throughout the knowledge map. In some embodiments, an original prerequisite and sequential relationship between a plurality of nodes may be updated and edited based on feedback from multiple learner performance.

In some embodiments, a node in a knowledge map represents one learning objective within the topic or subject. In other embodiments, a node in a knowledge map represents 2, 3, 4, 5, 6, 7, 8, 9, 10, or more learning objectives within the topic or subject. In yet other embodiments, a node in a knowledge map represents 5, 10, 15, 20, 25, 30, 35, 40, 45, 50, 55, 60, 65, 70, 75, 80, 85, 90, 95, 100, or more learning objectives within the topic or subject, including increments therein. In some embodiments, the systems, media, methods, platforms, and applications described herein comprise one knowledge map. In other embodiments, the systems, media, methods, platforms, and applications described herein comprise a plurality of knowledge maps. In further embodiments, the systems, media, methods, platforms, and applications described herein comprise 2, 3, 4, 5, 6, 7, 8, 9, 10, or more of knowledge maps. In still further embodiments, the systems, media, methods, platforms, and applications described herein comprise about 5, 10, 15, 20, 25, 30, 35, 40, 45, 50, 55, 60, 65, 70, 75, 80, 85, 90, 95, 100, or more of knowledge maps, including increments therein. In still further embodiments, the systems, media, methods, platforms, and applications described herein comprise about 50, 100, 150, 200, 250, 300, 350, 400, 450, 500, 550, 600, 650, 700, 750, 800, 850, 900, 950, 1000, or more of knowledge maps, including increments therein.

In some embodiments, the nodes are arranged in the knowledge map hierarchically and so as to represent prerequisite relationships between learning objectives. In some embodiments, the nodes are arranged in a linear hierarchical manner. A knowledge map, in some embodiments, includes one linear arrangement of nodes. In other embodiments, a knowledge map includes a plurality of linear arrangements of nodes. As such, in some embodiments, a knowledge map includes multiple independent linear arrangements of nodes. In other embodiments, the nodes are arranged in a hierarchical branching manner. In some cases, a hierarchical branching arrangement of nodes is complex and includes 1, 2, 3, 4, 5, 6, 7, 8, 9, 10, 20, 30, 40, 50, 60, 70, 80, 90, 100, or more branch points, including increments therein. A knowledge map, in some embodiments, includes one or more linear arrangement of nodes and one or more branching arrangements of nodes.

In some cases, a knowledge map is created by one or more instructional designers. In other cases, a knowledge map is created by one or more teachers or mentors. In particular cases, creation of a knowledge map is crowdsourced. In other particular cases, a knowledge map is imported or uploaded from a third-party application via an API or the like.

Figure 3:
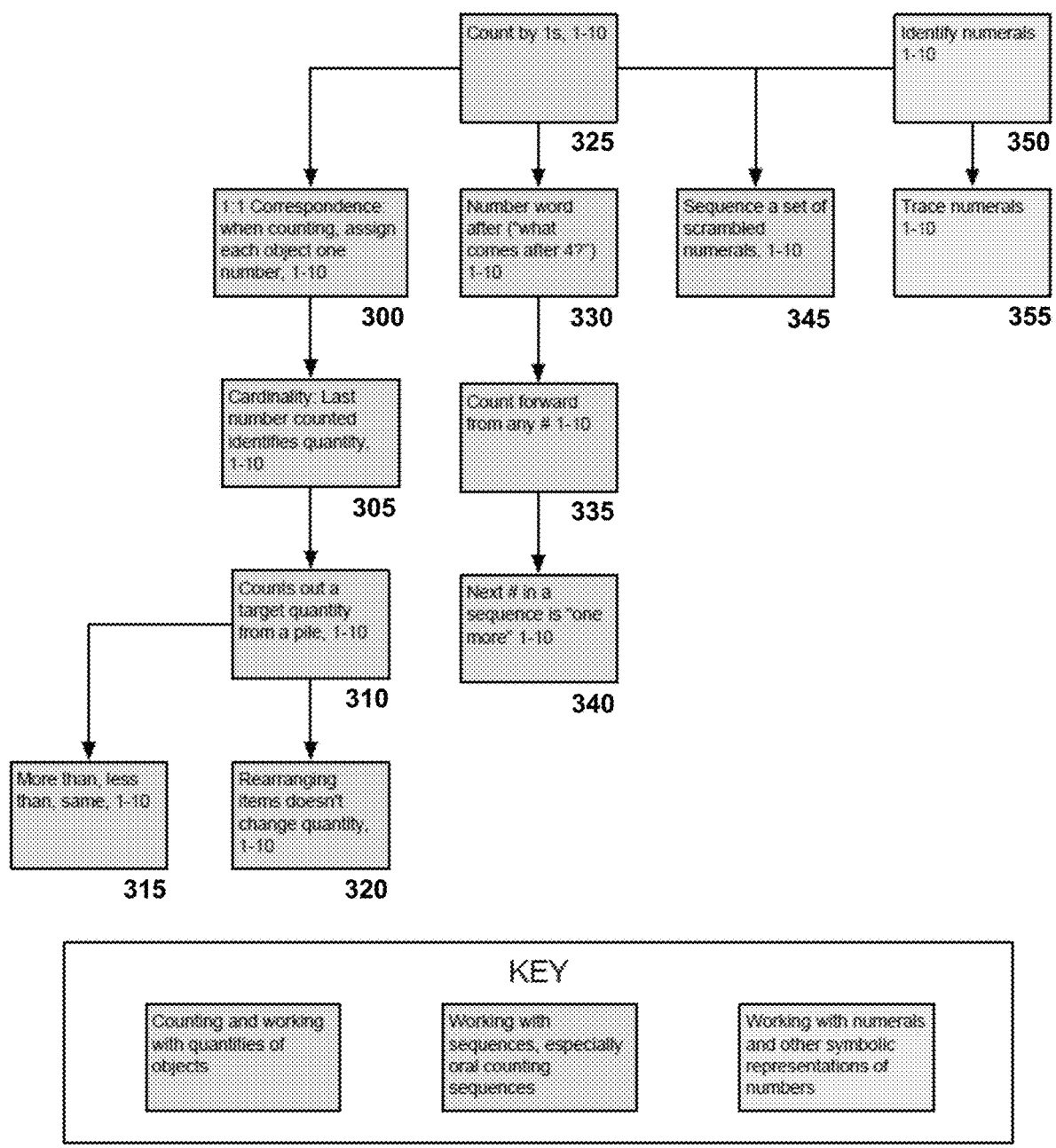
FIG. 3 shows a non-limiting example of a knowledge map; in this case, a knowledge map for the subject of number sense at the Pre-K level.

Referring to FIG. 3, in a particular embodiment, a knowledge map is directed to number sense at a Pre-K level of learning. In this example, each node in the knowledge map represents a learning objective within the topic of number sense at the Pre-K level. In this case, the nodes are arranged in the knowledge map hierarchically and so as to represent prerequisite relationships between learning objectives. This knowledge map comprises twelve nodes. Some nodes represent learning objectives directed to counting and working with quantities of objects 300, 305, 310, 315, and 320. Other nodes represent learning objectives directed to working with sequences (especially oral counting sequences) 325, 330, 335, 340, and 345. Yet other nodes represent learning objectives directed to working with numerals and other symbolic representations of numbers 345, 350, and 355. In some embodiments, the knowledge map depicted in FIG. 3 is fixed and immutable. The learner must demonstrate mastery starting from the right and top-most node 350 before proceeding to demonstrating mastery of the next node 365, then to demonstrating mastery of the next node 345, then the next node 325, then the next node 330, then the next node 335, then the next node 340, then the next node 300, then the next node 305, then the next node 310, then the next node 320, and then the next node 315. In some embodiments, the knowledge map does not rely and/or depict learning vectors or rely on and/or track learning vectors' magnitude (whether such magnitude is constant or not constant or whether any such magnitude of the learning vector corresponds to the length of time required to complete a learning vector). In some embodiments, rather, the arrows represent the fixed sequential order the learner must demonstrate mastery of before proceeding to the next node in the knowledge map. In other embodiments, additional nodes representing additional subjects, topics, or levels of learning may be appended at the beginning, end, or throughout the knowledge map. In some embodiments, an original prerequisite and sequential relationship between a plurality of nodes may be updated and edited based on feedback from multiple learner performance.

In some embodiments, a data storage associates one or more of the nodes with one or more of the learning activities. In some embodiments, one node of the knowledge map is associated with one or more learning activities. In other embodiments, a plurality of nodes of the knowledge map are associated with one or more learning activities. In yet other embodiments, each node of the knowledge map is associated with one or more learning activities. In some embodiments, the data storage is a prerequisite map.

In some embodiments, one or more nodes in a prerequisite map are keynodes that have priority over other nodes in the map. In other words, the learning objectives, and thus the learning activities, associated with a keynode must be mastered before others. In some embodiments, one node in a prerequisite map is a keynode. In other various embodiments, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or more nodes in a prerequisite map are keynodes. In some embodiments, where a plurality of keynodes are present, the keynodes all have the same priority and must be addressed before other nodes, but in no particular order. In other embodiments, where a plurality of keynodes are present, two or more of the keynodes have ranked priority (e.g., priority 1>priority 2>priority 3, etc.) and must be addressed in the ranked order.

Figure 4:
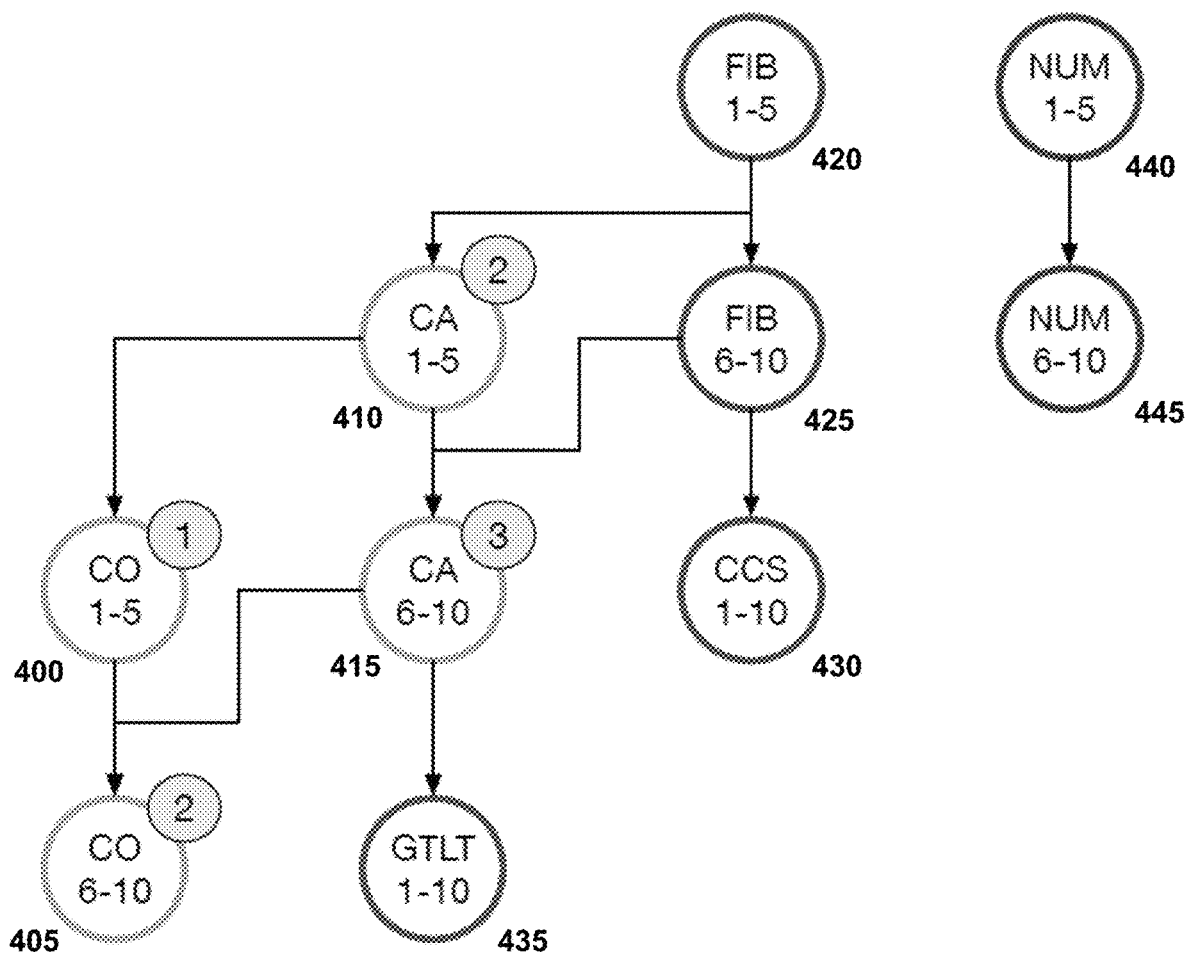
FIG. 4 shows a non-limiting example of a prerequisite map; in this case, a prerequisite map for the knowledge map of FIG. 3 for the subject of number sense at the Pre-K level.
Figure 4:
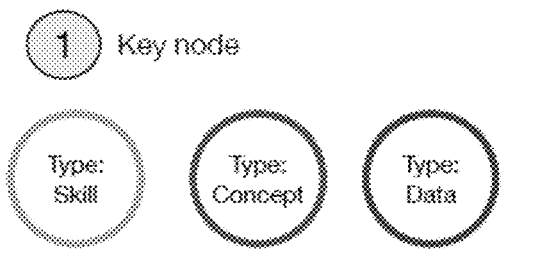

Referring to FIG. 4, in a particular embodiment, each node of the knowledge map of FIG. 3 is associated with a learning activity in a prerequisite map. In this example, some nodes of the prerequisite map are keynodes 400, 405, 410, and 415, which represent learning activities that must be successfully completed before any downstream learning activities are attempted. This is because the keynodes represent learning activities directed to learning objectives that are logical prerequisites to the downstream learning objectives to which the downstream learning activities are directed. Keynodes, in some cases, are prioritized. In this example, one keynode has Priority 1 400, two keynodes have Priority 2 405, 410, and one keynode has Priority 3 415. Nodes, in some cases, are one or more of several types. In this example, some nodes are Skill nodes teaching a skill

400, 405, 410, and 415. Further, in this example, some nodes are Concept nodes teaching a concept 420, 425, 430, and 435. Still further, in this example, some nodes are Data nodes teaching facts that must be memorized 440 and 445.

Figure 5:
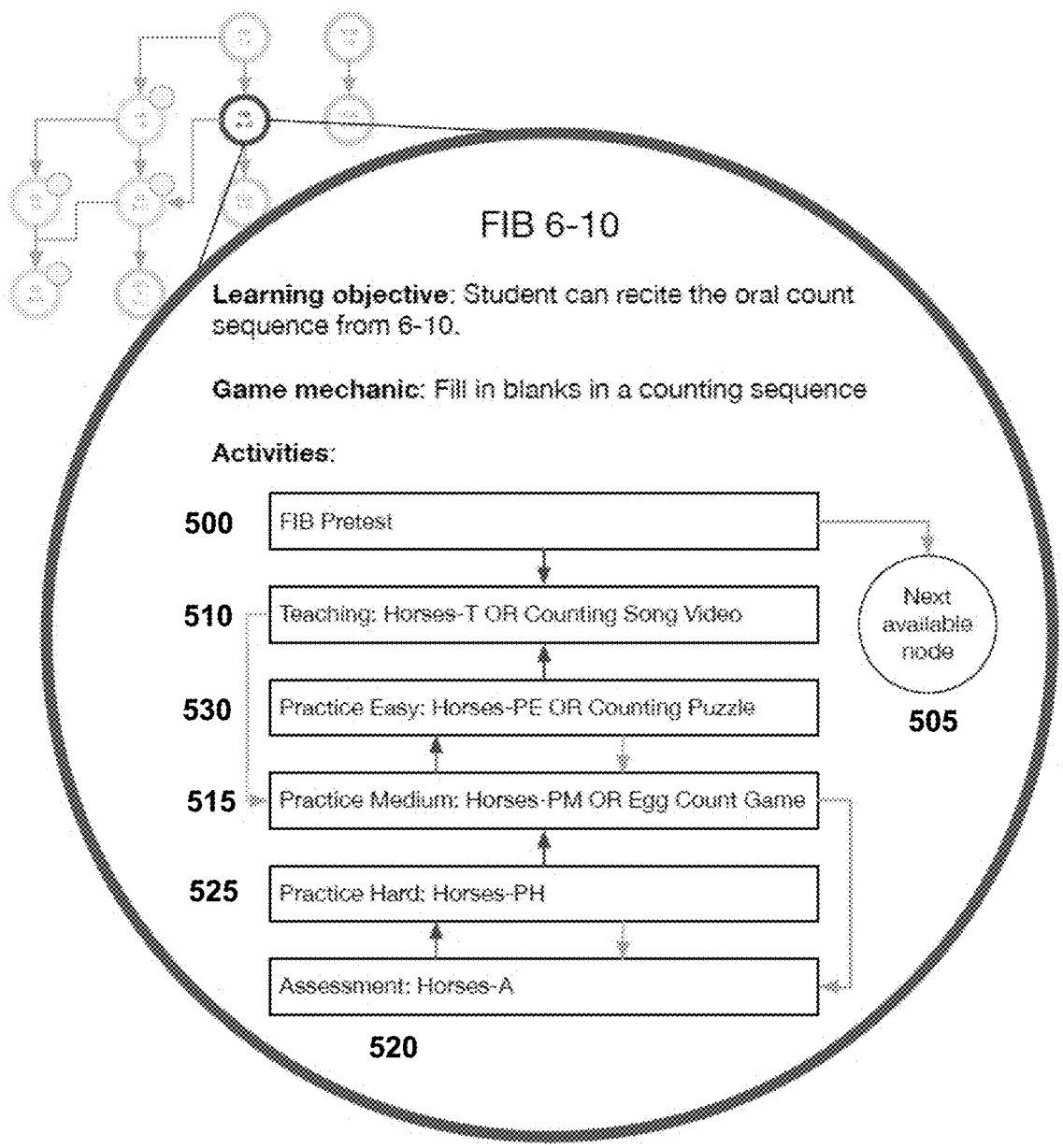
FIG. 5 shows a non-limiting example of a node in a prerequisite map; in this case, a node in the prerequisite map of FIG. 4 for the subject of number sense at the Pre-K level.

Referring to FIG. 5, in a particular embodiment, a node of the prerequisite map of FIG. 4, represents the learning objective of reciting the oral count sequence from 6-10. This node is associated with six learning activities a pretest 500, a teaching activity 510, three levels of practice (easy 530, medium 515, and hard 525), and an assessment activity 520. Nodes, in some cases, have internal logic to route the learner to various learning activities based on performance. In this example, a learner starts at the pretest 500, if they successfully complete the pretest, they are provided with access to the next available node in the perquisite map 505. If the learner fails the pretest, they are provided with access to the teaching phase 510. After the teaching phase 510, learners are provided with access to the medium practice phase 515. If the learner successfully completes the medium practice phase 515, they are provided with access to the assessment phase (Boss) 520. If the learner fails the medium practice phase 515, they descend to the easy practice phase 530 and eventually back to the teaching phase 510 if need be. Adequate success in the assessment phase 520 results in access to the next available node 505, but failure of the assessment phase 520 results in the learner being shuttled back to practice at the hard level 525 and can descend from there if the learner does not demonstrate mastery of reciting the oral count sequence from 6-10.

Learning Activities

In some embodiments, the platforms, systems, media, and methods described herein include a plurality of learning activities, or use of the same. In some embodiments, the plurality of learning activities is a data store or database of learning activities. In some embodiments, the plurality of learning activities comprises about 2, 5, 10, 20, 30, 40, 50, 60, 70, 80, 90, 100, or more activities, including increments therein. In further embodiments, the plurality of learning activities comprises about 50, 100, 150, 200, 250, 300, 350, 400, 450, 500, 550, 600, 650, 700, 750, 800, 850, 900, 950, 1000, 2000, 3000, 4000, 5000, or more activities, including increments therein.

Many types of learning activities are suitable. In some embodiments, one or more activities are selected from informal activities including, by way of non-limiting examples, demonstrations, how-to-articles, how-to-videos, and simulations. In some embodiments, one or more activities are selected from preschool activities including, by way of non-limiting examples, books, games, puzzles, art, songs, chants, and music. In some embodiments, one or more activities are selected from K-12 activities including, by way of non-limiting examples, books, games, puzzles, art, music, reading assignments, articles, videos, demonstrations, simulations, quizzes, examinations, worksheets, problem sets, brainstorms, and journals. In some embodiments, one or more activities are selected from higher education activities including, by way of non-limiting examples, books, reading assignments, lectures, articles, videos, demonstrations, simulations, mock examinations, quizzes, examinations, essays, laboratory experiments, problem sets, brainstorms, and journals. In some embodiments, one or more activities are selected from professional activities including, by way of non-limiting examples, books, articles, brainstorms, collaborations, group activities, multi-player games, videos, lectures, role-plays, simulations, demonstrations, quizzes, and exams. By way of example, FIGS. 25-29 depict exemplary embodiments of learning activities related to mathematics, including addition; subtraction, fractions; and greater than, less than, or equal lessons.

Learning activities, in some embodiments, are directed to different types of learning objectives. In various further embodiments, a learning activity is directed to one or more of: teaching, practicing, or assessing understanding of a concept, teaching, practicing, or assessing understanding of a principle, teaching, practicing, or assessing a skill, or teaching, practicing, or assessing knowledge of data. In some cases, learning activities function differently based on whether they are primarily directed to a concept, a principle, a skill, or data.

In some embodiments, one or more learning activities have dynamically variable scaffolding. In a particular embodiment, each learning activity has dynamically variable scaffolding. Scaffolding is provided to lend support to the learner during the learning process and includes, by way of non-limiting examples, granted access to resources, modeling a task, giving advice, providing encouragement, coaching, templates, and/or guides, or any combination thereof. Moreover, scaffolding is optionally provided by way of text, graphics, animations, interactive elements, video, audio sound effects, music, voice over, and combinations thereof. In some embodiments, dynamically variable scaffolding allows the learning activity to adapt the scaffolding employed in response to learner activity, performance, preferences, and the like. For example, when a learner is performing well, scaffolding is optionally reduced and when a learner is struggling scaffolding is optionally increased.

In some embodiments, one or more learning activities have dynamically variable feedback. In a particular embodiment, each learning activity has dynamically variable feedback. Feedback is provided to inform the learner about their performance during the learning process and includes, by way of non-limiting examples, scores, indicators of success, rewards, encouragement, indicators of inadequate performance, correction, guidance, or any combination thereof. Moreover, feedback is optionally provided by way of text, graphics, animations, interactive elements, video, audio sound effects, music, voice over, and combinations thereof. In some embodiments, dynamically variable feedback allows the learning activity to adapt the feedback provided in response to learner activity, performance, preferences, and the like. For example, when a learner is performing well, feedback is optionally made more concise or less frequent and when a learner is struggling feedback is optionally made more detailed, more frequent, or more encouraging.

Figure 30:
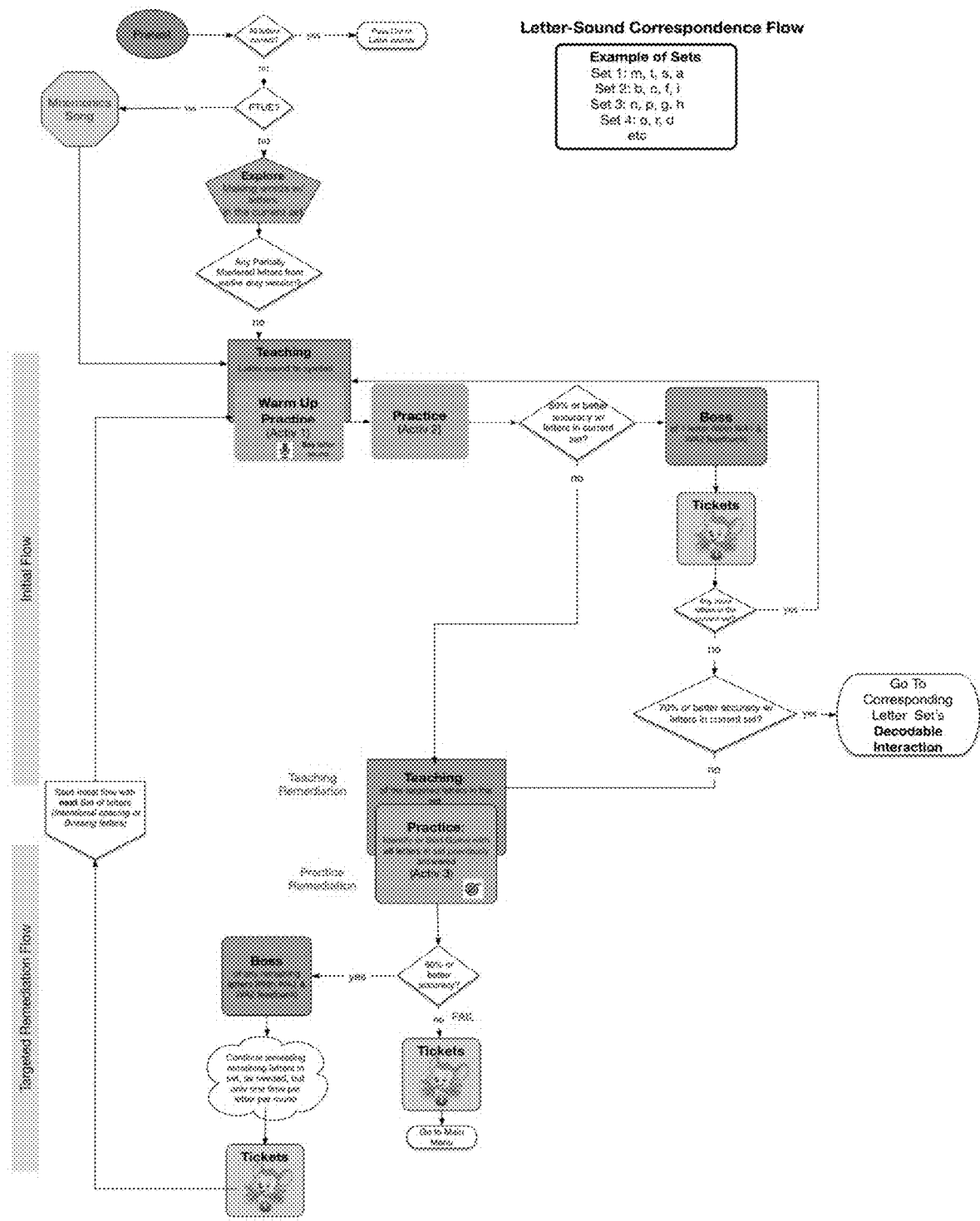
FIG. 30 shows a non-limiting example of a flow diagram; in this case, a diagram illustrating describing the flow diagram for a reading program.

In some embodiments, one or more learning activities have dynamically variable learning content. In a particular embodiment, each learning activity has dynamically variable content. In further embodiments, dynamically variable content allows the learning activity to adapt the content presented provided in response to learner activity, performance, preferences, and the like. For example, when a learner is performing well, more challenging content is optionally presented and when a learner is struggling less challenging is optionally presented. By way of further example, content is optionally varied to address a concept, a principle, a skill, or data. By way of still further example, content is optionally varied to accommodate learner interest or preferences. FIG. 30 depicts an exemplary embodiment for a flow diagram for a reading program, depicting scaffolding and formative feedback techniques. FIGS. 31-42B depict exemplary embodiments of summaries and screenshots of graphic user interfaces for various learning activities.

Selection Module

In some embodiments, the platforms, systems, media, and methods described herein include a learning activity selection module, or use of the same. In further embodiments, the learning activity selection module identifies at least one current node on a knowledge map for a particular learner based on performance of the learner. Where the knowledge map is linear, a learner may have a single current node. Where the knowledge map is branching or has multiple independent learning pathways, a learner may have multiple current nodes, including 2, 3, 4, 5, 6, 7, 8, 9, 10, or more current nodes. In a particular embodiment, the learning activity selection module identifies the at least one current node as the node immediately subsequent to the highest node in a portion of the hierarchy of the map for which the learner has demonstrated mastery.

Identification of one or more current nodes for a learner is suitably executed by the learning activity selection module at various intervals. For example, in some embodiments, the learning activity selection module identifies the at least one current node after completion of each learning activity. In other embodiments, the learning activity selection module identifies the at least one current node after each learner interaction with a learning activity. In yet other embodiments, the learning activity selection module identifies the at least one current node in real-time, continuously, or substantially continuously. In embodiments where the platforms, systems, media, and methods described herein include an offline mode, the learning activity selection module stores learner data locally and identifies the at least one current node for an individual learner only when the application has network connectivity.

In some embodiments, the learning activity selection module uses the at least one current node to select one or more learning activities for the learner. In further embodiments, the learning activity selection module utilizes data storage described herein, such as a prerequisite map, to select one or more learning activities for the learner. In some embodiments, the data storage, such as a prerequisite map, includes associations between the one or more nodes of the knowledge map and one or more particular learning activities.

In some embodiments, the learning activity selection module selects one learning activity for the learner and provides the learner with access to the activity. In other embodiments, the learning activity selection module selects a plurality of learning activities for the learner and presents a choice of learning activities to the learner. For example, in various embodiments, the learning activity selection module selects 2, 3, 4, 5, 6, 7, 8, 9, 10, or more learning activities for the learner and allows the learner to choose between them. In some embodiments, the learner is presented with multiple selected learning activities in a graphic user interface (GUI) and selects an activity by, for example, keystroke, gesture on a touchscreen, pointing device (such as a mouse), or the like. In some embodiments, each learning activity comprises a content type and the learning activity selection module selects a content type for the learner. Content types include, by way of non-limiting examples, those directed to a learning objective associated with a concept, a principle, a skill, or data.

Modification Module

In some embodiments, the platforms, systems, media, and methods described herein include a learning activity modification module, or use of the same. In further embodiments, the learning activity modification module dynamically varies one or more of the scaffolding, feedback, and content of a learning activity based on performance of the learner. In some embodiments, the scaffolding for a learning activity is modified, based at least in part, on performance of the learner and their individual level of mastery demonstrated. By way of examples, the scaffolding is optionally modified via changes in type, frequency, detail, and/or degree as well as by media used to convey the scaffolding (e.g., text, graphics, animations, videos, sound effects, music, and/or voice overs, etc.). In some embodiments, the feedback for a learning activity is modified, based at least in part on performance of the learner and their individual level of mastery demonstrated. By way of examples, the feedback is modified via changes in type, frequency, detail, and/or degree as well as by media used to convey the feedback (e.g., text, graphics, animations, videos, sound effects, music, and/or voice overs, etc.). In some embodiments, the content for a learning activity is modified, based at least in part on performance of the learner and their individual level of mastery demonstrated. By way of examples, the content is modified via changes in type, difficulty, and/or quantity, as well as by media used to present the content.

In some embodiments, the learner performance of a particular learning activity impacts the presence, absence, transformation, addition, manipulation, modification, relocation, change, or removal of visual elements on the graphical user interface (GUI) or audio elements for the learner activity. Non-limiting examples of the presence, absence, transformation, addition, manipulation, modification, relocation, change, or removal of visual GUI or audio elements as a result of dynamically variable scaffolding is provided in FIG. 8F. In FIG. 8F, multiple scaffolding levels for a single learning activity directed to mastering data sets (1-5) and (6-10) is provided. Based on the learner performance on previous or current levels, the visual GUI elements and audio elements are impacted via non-playable characters (which in some embodiments are configured to be engaged and interacted with by the learner as part of the learning activity) on the graphic user interface. In some embodiments, the presence, absence, transformation, addition, manipulation, modification, relocation, change, or removal of visual elements on the graphical user interface (GUI) or audio elements include: one or more visual GUI elements (e.g., Shapey) saying and showing numbers when the visual element is counted or selected by the learner, one or more visual GUI elements (e.g., Shapey) only says the number it represents when counted or selected by the learner (without showing the numbers), one or more visual GUI elements (e.g., Shapey) showing numbers when counted or selected by the learner (without saying the numbers), increasing or decreasing the number of countable visual GUI elements (e.g., number of balloons) or one or more visual GUI elements (e.g., Shapey) counting off and/or not counting off. In some embodiments, the scaffolding provided to a learner depends on the learner interacting with one or more dynamic non-playable characters on the graphical user interface, whereby the non-playable character is depicted on the learning activity itself rather than on a separate pane or window that is separate and apart from the learning activity interface. In some embodiments, the presence, absence, relocation, or modifications of elements on the GUI results in an improved GUI technological tool.

Figure 31:
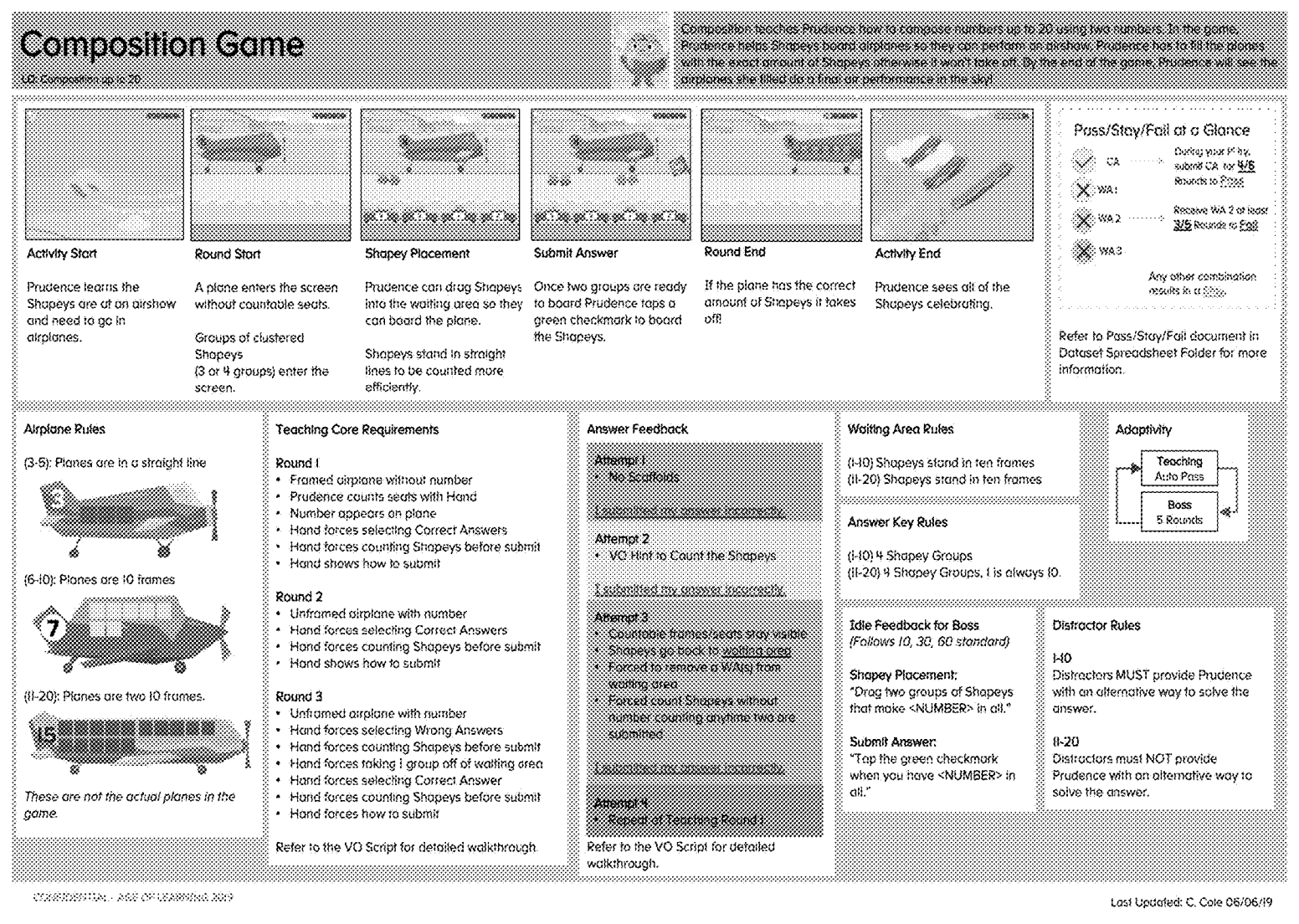
Figure 32A:
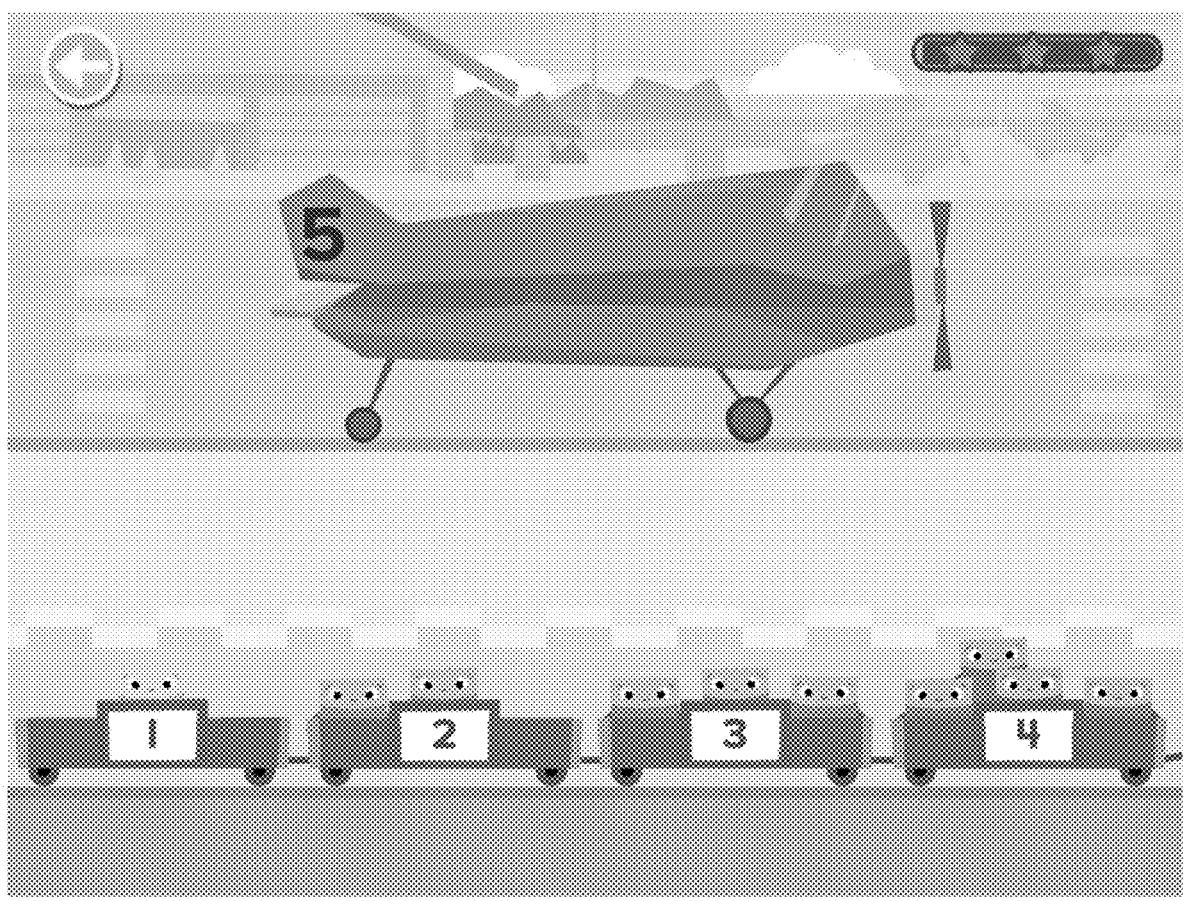
FIG. 32A-B show non-limiting examples of a graphic user interface; in this case, multiple screenshots of a composition learning activity with variable amounts of scaffolding.
Figure 32B:
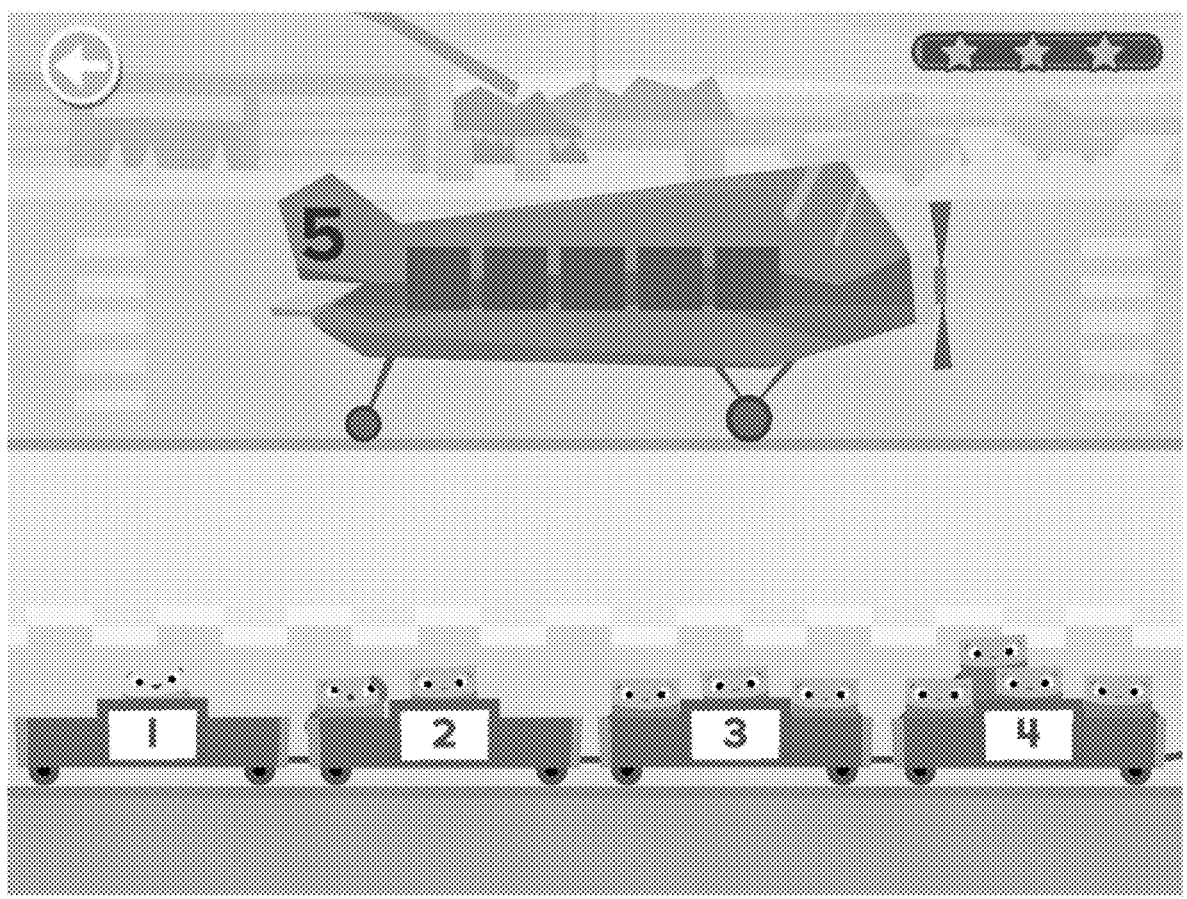

Referring to FIG. 31, in a particular embodiment, is a non-limiting summary of a learning activity; in this case, a summary of a game configured to assist learner composition up to 20. FIG. 31 further describes an airplane game where a non-playable character teaches the learner how to compose numbers up to 20 using two numbers. FIG. 31 further describes the parameters of the learning activity, along with airplane rules, teaching core requirements, answer feedback, waiting area rules, answer key rules, feedback for learner idle, distractor rules, and what the learner needs to achieve to pass, stay, or fail at a glance. In some embodiments, the learner helps graphic user interface visual elements in the form of "Shapeys" board airplanes so they can perform an airshow. In some embodiments, the learner has to fill the planes with the exact amount of Shapeys otherwise it won't take off. Referring to FIG. 32A-B, in particular embodiments, show non-limiting examples of a graphic user interface; in this case, multiple screenshots of a composition learning activity with variable amounts of scaffolding. In contrast to FIG. 32A that has no scaffolding, FIG. 32B provides some scaffolding assistance in the form of 5 countable windows depicted on the central airplane. In contrast to other graphic user interfaces where support systems come in the form of characters depicted in a separate window or pane from the learning activity interface itself, the increased scaffolding assistance yields in the addition of windows within the airplane visual GUI element, allowing for a more seamless, improved GUI experience while consequently also provided a more effective tool to assist the learner achieve mastery.

Figure 33:
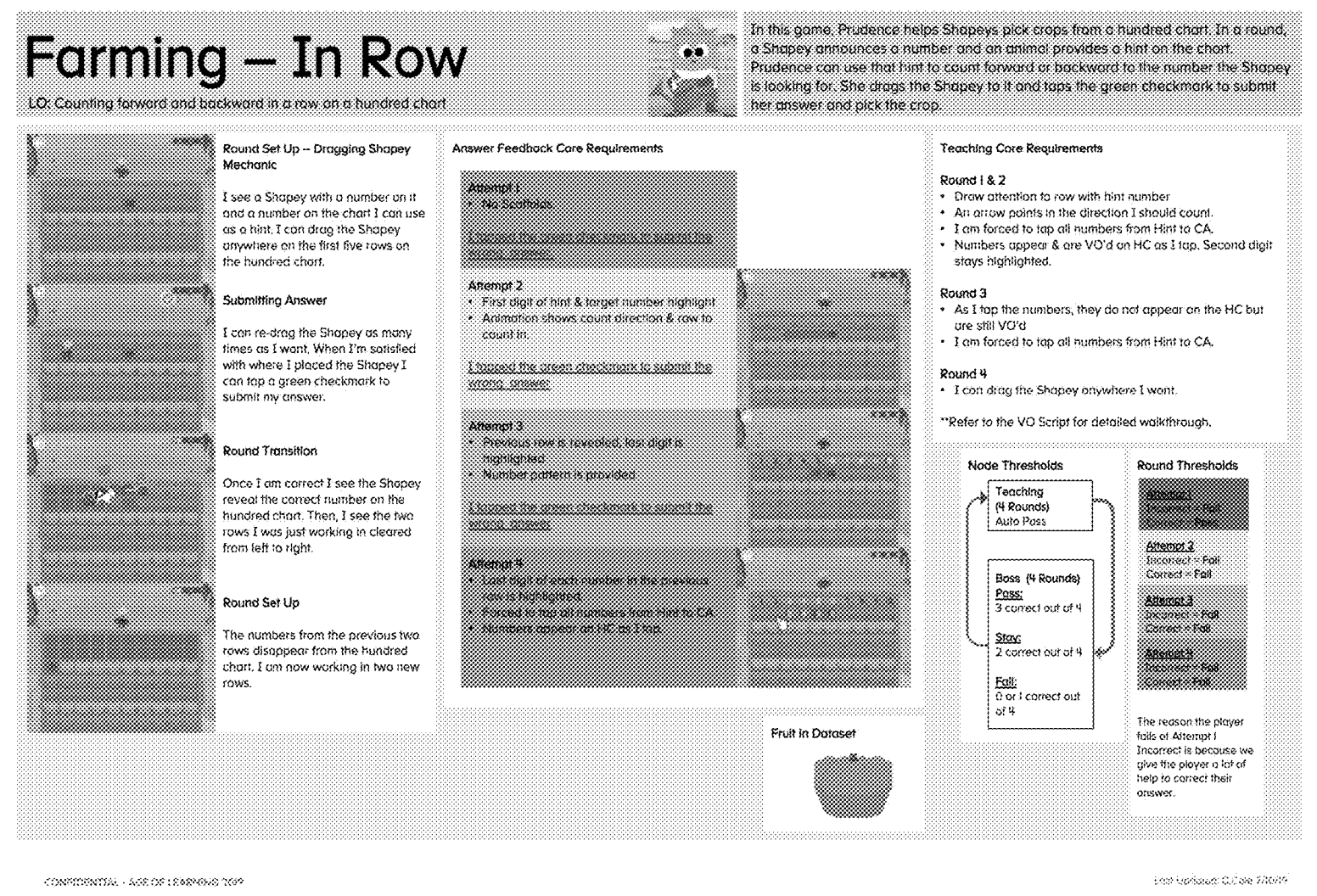
Figure 34A:
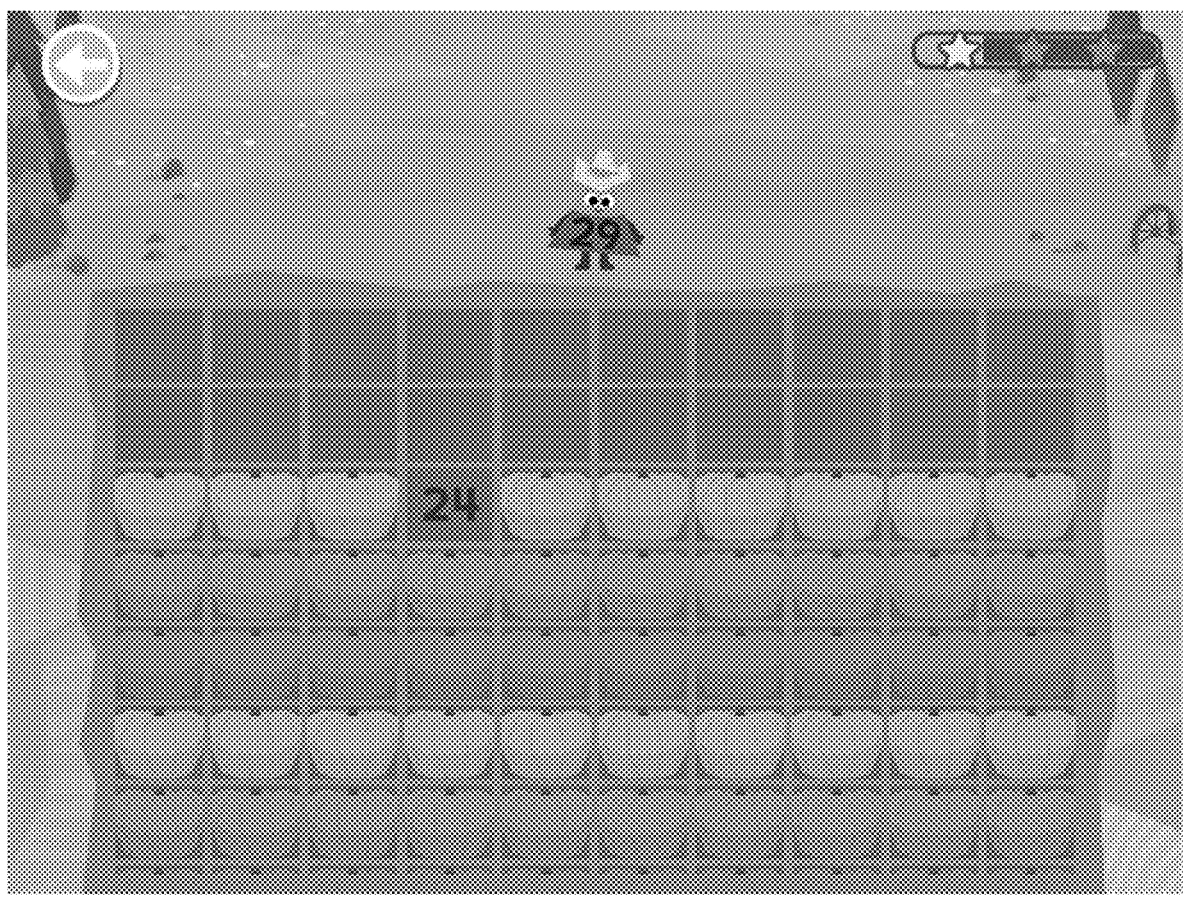
FIGS. 34A-C show non-limiting examples of a graphic user interface; in this case, multiple screenshots of a counting forward and backward learning activity with variable amounts of scaffolding.
Figure 34B:
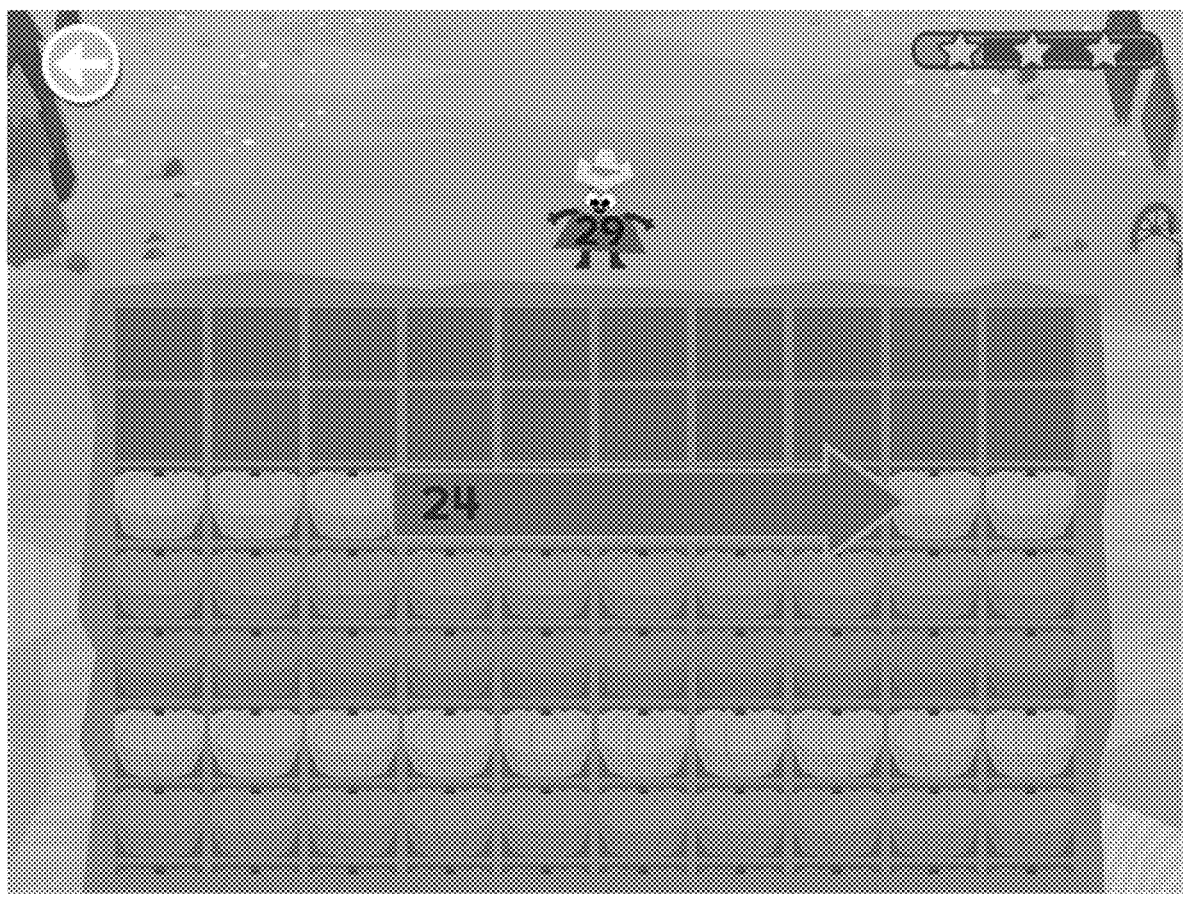
Figure 34C:
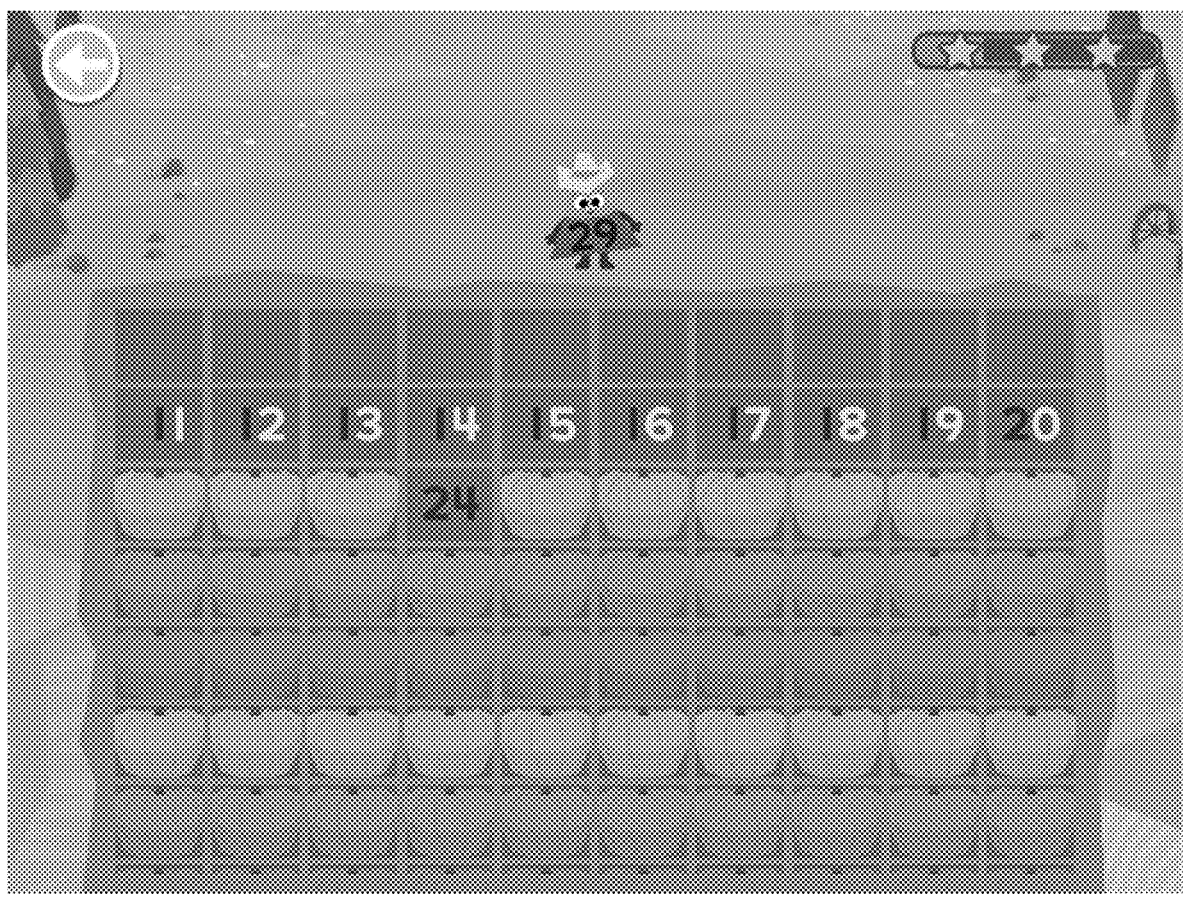

Referring to FIG. 33, in a particular embodiment, is a non-limiting summary of a learning activity; in this case, a game summary of counting forward and backward in a row on a hundred chart. FIG. 33 further describes a farming game where the learner helps graphic user interface visual elements in the form of "Shapeys" pick crops from a hundred chart. In a round, a Shapey announces a number and an animal provides a hint on the chart. The learner can use that hint to count forward or backward to the number the Shapey is looking for. FIG. 33 further describes the round set up, the answer feedback core requirements, teaching core requirements, node threshold, and round threshold. Referring to FIG. 34A-C, in particular embodiments, show non-limiting examples of a graphic user interface; in this case, multiple screenshots of a counting forward and backward learning activity with variable amounts of scaffolding. FIG. 34A provides no scaffolding assistance, FIG. 34B provides some scaffolding assistance, and FIG. 34C provides the most scaffolding assistance. In contrast to FIG. 34A which merely depicts the Shapey with a "29" numeral on it and the "24" hint, FIG. 34B further depicts an arrow pointing in the forward direction from the "24" hint to where the "29" numeral would be. In other embodiments where the counting should be backwards, the arrow would be going in the backwards direction. In FIG. 34C, even more scaffolding assistance is provided where the preceding row of numerals from 11-20 are uncovered and depicted. In some embodiments, the ones column and the tens column in the 11-20 numerals row are provided in different colors to provide further guidance to the right answer. Notably, however, the guidance is not merely pointing to the correct answer or removing incorrect answer. Rather, in some embodiments, the scaffolding provides particular kinds of assistance seamlessly embedded in the learning activity interface itself that also goes to the fundamentals of mastering arrangements of numbers on a hundred chart.

Figure 35:
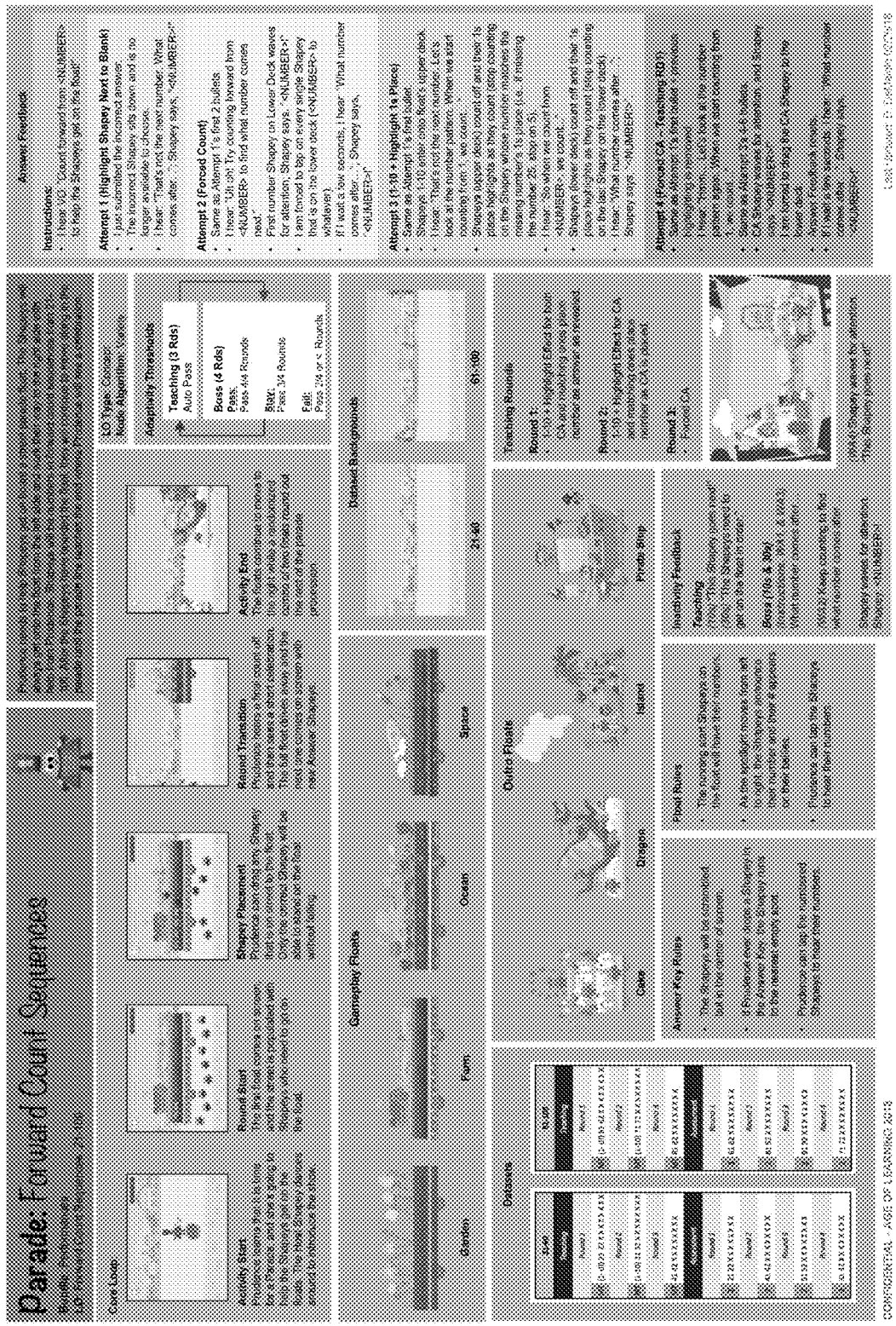
FIG. 35 shows a non-limiting summary of a learning activity; in this case, a game summary of forward counting sequence from 21 to 100.
Figure 36A:
FIGS. 36A-C show non-limiting examples of a graphic user interface; in this case, multiple screenshots of a forward counting sequence learning activity with variable amounts of scaffolding.
Figure 36B:
Figure 36C:

Referring to FIG. 35, in a particular embodiment, is a non-limiting summary of a learning activity; in this case, a game summary of forward counting sequence from 21 to 100. FIG. 35 further describes a parade game where the learner helps graphic user interface visual elements in the form of "Shapeys" get on board a street parade float. The Shapeys will always get on the float from the left side and work their way to the right side with help from the learner. Shapeys will be numbers in forward count sequences from 21-100. After the Shapeys have boarded the float, they will continue to move along in the parade until the parade line reaches the end where the learner will see a celebration. FIG. 35 further describes the core loop, exemplary gameplay floats, datasets, outro floats, dataset backgrounds, node algorithm, adaptivity thresholds, teaching rounds, and answer feedback. Referring to FIG. 36A-C, in particular embodiments, show non-limiting examples of a graphic user interface; in this case, multiple screenshots of a forward counting sequence learning activity with variable amounts of scaffolding. FIG. 36A provides no scaffolding assistance, FIG. 36B provides some scaffolding assistance, and FIG. 36C provides the most scaffolding assistance. In contrast to FIG. 36A, which depicts all the possible Shapeys to be next to the "63" Shapey as standing, FIG. 36B depicts some of the incorrect Shapeys—e.g., "65"—as sitting down to implicitly indicate to the learner that this is not the Shapey to select. Further, FIG. 36C provides the most scaffolding assistance in the form of additional non-subsequent Shapeys sitting down and the row of 1-10 Shapeys standing immediately above the parade. In further embodiments, the ones column of the "61," "62," and "63" Shapeys are depicted in the same color font as the color of the numerals on the 1-4 Shapeys above. In further embodiments, as the learner correctly selects additional Shapeys and places them in the proper order on the float (e.g., "64," "65," "66," etc.), then the corresponding Shapeys in the above row with the corresponding numerals would also change colors (e.g., "4," "5," "6") to match the color of the numerals of the 1-4 Shapeys. In some embodiments, the scaffolding provides assistance within the flow of the learning activity itself and any modification, removal, addition, or relocation of any graphic user interface elements is taking place within the learning activity based on the learner performance rather than being provided in a separate window pane or an artificial or unnatural callout.

Figure 37:
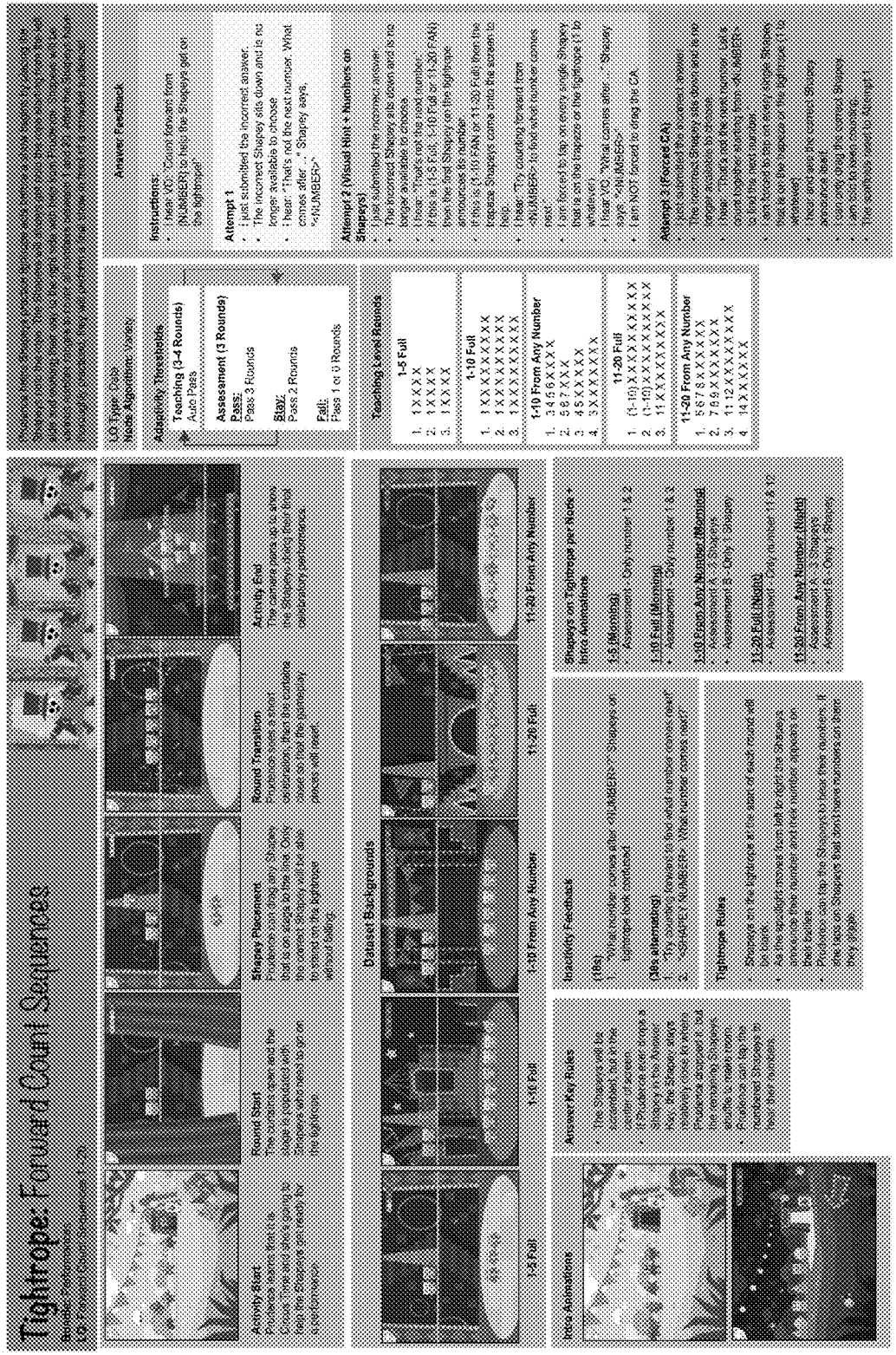
FIG. 37 shows a non-limiting summary of a learning activity; in this case, a game summary of forward counting sequence from 1 to 20.
Figure 38A:
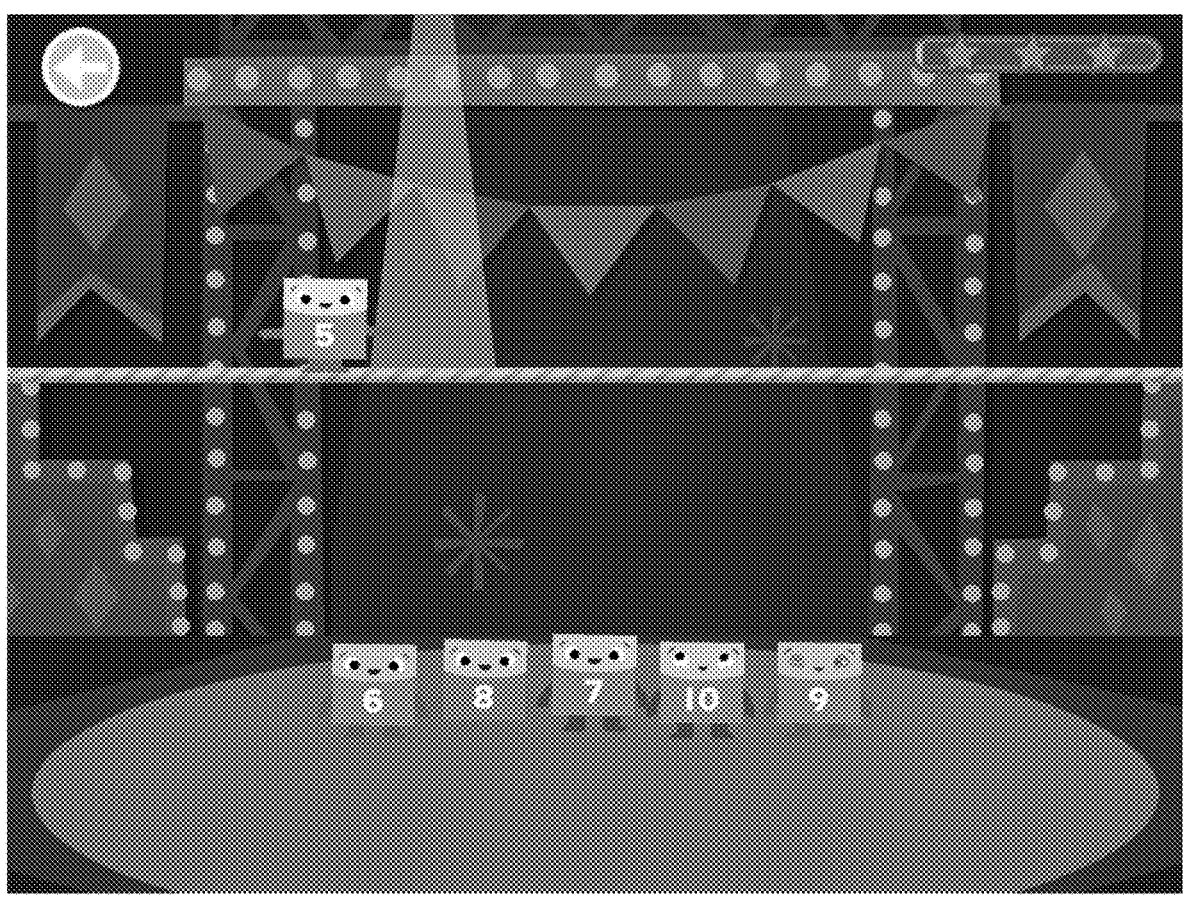
FIGS. 38A-C show non-limiting examples of a graphic user interface; in this case, multiple screenshots of a forward counting sequence learning activity with variable amounts of scaffolding.
Figure 38B:
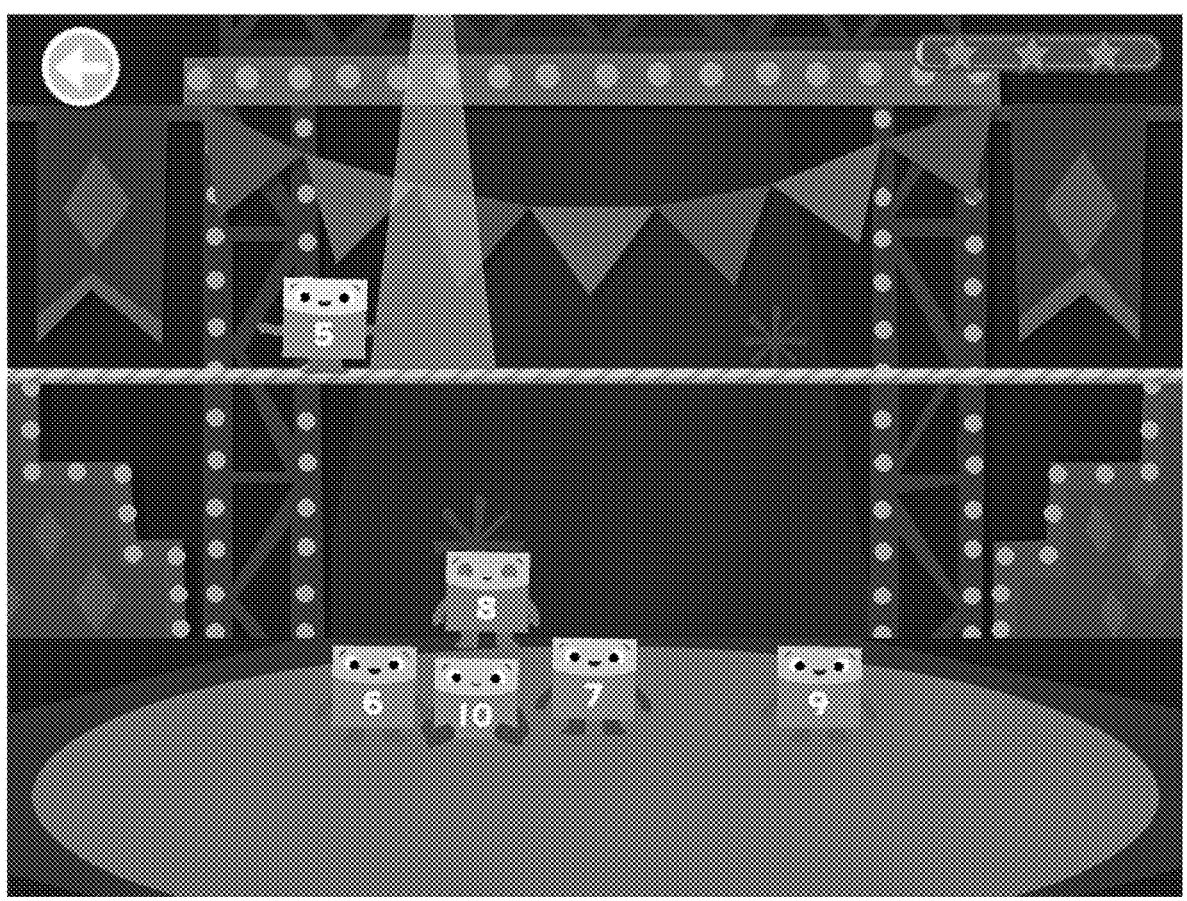
Figure 38C:
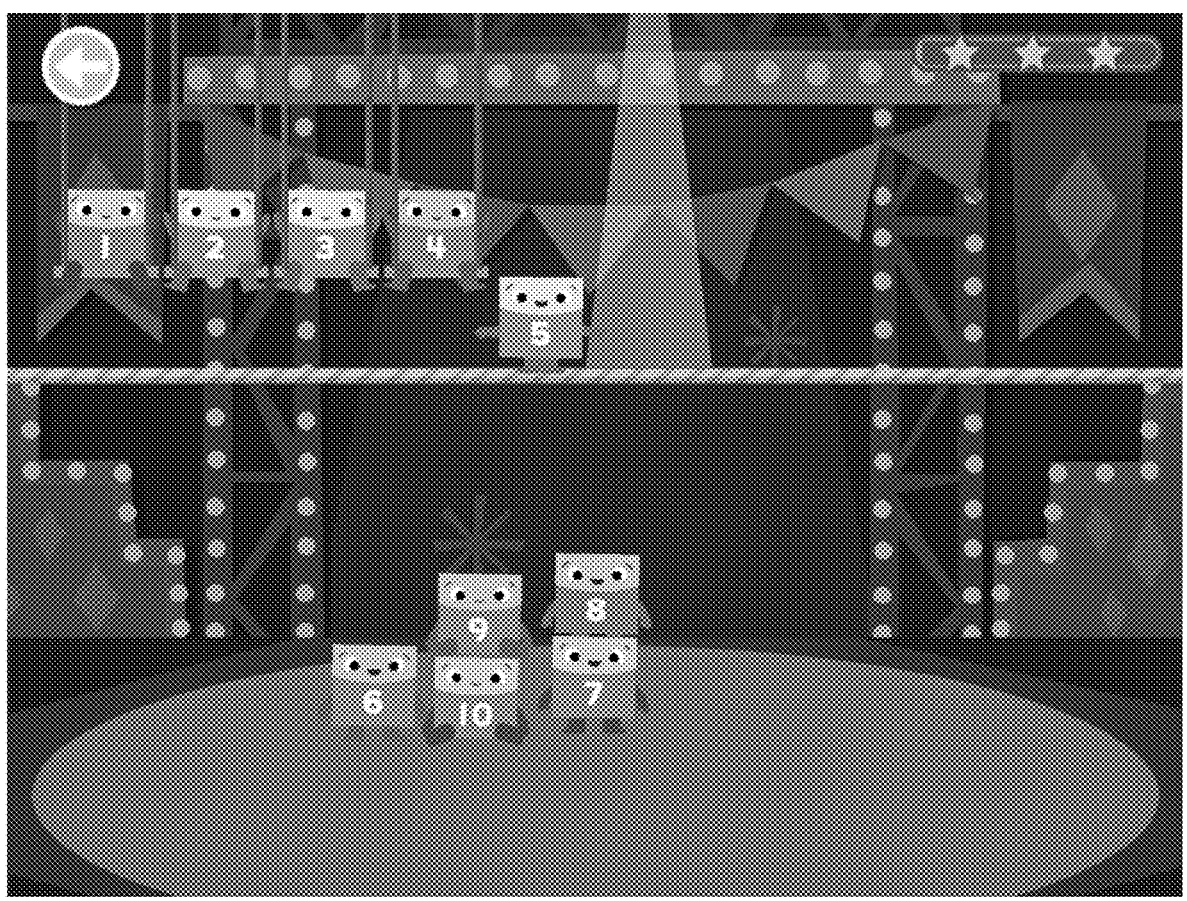

Referring to FIG. 37, in a particular embodiment, is a non-limiting summary of a learning activity; in this case, a game summary of forward counting sequence from 1 to 20. FIG. 37 further describes a tightrope walking game where the learner helps visual graphic user interface elements ("Shapeys") practice tightrope acts before a show begins by placing the Shapeys onto the rope. The Shapeys will always get onto the rope starting from the left side and working their way to the right side with help from the learner. Shapeys will be various number ranges to cover all numbers between 1 and 20. After the Shapeys have thoroughly practiced, they will perform a final show in front of a crowded audience. FIG. 37 further describes the loop, the intro animation, the dataset backgrounds, the answer key rules, inactivity feedback, tightrope rules, adaptivity thresholds, teaching level rounds, and answer feedback. Referring to FIG. 38A-C, in particular embodiments, show non-limiting examples of a graphic user interface; in this case, multiple screenshots of a forward counting sequence learning activity with variable amounts of scaffolding. FIG. 38A provides no scaffolding assistance, FIG. 38B provides some scaffolding assistance, and FIG. 38C provides the most scaffolding assistance. In contrast to FIG. 38A, which depicts all the possible Shapeys to be placed by the learner onto the tightrope on the floor in the same standing position, FIG. 38B depicts some of the incorrect Shapey select (e.g., "10") as sitting down to implicitly direct the learner that the correct Shapey to drag onto the tightrope next to the "5" is not the "10" Shapey. FIG. 38C, which depicts the most scaffolding assistance, shows not only the incorrect Shapeys to be selected as sitting down, but also depicts Shapeys 1-4 prior to the "5" Shapey to assist the reader count from 1 to 5 (with the intent to help the learner leverage the 1 to 5 count to select the correct subsequent number). In some embodiments, every level of scaffolding is provided in the form of addition, removal, modification, or relocation or graphical user interface elements within the flow of the same learning activity rather than offering a completely different learning activity (e.g., separate predecessor learning activity that takes the learner from counting in order 1-5 when doing a counting 5-10 learning activity). In some embodiments, number of Shapeys as well as the range of numerals are variable (starting at 1, 2, 3, 4, 5, 6, 7, 8, 9, 10, 20, 30, 40, 50, etc.)

Figure 39:
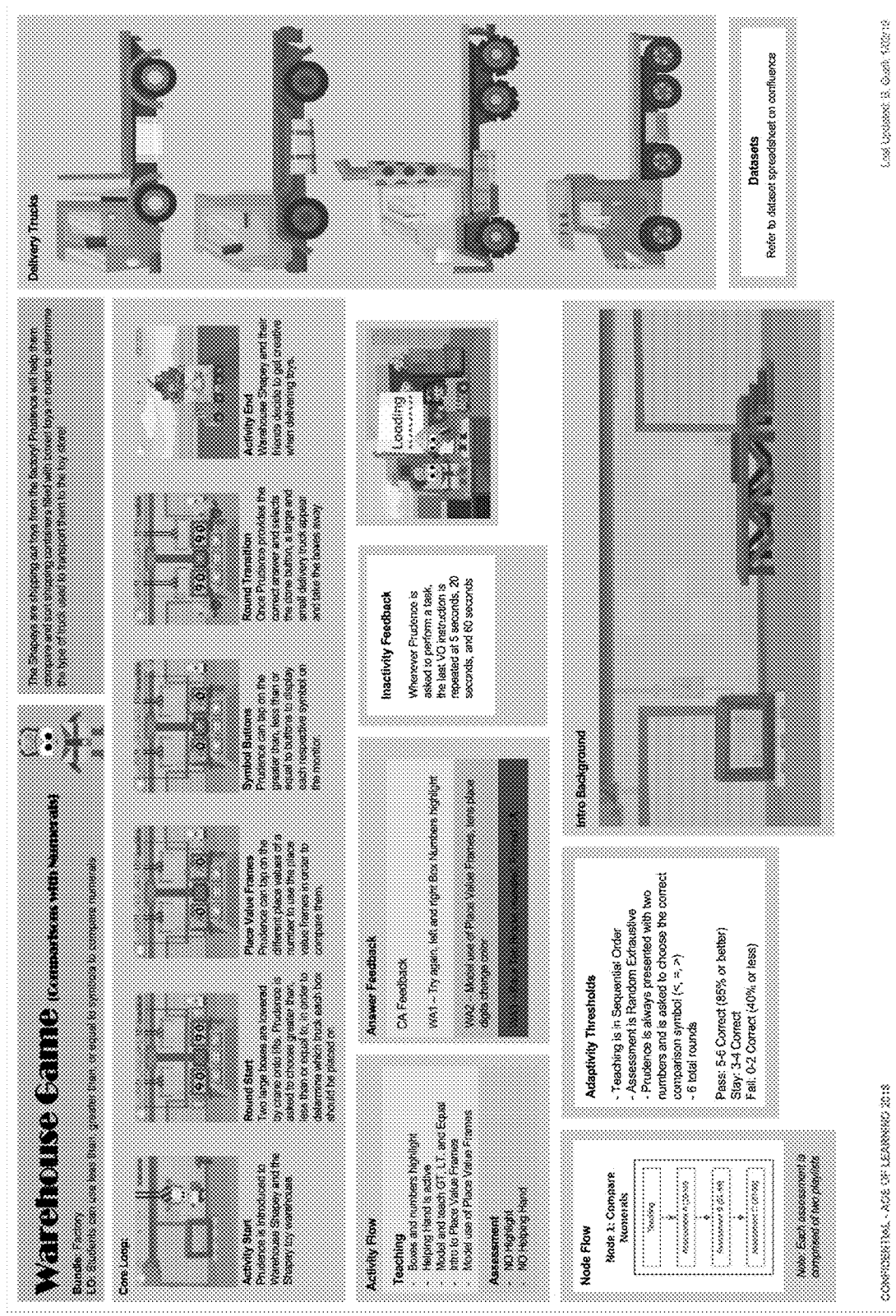
FIG. 39 shows a non-limiting summary of a learning activity; in this case, a game summary about using less than, greater than, or equal to symbols to compare numerals.
Figure 40A:
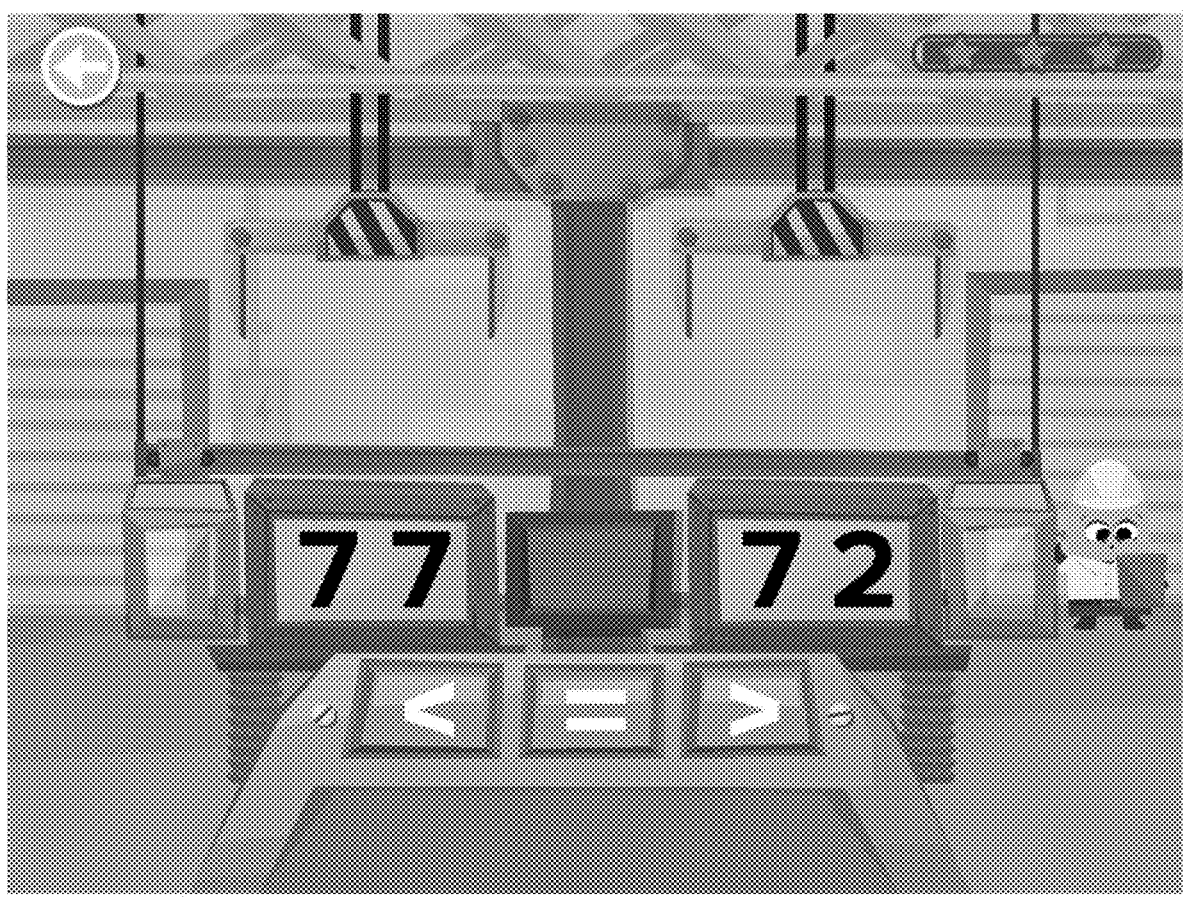
FIGS. 40A-C show non-limiting examples of a graphic user interface; in this case, multiple screenshots of a less than, greater than, or equal to learning activity with variable amounts of scaffolding.
Figure 40B:
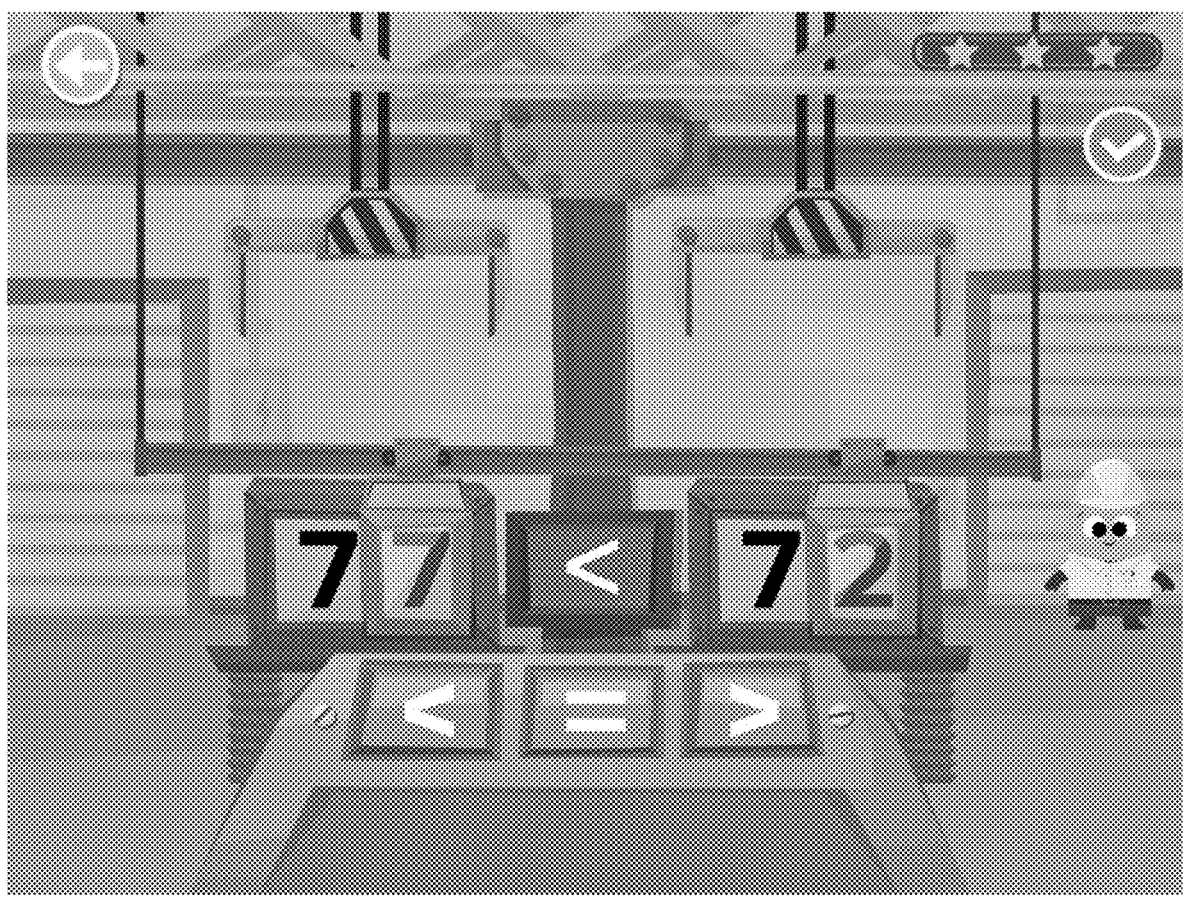
Figure 40C:
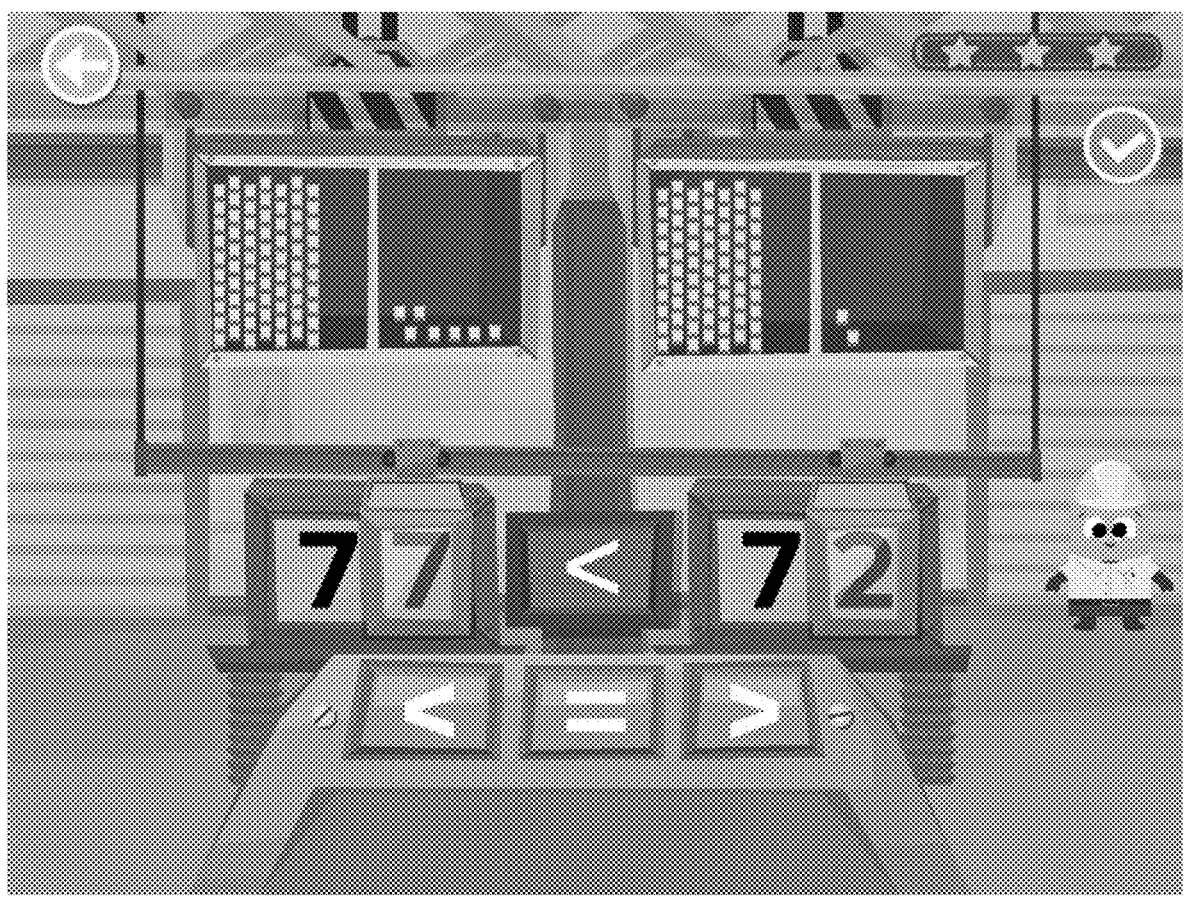

Referring to FIG. 39, in a particular embodiment, is a non-limiting summary of a learning activity; in this case, a game summary about using less than, greater than, or equal to symbols to compare numerals. FIG. 39 further describes a warehouse game where visual graphic user interface elements ("Shapeys") are shipping out toys from the factory. In this embodiment, the learner is tasked with helping the Shapeys compare and sort shipping containers filled with boxed toys to determine the type of truck used to transport them to the toy store. FIG. 39 also describes the core loop, activity flow, answer feedback, node flow, adaptivity thresholds, intro background, inactivity feedback, datasets, and delivery trucks. Referring to FIG. 40A-C, in particular embodiments, show non-limiting examples of a graphic user interface; in this case, multiple screenshots of a less than, greater than, or equal to learning activity with variable amounts of scaffolding. FIG. 40A provides no scaffolding assistance, FIG. 40B provides some scaffolding assistance, and FIG. 40C provides the most scaffolding assistance. In contrast to FIG. 40A, which depicts a straightforward comparison of two numerals, FIG. 40B depicts the same numerals with the ones column in "77" and "72" bracketed (i.e., the "7" in "77" and the "2" in "72") to draw attention to the learner. Notably, in some embodiments, the brackets around the ones column is part of the theme of the warehouse factory; rather than an artificial and unnatural visual element that would appear over the ones column, the instant embodiment depicts the brackets in the form of a window pane normally seen in a warehouse type setting that was resting to the side when no scaffolding was needed, but moved naturally into place when scaffolding was needed (e.g., based on learner performance selecting the incorrect symbol). FIG. 40C depicts even greater scaffolding assistance. In addition to the window pane brackets, the learning activity further depicts a crane picking up boxes where one side of the box depicting items within the box representing the tens column and the other side of the box depicting items in the box representing the ones column. In the instant embodiment of "77" in FIG. 40C, the left side of the crate shows 7 rows of ten items stacked and the right side of the crate showing 7 single items. In the instant embodiment of "72," the left side of the crate also shows 7 rows of ten items stacked but shows the right side of the crate showing 2 single items. In some embodiments, the depicting of the crane picking up crates depicting items within all flow within the "warehouse" theme of the learning activity, allowing a seamless and natural graphic user interface experience for the learner. In further embodiments, the less than, greater than, or equal to learning activity can similarly be adopted for numerals in the ones, tens, hundreds, thousands, ten thousands, etc.

Figure 41:
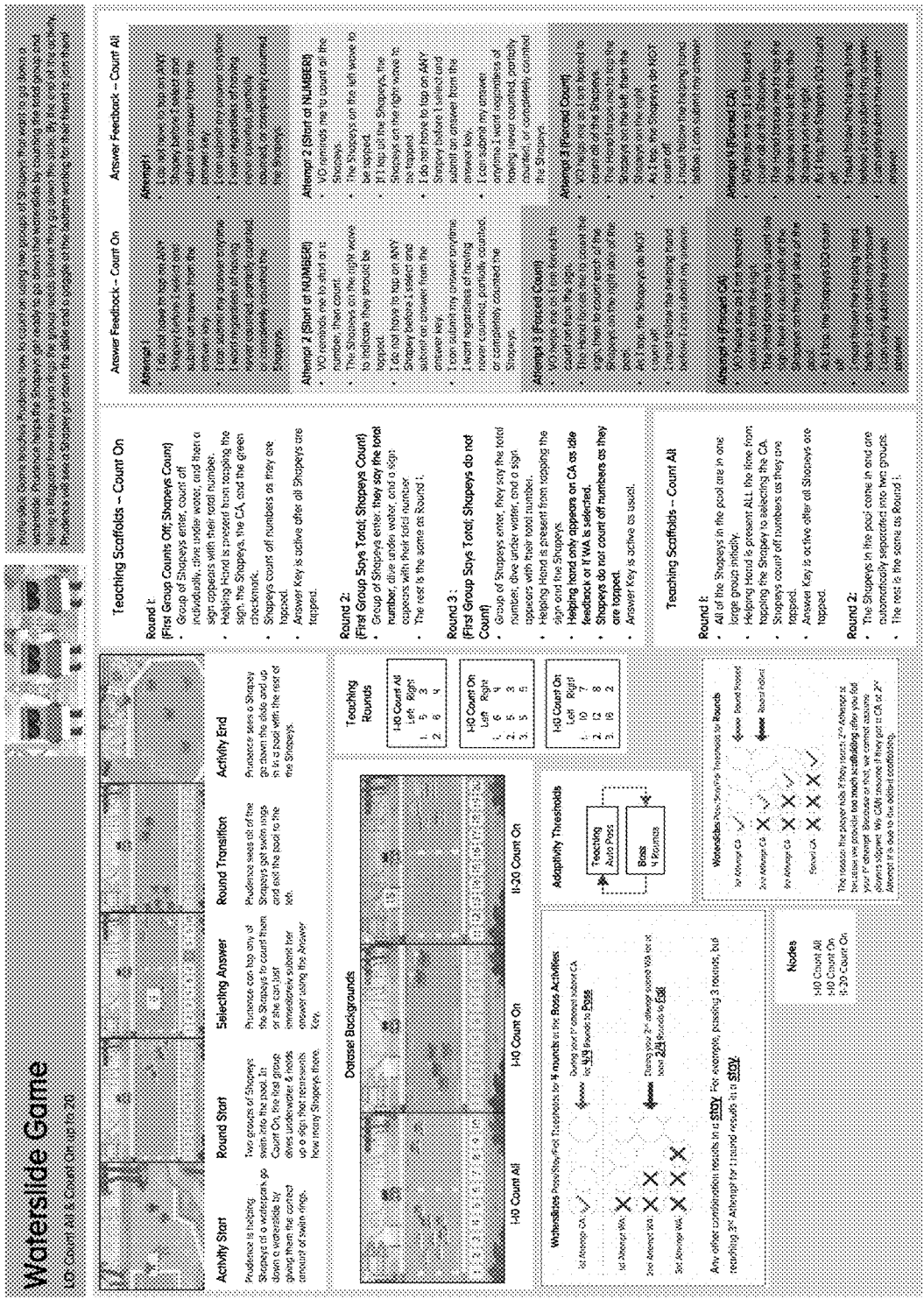
FIG. 41 shows a non-limiting summary of a learning activity; in this case, a game summary of counting all and counting on up to 20.
Figure 42A:
FIGS. 42A-B show non-limiting examples of a graphic user interface; in this case, multiple screenshots of a counting all and counting on up to 20 learning activity with variable amounts of scaffolding.
Figure 42B:

Referring to FIG. 41, in a particular embodiment, is a non-limiting summary of a learning activity; in this case, a game summary of counting all and counting on up to 20. FIG. 41 further describes a waterslide game where the learning activity helps the learner how to count using two groups of visual graphic user interface elements ("Shapeys") that want to go down a waterslide. The learner helps the Shapeys get ready to go down the waterslide by counting the total group and telling a lifeguard how many swim rings the group needs before they go down the slide. By the end of the activity, the learner will see a Shapey go down the slide, and a giggle at the bottom waiting for their friend to join them. FIG. 41 further provides the teaching scaffolds, answer feedback, data backgrounds, adaptivity thresholds, nodes, and teaching rounds. Referring to FIG. 42A-B, in particular embodiments, show non-limiting examples of a graphic user interface; in this case, multiple screenshots of a counting all and counting on up to 20 learning activity with variable amounts of scaffolding. In FIG. 42A, there is no scaffolding assistance provided. The number "4" is provided on the left side and the learner is expected to be able to count the two Shapeys on the right side to conclude with "6" and make the appropriate single selection below. In FIG. 42B, some scaffolding assistance is provided. Instead of the numeral "4" depicted on the left side of the pool, the learner is now shown 4 countable Shapeys. By so providing 4 separate Shapeys, the learner is able to more easily start counting from 1 to reach 4 and then proceed to counting 5 and 6 with the two additional Shapeys on the right side of the pool. In some embodiments, the number of pools, number of Shapeys, and the final numerals are variable (up to 20, 30, 40, 50, 60, 70, 80, 90, 100, etc.)

Modification of scaffolding, feedback, and/or content of a learning activity is suitably executed by the learning activity modification module at various intervals. For example, in some embodiments, the learning activity modification module varies the scaffolding, feedback, and/or content of a learning activity after each learner interaction with a learning activity. In yet other embodiments, the learning activity modification module varies the scaffolding, feedback, and/or content of a learning activity in real-time, continuously, or substantially continuously. In embodiments where the platforms, systems, media, and methods described herein include an offline mode, the learning activity modification module stores learner data locally and varies the scaffolding, feedback, and/or content of a learning activity for an individual learner only when the application has network connectivity.

Offline Mode

In online learning, or e-learning, a learner participates in learning activities via a computer or mobile device that accesses learning content via a computer network, such as the internet. Because Wi-Fi and cellular networks are not completely ubiquitous and do not have 100% up-time, online learning applications should be able to accommodate learning where network connectivity is weak, spotty, occasional, or non-existent. As such, in some embodiments, the platforms, systems, media, and methods described herein include an offline mode, or use of the same.

In an offline mode, in some cases, performance data for the learner is cached at the local device used by the learner. In such embodiments, learning activities, content, and media are downloaded occasionally, when a network connection is available, or once, upon installation of the application, to enable the offline mode. Also, in such embodiments, the learning activity selection module and the learning activity modification module access the cached performance data. In further embodiments, the learning activity selection module and the learning activity modification module access the performance data for the learner occasionally, when a network connection is available, or once, upon installation of the application, to enable the offline mode.

In some embodiments, in an offline mode, a client-side learning activity selection and/or modification applications continue to operate based on learner data cached at the local device. However, in an offline mode, in some embodiments, a server-side learning activity selection and/or modification applications pause operation until a network connection is available.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft Windows®, Apple Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 22:
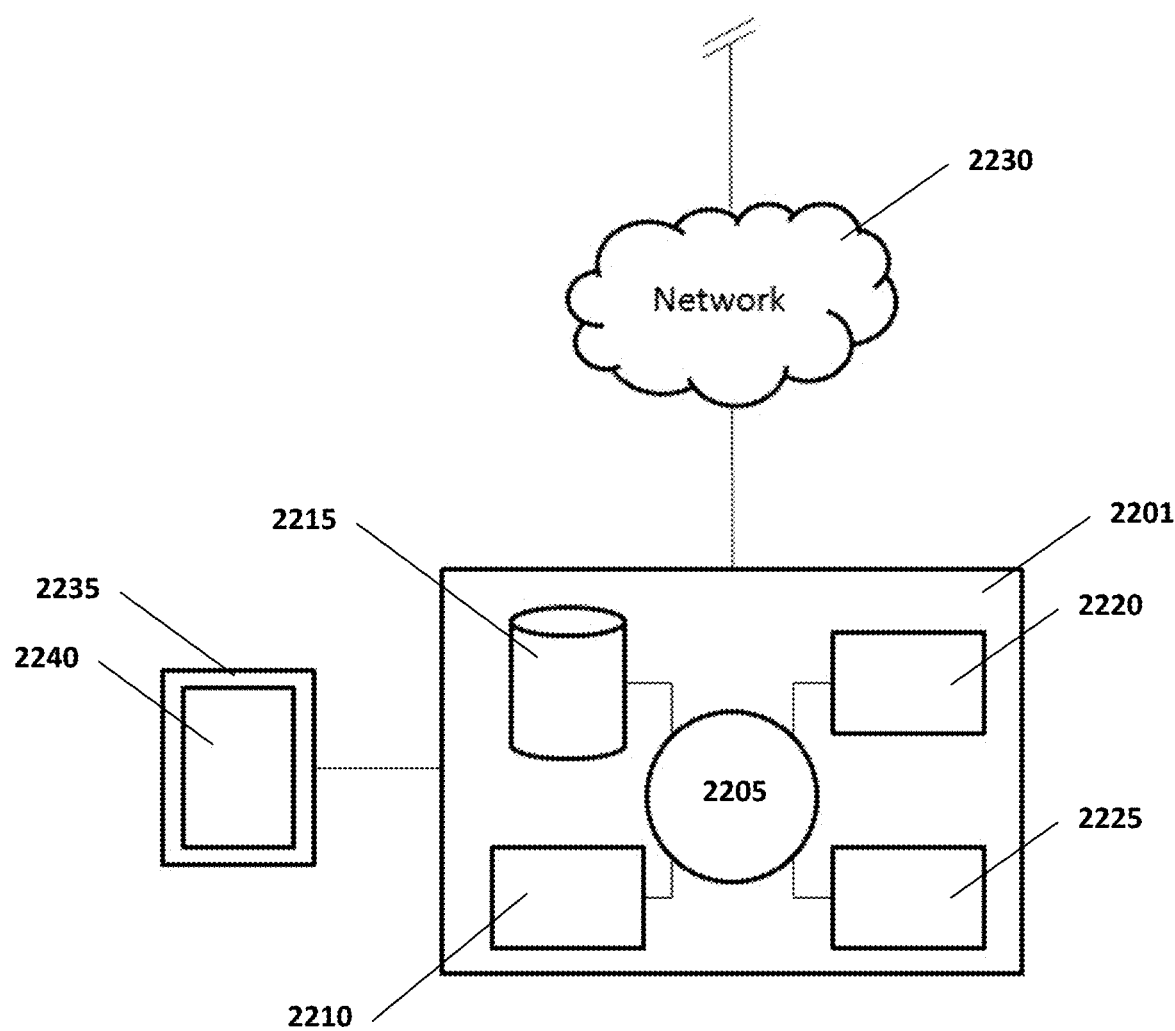
FIG. 22 shows a non-limiting example of a digital processing device; in this case, a device with one or more CPUs, a memory, a communication interface, and a display.

Referring to FIG. 22, in a particular embodiment, an exemplary digital processing device 1901 is programmed or otherwise configured to select and customize learning activities for an individual learner based on past and current learner performance data. The device 2201 can regulate various aspects of the adaptive learning of the present disclosure, such as, for example, applying dynamic personalized adaptations to select learning content, suitable scaffolding, and suitable feedback for individual learners. In this embodiment, the digital processing device 2201 includes a central processing unit (CPU, also "processor" and "computer processor" herein) 2205, which can be a single core or multi core processor, or a plurality of processors for parallel processing. The digital processing device 2201 also includes memory or memory location 2210 (e.g., random-access memory, read-only memory, flash memory), electronic storage unit 2215 (e.g., hard disk), communication interface 2220 (e.g., network adapter) for communicating with one or more other systems, and peripheral devices 2225, such as cache, other memory, data storage and/or electronic display adapters. The memory 2210, storage unit 2215, interface 2220 and peripheral devices 2225 are in communication with the CPU 2205 through a communication bus (solid lines), such as a motherboard. The storage unit 2215 can be a data storage unit (or data repository) for storing data. The digital processing device 2201 can be operatively coupled to a computer network ("network") 2230 with the aid of the communication interface 2220. The network 2230 can be the Internet, an internet and/or extranet, or an intranet and/or extranet that is in communication with the Internet. The network 2230 in some cases is a telecommunication and/or data network. The network 2230 can include one or more computer servers, which can enable distributed computing, such as cloud computing. The network 2230, in some cases with the aid of the device 2201, can implement a peer-to-peer network, which may enable devices coupled to the device 2201 to behave as a client or a server.

Continuing to refer to FIG. 22, the CPU 2205 can execute a sequence of machine-readable instructions, which can be embodied in a program or software. The instructions may be stored in a memory location, such as the memory 2210. The instructions can be directed to the CPU 2205, which can subsequently program or otherwise configure the CPU 2205 to implement methods of the present disclosure. Examples of operations performed by the CPU 2205 can include fetch, decode, execute, and write back. The CPU 2205 can be part of a circuit, such as an integrated circuit. One or more other components of the device 2201 can be included in the circuit. In some cases, the circuit is an application specific integrated circuit (ASIC) or a field programmable gate array (FPGA).

Continuing to refer to FIG. 22, the storage unit 2215 can store files, such as drivers, libraries and saved programs. The storage unit 2215 can store user data, e.g., user preferences and user programs. The digital processing device 2201 in some cases can include one or more additional data storage units that are external, such as located on a remote server that is in communication through an intranet or the Internet.

Continuing to refer to FIG. 22, the digital processing device 2201 can communicate with one or more remote computer systems through the network 2230. For instance, the device 2201 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Methods as described herein can be implemented by way of machine (e.g., computer processor) executable code stored on an electronic storage location of the digital processing device 2201, such as, for example, on the memory 2210 or electronic storage unit 2215. The machine executable or machine readable code can be provided in the form of software. During use, the code can be executed by the processor 2205. In some cases, the code can be retrieved from the storage unit 2215 and stored on the memory 2210 for ready access by the processor 2205. In some situations, the electronic storage unit 2215 can be precluded, and machine-executable instructions are stored on memory 2210.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 23:
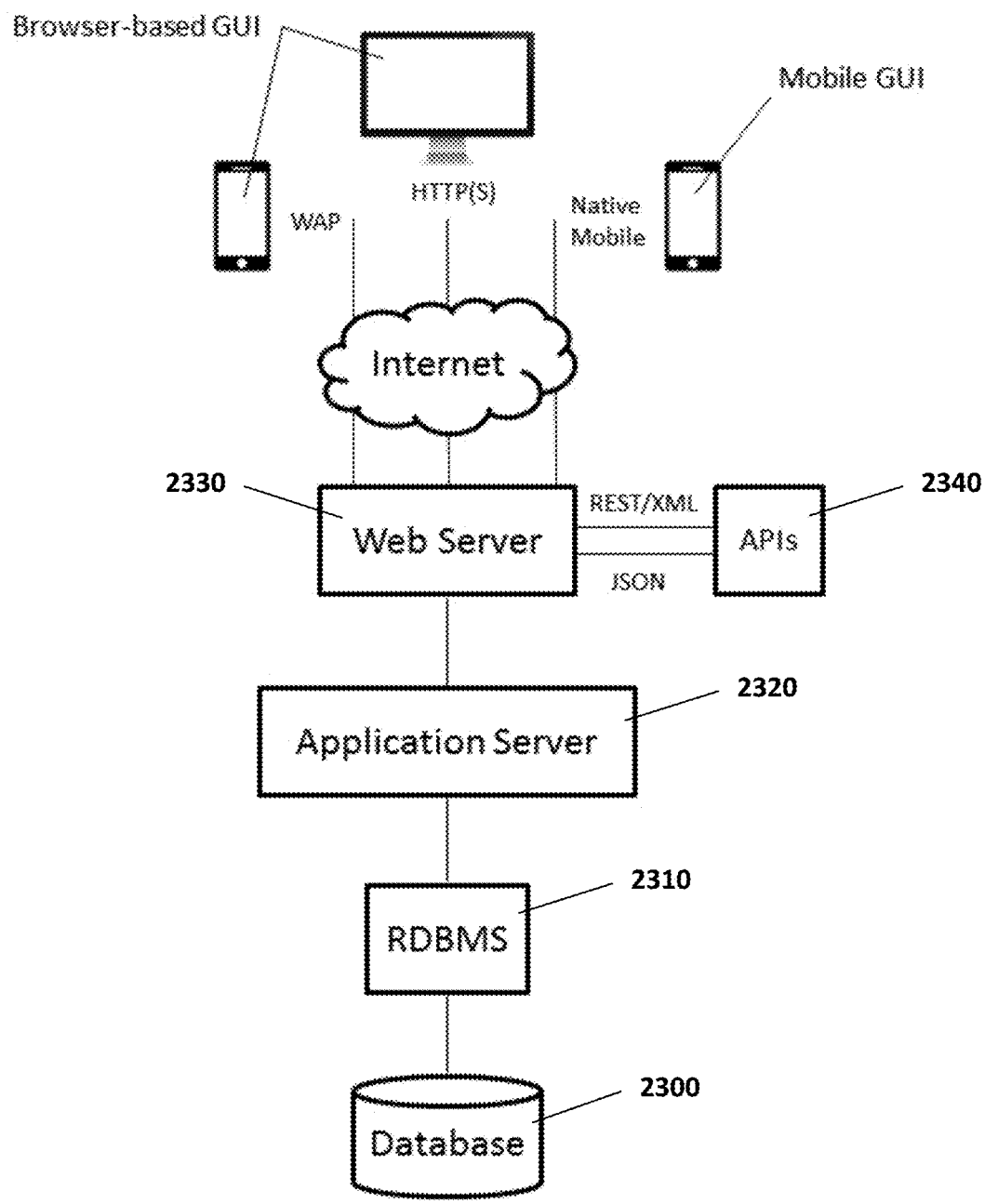
FIG. 23 shows a non-limiting example of a web/mobile application provision system; in this case, a system providing browser-based and/or native mobile user interfaces.

Referring to FIG. 23, in a particular embodiment, an application provision system comprises one or more databases 2300 accessed by a relational database management system (RDBMS) 2310. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 2320 (such as Java servers, .NET servers, PHP servers, and the like) and one or more web servers 2330 (such as Apache, IIS, GWS and the like). The web server(s) optionally expose one or more web services via app application programming interfaces (APIs) 2340. Via a network, such as the Internet, the system provides browser-based and/or mobile native user interfaces.

Figure 24:
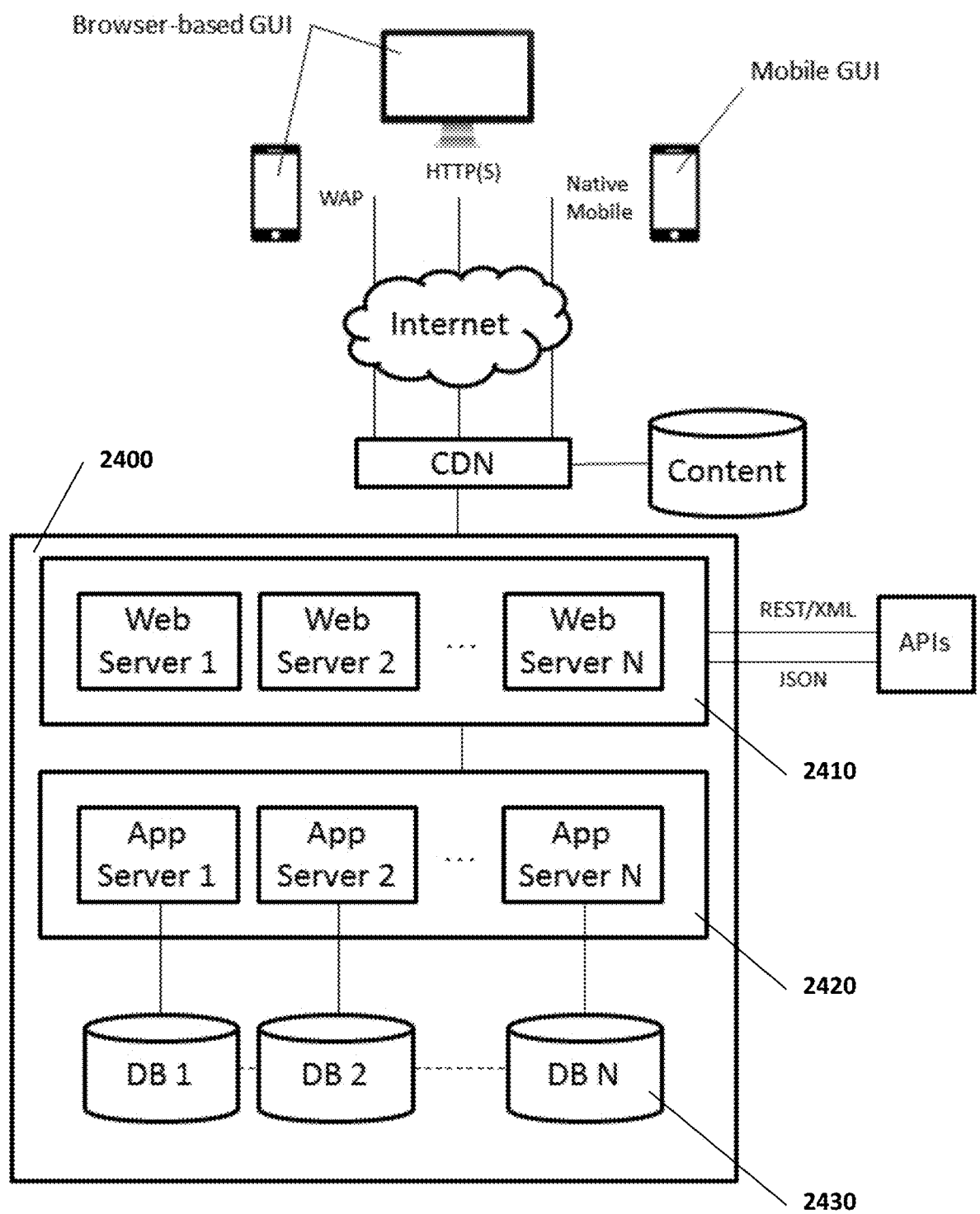
FIG. 24 shows a non-limiting example of a cloud-based web/mobile application provision system; in this case, a system comprising an elastically load balanced, auto-scaling web server and application server resources as well as synchronously replicated databases.
Figure 25:
FIG. 25 shows a non-limiting example of a graphic user interface; in this case, a screenshot of a learning activity related to addition.
Figure 26:
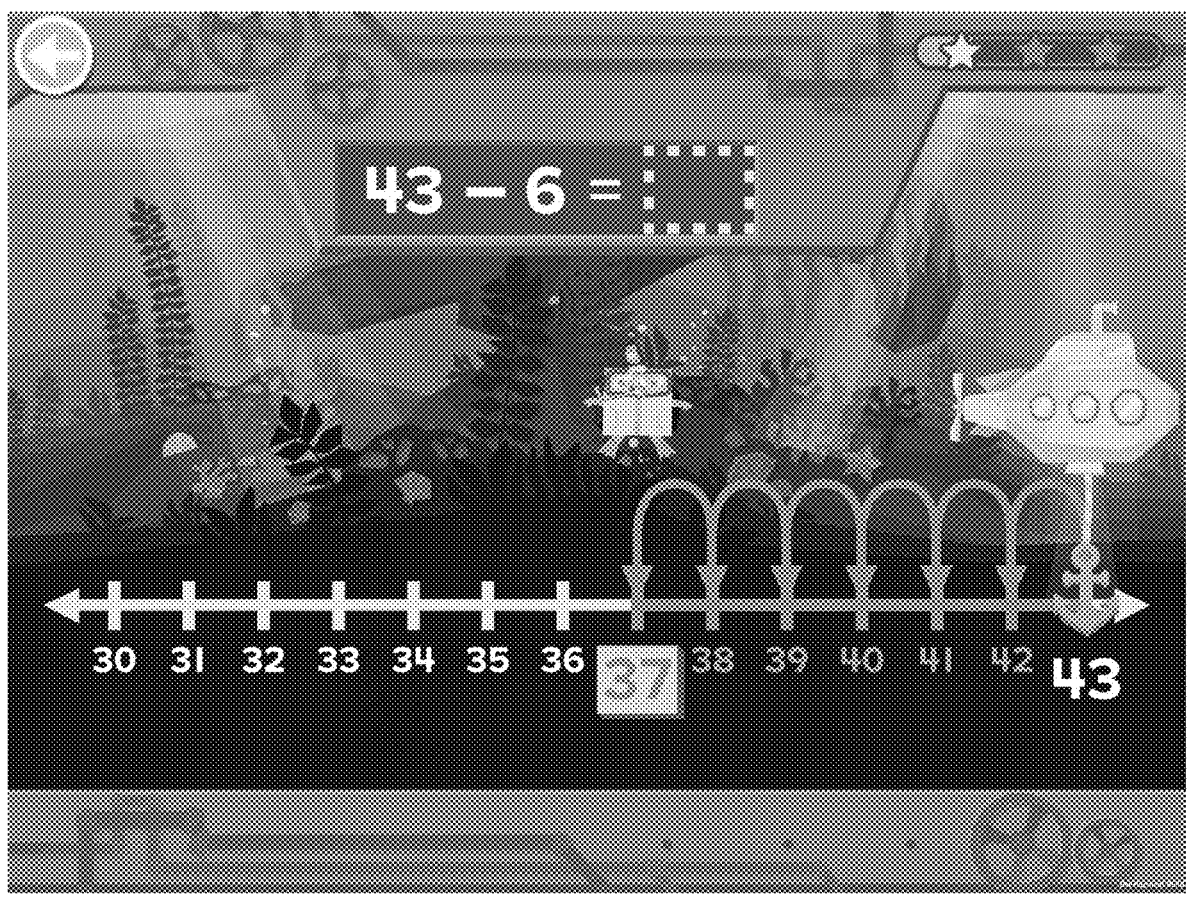
FIG. 26 shows a non-limiting example of a graphic user interface; in this case, a screenshot of a learning activity related to subtraction.
Figure 27:
FIG. 27 shows a non-limiting example of a graphic user interface; in this case, a screenshot of a learning activity related to fractions.
Figure 28:
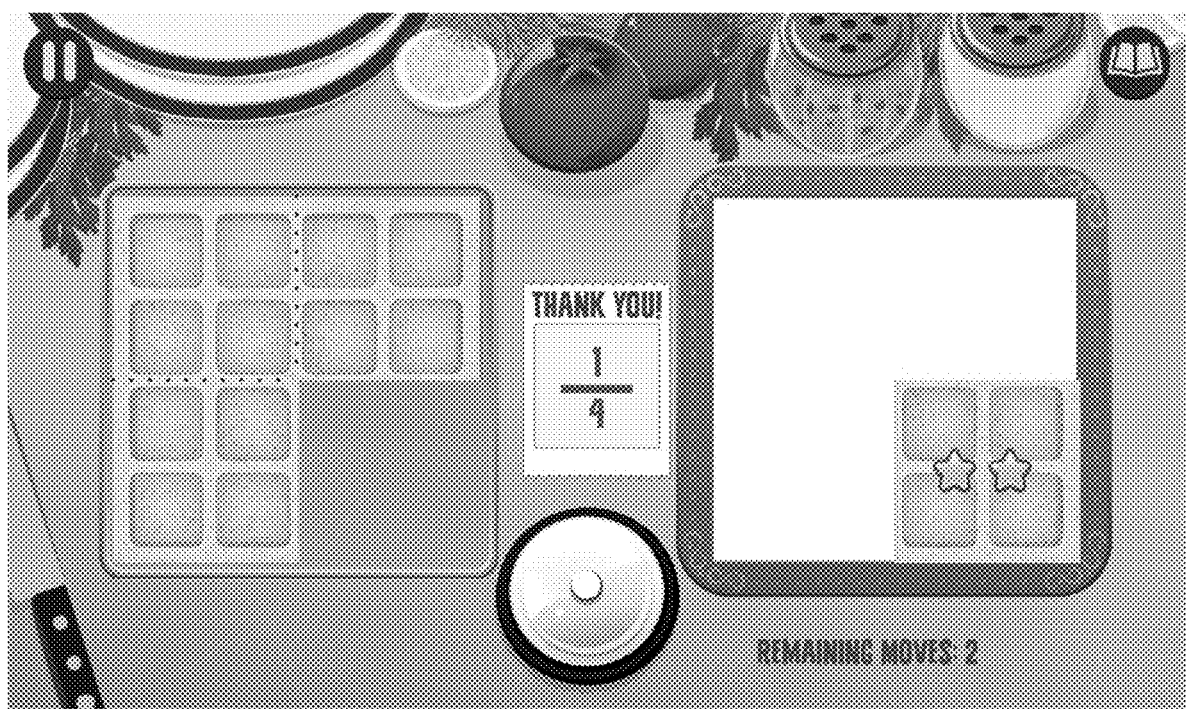
FIG. 28 shows a non-limiting example of a graphic user interface; in this case, a screenshot of a learning activity related to fractions.
Figure 29:
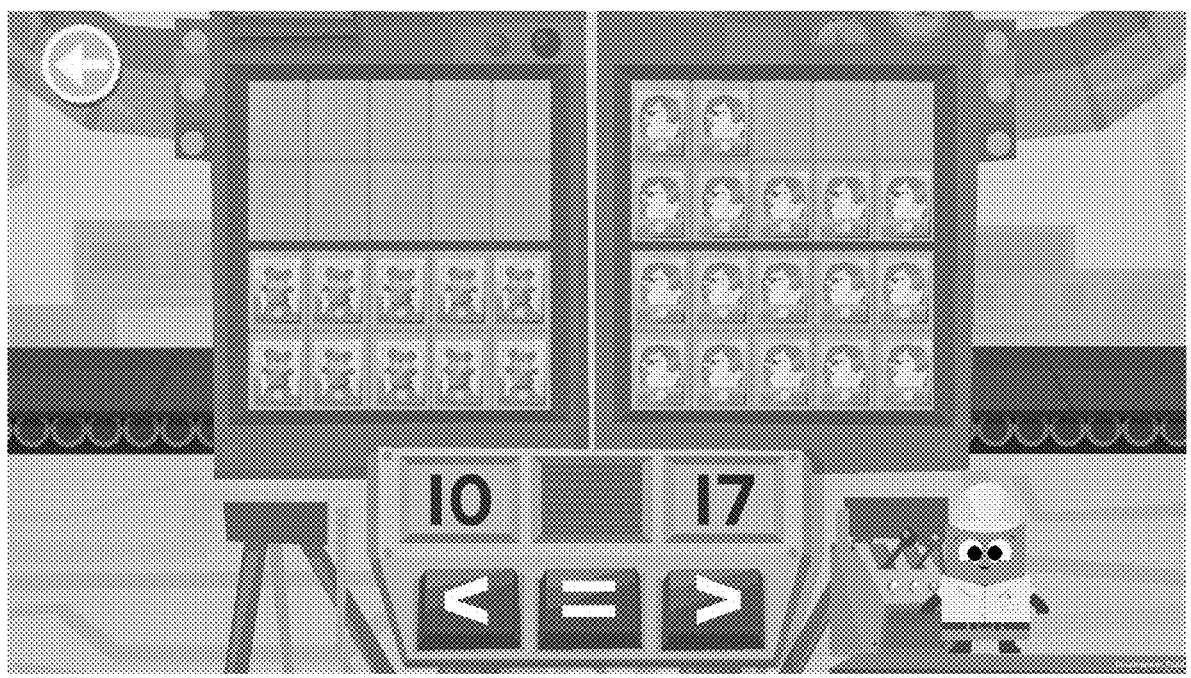
FIG. 29 shows a non-limiting example of a graphic user interface; in this case, a screenshot of a learning activity related to mathematics.

Referring to FIG. 24, in a particular embodiment, an application provision system alternatively has a distributed, cloud-based architecture 2400 and comprises elastically load balanced, auto-scaling web server resources 2410 and application server resources 2420 as well synchronously replicated databases 2430.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of knowledge map, learning objective, learning activity, or learner performance information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way.

Example 1—Trees Learning Activity Teaching Numeral Fluency

The trees learning activity teaches learners how to identify numbers between 1 and 30 by playing Shapey Tag. In the game, the Host Shapey yells out numbers that should be tagged while the learner searches for them and taps each one. Each round has three Shapeys that are taggable. Once tagged, they hop on a bench where the Host Shapey sits. After all three Shapeys are tagged the three go up to the top of a treehouse for a party. By the end of the learning activity the learner sees all the Shapeys celebrating in the treehouse.

The trees learning activity is directed to a data learning objective and uses a memorization node algorithm. If the learner is idle, feedback is provided. For example, if the learner is idle for 10 seconds a voice over is provided; if the learner is idle for 30 seconds a visual pop-up is provided.

The number of rounds in the activity is based on how many questions the learner got wrong in the associated pretest. The learner will always have helping hand throughout every part of teaching showing them which Shapeys to tap next.

Figure 6A:
FIGS. 6A-6E show a non-limiting example of a core loop for the design of a learning activity; in this case, a learning activity called trees teaching numeral fluency at the Pre-K level.

Referring to FIG. 6A, in this example, at the activity start the learner discovers that they are playing Shapey tag.

Figure 6B:

Referring to FIG. 6B, further in this example, at the round start all the Shapeys run onto the screen from the right.

Figure 6C:

Referring to FIG. 6C, further in this example, during Shapey Tag the Shapeys run on the screen while the learner taps them. As they tap correct Shapeys they jump up to the bench to sit with Host Shapey.

Figure 6D:

Referring to FIG. 6D, further in this example, at the round end all tagged Shapeys climb up to the treehouse.

Figure 6E:

Referring to FIG. 6E, further in this example, at the activity end the camera pans up to show four Shapeys celebrating in a random treehouse.

Figure 6F:
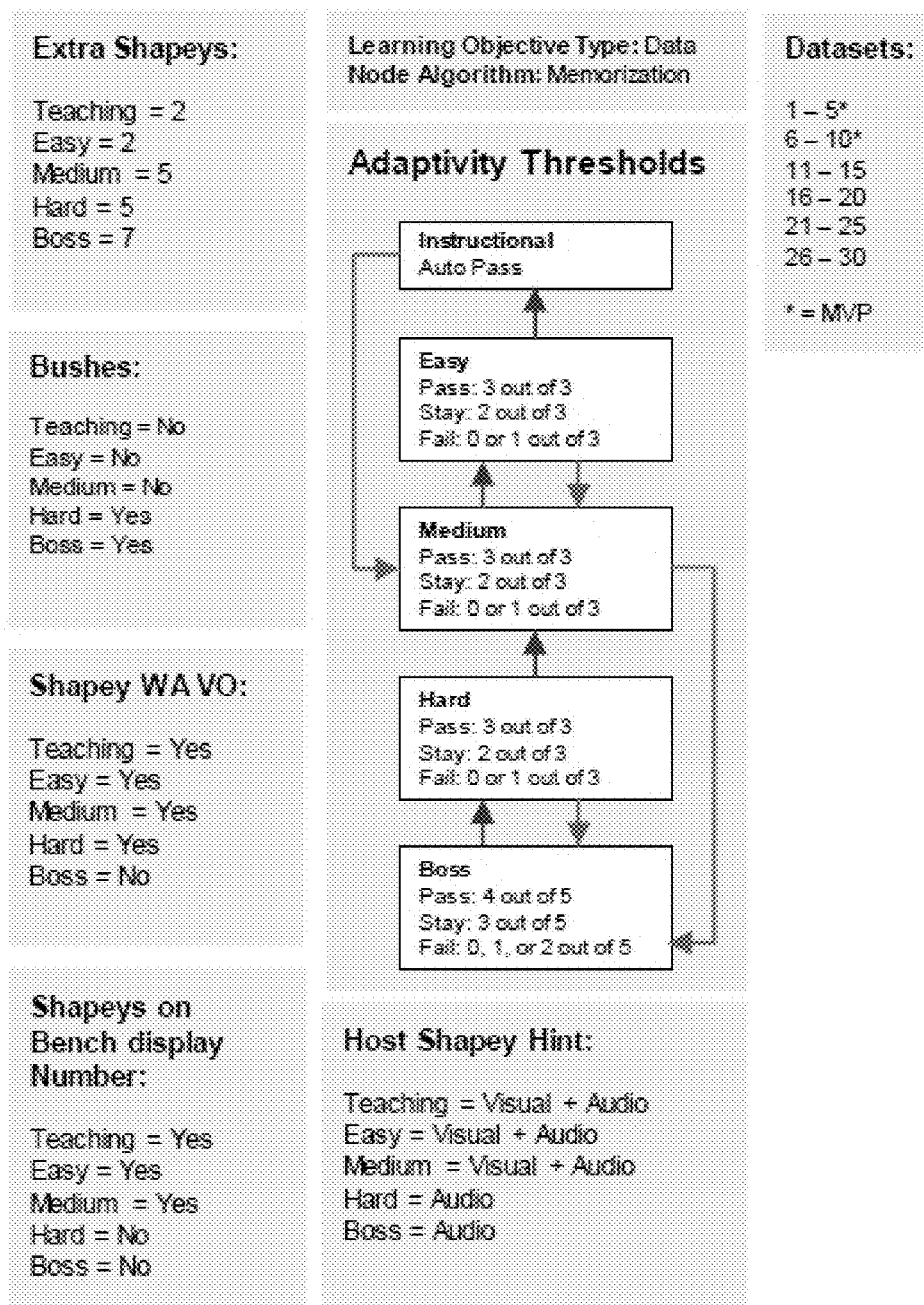
FIG. 6F shows a non-limiting example of back end game design parameters for a learning activity; in this case, back end game design parameters for the learning activity of FIGS. 6A-6E.

Referring to FIG. 6F, in this example, the learning activity has multiple phases, which include pretest, teaching (e.g., instructional), three levels of practice (easy, medium, and hard), and boss (e.g., final demonstration of mastery). The level of scaffolding and feedback are variable, based on the phase. For example, the number of extra Shapeys, the presence of bushes, the presence of Shapey voice overs, whether the Shapeys on the bench display a number, and type of hints provided by the Host Shapey vary based on the phase. Also, in this example, the adaptivity of the learning activity is mapped. For example, the teaching phase is automatically passed upon completion and the learner is presented with the medium practice phase. If the learner fails the medium practice phase, they are presented with the easy practice phase. If the learner passes the medium practice phase, they are presented with the boss phase. If the learner fails the boss phase, they descend through the practice phases and may end up in back in the teaching phase.

Example 2—Horses Learning Activity Teaching Count Sequences

The horses learning activity teaches learners how to count forward from 1 to 20 by getting Shapeys ready for stage performances. In this learning activity, there are five Shapeys who will perform on horses, but some of the Shapeys need to be on their horses! The learner drags Shapeys onto appropriate horses by counting forward in four different datasets. Once all of the Shapeys are on their horses, the learner taps a done button to finish a round. By the end of an activity, the learner will see the Shapeys do a final performance on the mainstage!

The horses learning activity is directed to a data learning objective and uses a mistakes node algorithm. If the learner is idle, feedback is provided. For example, if the learner is idle for 10 seconds a voice over is provided; if the learner is idle for 30 seconds a visual pop-up is provided.

The teaching flow in the horses learning activity is: Round 0—All Horses already have Shapeys; Round 1 (E)—The fourth horse is missing a Shapey; Round 2 (E)—The fifth horse is missing a Shapey; and Round 3 (H)—The second horse is missing a Shapey. Learners will always have helping hand throughout every part of teaching. The learner is instructed to tap each horse to count them at the beginning of every round, excluding Round 0.

Figure 7A:
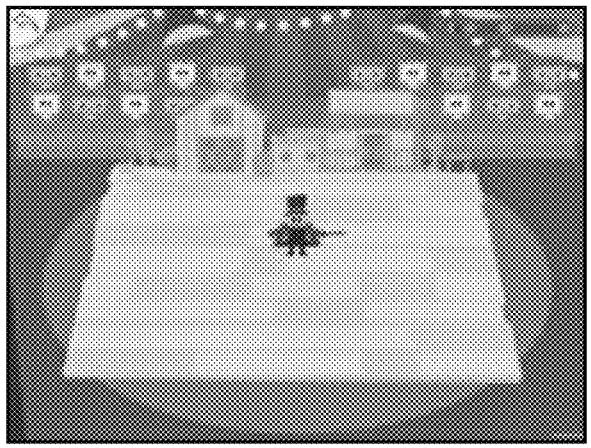
FIGS. 7A-7E show a non-limiting example of a core loop for the design of a learning activity; in this case, a learning activity called horses teaching count sequences at the Pre-K level.

Referring to FIG. 7A, in this example, at the activity start the learner discovers that the Shapeys are performing, but they aren't ready.

Figure 7B:
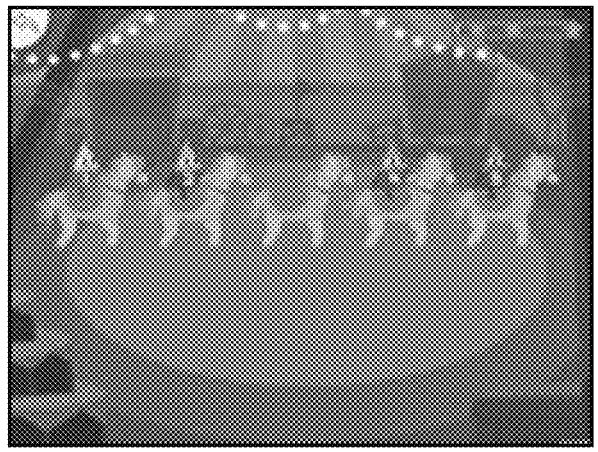

Referring to FIG. 7B, further in this example, at the round start all 5 horses run onto the screen from left to right and count off one at a time. Horse costume will be based on the dataset addressed by the learning activity.

Figure 7C:
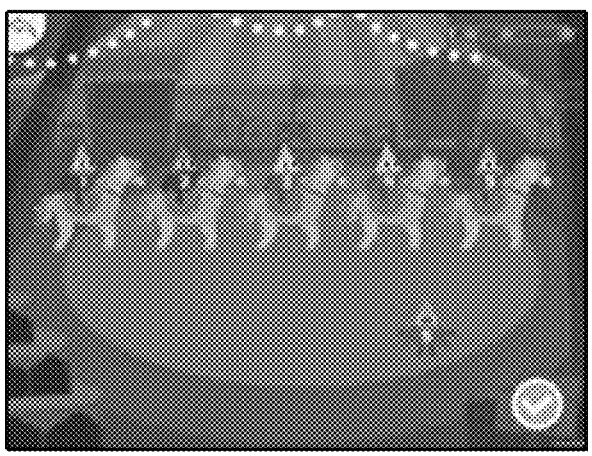

Referring to FIG. 7C, further in this example, at the Shapey placement phase Shapeys appear based on Answer Key Rules per Level. The learner drags Shapeys onto the horses. After all horses have Shapeys, a done button appears to end the round.

Figure 7D:
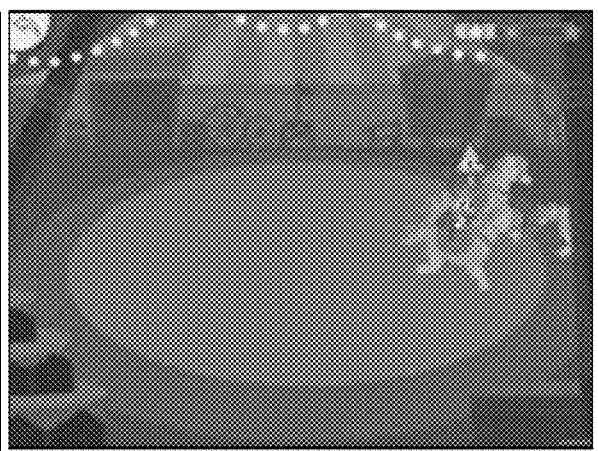

Referring to FIG. 7D, further in this example, at the round end all of the Shapeys exit the screen to the right to go to the mainstage.

Figure 7E:
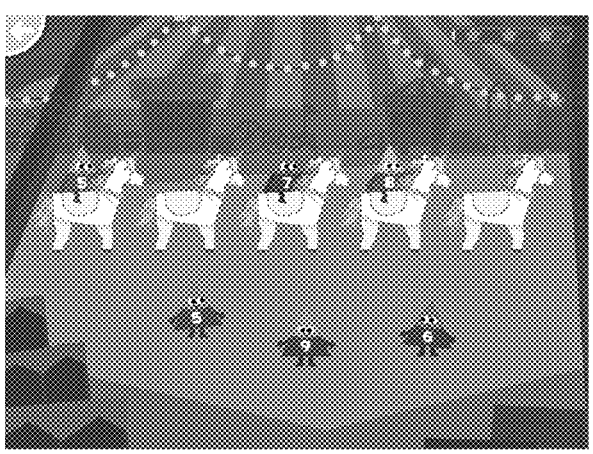

Referring to FIG. 7E, further in this example, at the activity end the camera pans over to the right to show the Shapeys doing their final performance.

Referring to FIG. 7F, in this example, the learning activity has multiple phases, which include pretest, teaching (e.g., instructional), three levels of practice (easy, medium, and hard), and boss (e.g., final demonstration of mastery). The level of scaffolding and feedback are variable, based on the phase. In this example, the adaptivity of the learning activity is mapped. For example, the teaching phase is automatically passed upon completion and the learner is presented with the medium practice phase. If the learner fails the medium practice phase, they are presented with the easy practice phase. If the learner passes the medium practice phase, they are presented with the boss phase. If the learner fails the boss phase, they descend through the practice phases and may end up in back in the teaching phase.

Example 3—Balloons Learning Activity Teaching Counting

In the balloons learning activity a gaggle of excited Shapeys have arrived to take a fun trip on a hot air balloon! The learner will need to count the Shapeys and choose the correct balloon for them to ride in. The learner can count off the Shapeys before selecting a balloon that fits the exact number of Shapeys in the scene.

The balloons learning activity is directed to a skill learning objective and uses a mistakes node algorithm. If the learner is idle, feedback is provided. For example, if the learner is idle when counting Shapeys for 10 seconds is voice over is provided; if the learner is idle when counting Shapeys for 30 or 60 seconds a voice over and a helping hand is provided; if the learner is idle when selecting a balloon for 10 seconds a voice over is provided; if the learner is idle when selecting a balloon for 30 seconds a visual pop-up is provided; and if the learner is idle when selecting a balloon for 60 seconds the correct answer is presented (only on easy difficulty).

Figure 8A:
FIGS. 8A-8E show a non-limiting example of a core loop for the design of a learning activity; in this case, a learning activity called balloons teaching counting at the Pre-K level.

Referring to FIG. 8A, in this example, at the activity start Tourist Shapey is all alone in a hot air balloon. The camera pans down, to show many more Shapeys and Balloons waiting to join Tourist Shapey in the air.

Figure 8B:
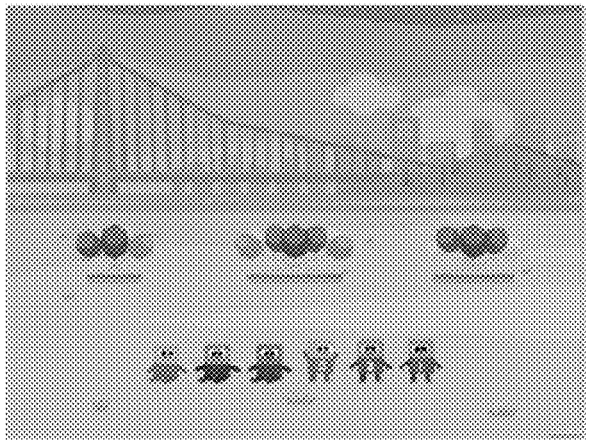

Referring to FIG. 8B, further in this example, at the round start the learner counts the Shapeys. The learner counts all of the Shapeys by tapping on them.

Figure 8C:
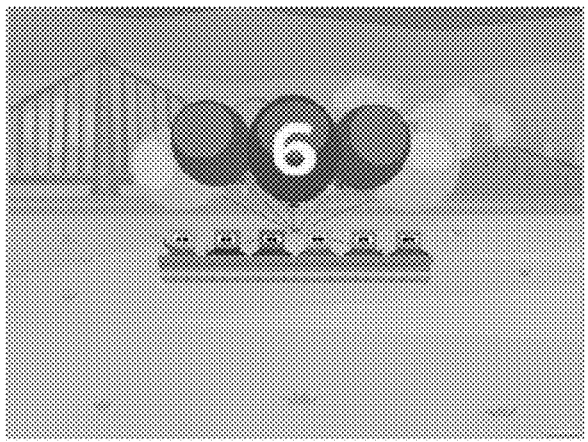

Referring to FIG. 8C, further in this example, the learner next chooses a balloon. After tapping on all the Shapeys, the learner must select the basket that is just the right size. The learner taps on a basket, and the Shapeys all jump into it.

Figure 8D:
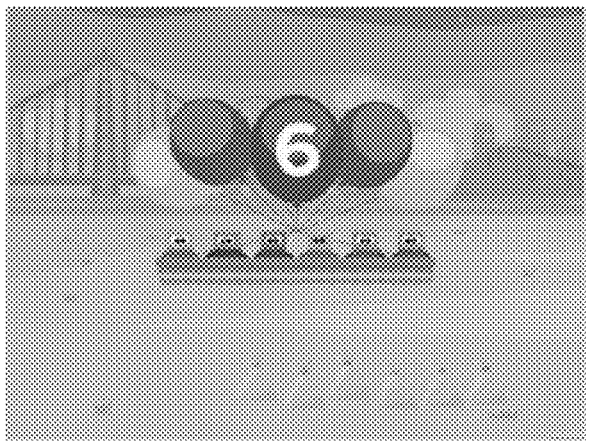

Referring to FIG. 8D, further in this example, at the round end the Shapeys throw ballast out of the basket, and it rises up into the air. The camera pans right, revealing more Shapeys and baskets to count.

Figure 8E:
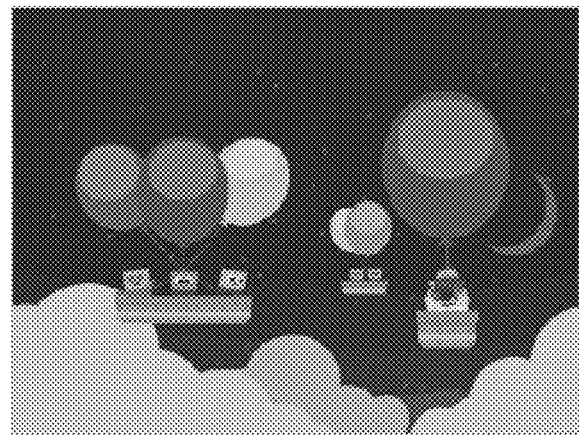
Figure 8F:
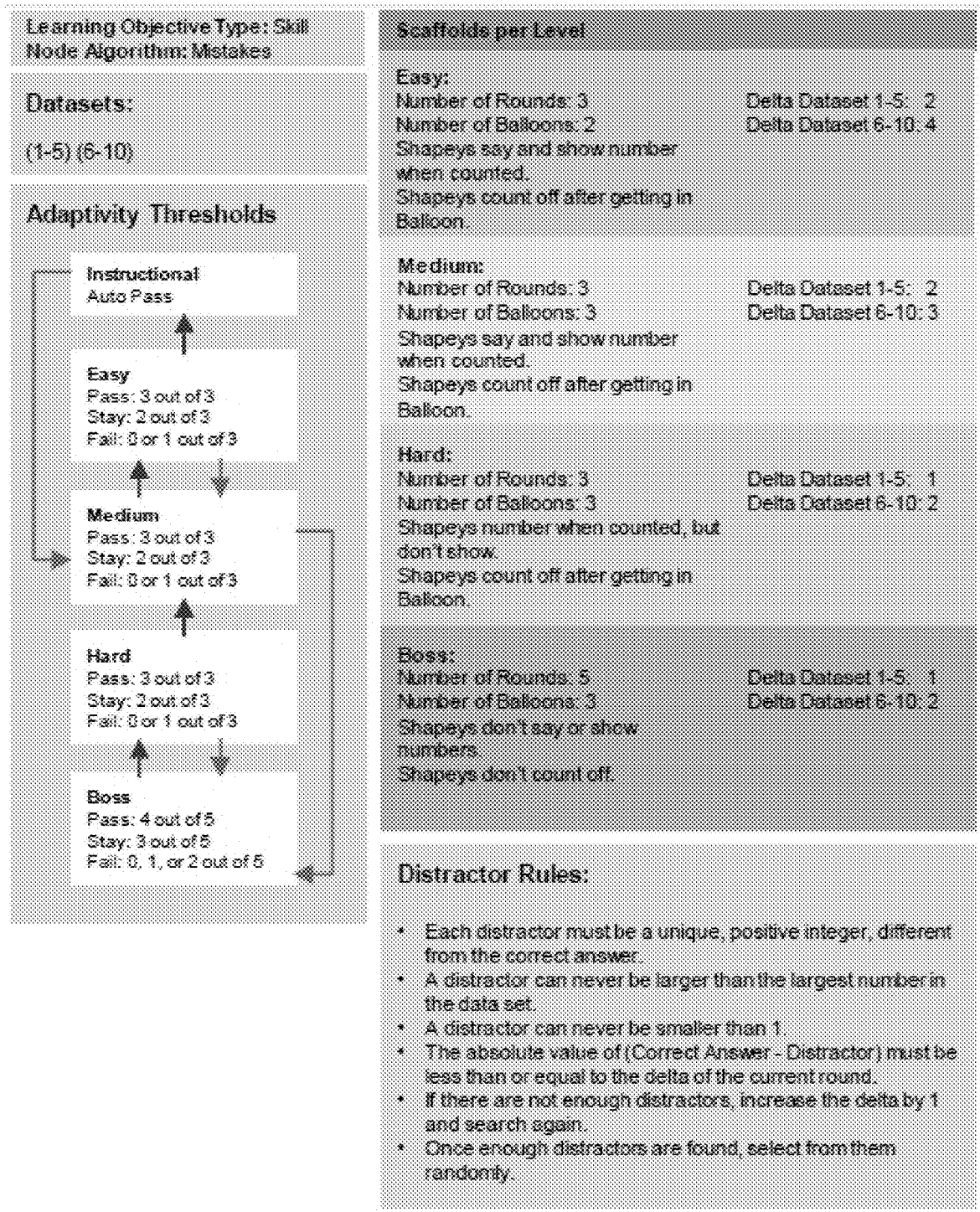
FIG. 8F shows a non-limiting example of back end game design parameters for a learning activity; in this case, back end game design parameters for the learning activity of FIGS. 8A-8E.

Referring to FIG. 8E, further in this example, at the activity end after all the Shapeys are up in the air, the camera pans up. Tourist Shapey is taking pictures with all the other Shapeys.

Referring to FIG. 8F, in this example, the learning activity has multiple phases, which include pretest, teaching (e.g., instructional), three levels of practice (easy, medium, and hard), and boss (e.g., final demonstration of mastery). The level of scaffolding and feedback are variable, based on the phase. For example, the number of rounds, the number of balloons, whether the Shapeys say and/or show their number when counted, whether the Shapeys count off after getting in the balloon, the delta dataset, and the distractor rules vary based on the phase. Also, in this example, the adaptivity of the learning activity is mapped. For example, the teaching phase is automatically passed upon completion and the learner is presented with the medium practice phase. If the learner fails the medium practice phase, they are presented with the easy practice phase. If the learner passes the medium practice phase, they are presented with the boss phase. If the learner fails the boss phase, they descend through the practice phases and may end up in back in the teaching phase.

Example 4—Learner Experience for Number Sense Pretesting at the Pre-K Level

A 4-year-old learner, Prudence, is working on learning number sense at the Pre-K level. She has achieved mastery on her number sense up to 5, but is just starting to learn her numbers up to 10. She is participating in an online personalized mastery learning system on a very small prerequisite map, with just three games. The games are Trees (addressing numeral recognition; see Example 1), Horses (addressing count sequence; see Example 2) and Balloons (addressing counting objects; see Example 1). In this example, Horses is a prerequisite to Balloons: a learner has to know the order numbers come in before they can use that information to count objects; and Trees is on a separate track in the prerequisite map: a learner does not need to be able to read numerals in order to recite a count sequence or to count a set of objects. These rules are reflected in the associated prerequisite map.

Figure 9A:
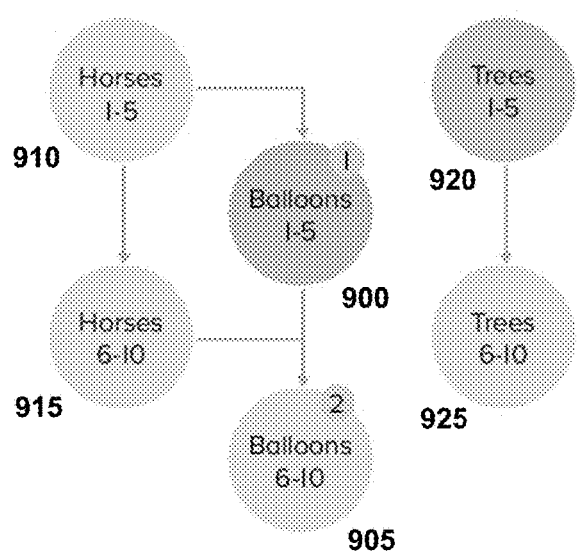
Figure 9B:

As shown in FIG. 9A, in this example, Prudence begins at the start of the map. The map has two keynodes, one of which is Priority 1. We don't know Prudence's level of mastery, so she starts at the Priority 1 node, which is the Balloons 1-5 node. She also starts at the Trees 1-5 node, because it is not preceded by any nodes of equal or higher priority. As shown in FIG. 9B, in this example, Prudence's Hub (e.g., interactive online learning graphic user interface) currently provides access to two learning activities: Balloons Pretest 1-5, and Trees Pretest 1-5.

Figure 10:
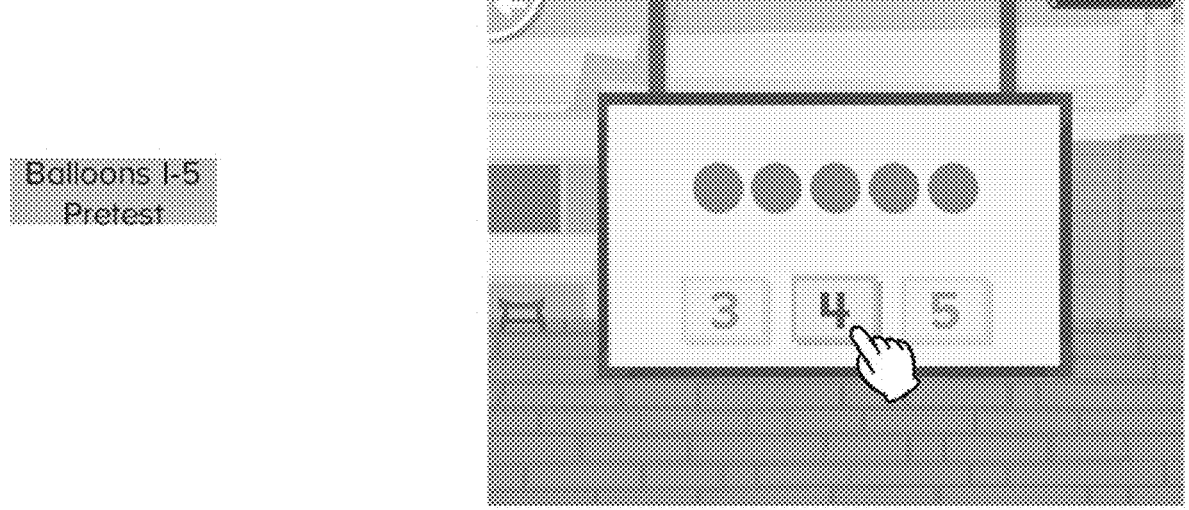

As shown in FIG. 10, in this example, Prudence next taps on the icon in the middle, the Balloons 1-5 pretest. She gets every question right. Way to go, Prudence! She gets credit for the Balloons 1-5 node. She also gets credit for Horses 1-5 because it is a prerequisite to Balloons. If she can do Balloons, we're confident she can do Horses. Now, we check for new pretests.

Figure 11A:
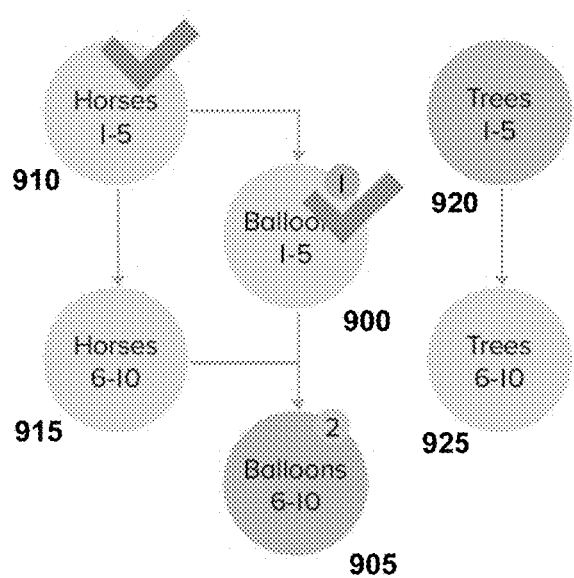
Figure 11B:

As shown in FIG. 11A, in this example, the prerequisite map indicates that Prudence has received credit for the Balloons 1-5 node (a keynode) and the Horses 1-5 node. The Balloons 6-10 learning activity is the next priority keynode on the map and has Priority 2. As shown in FIG. 11B, in this example, the Trees 1-5 pretest stays on Prudence's Hub, because Prudence hasn't done it yet. She also now has access to the Balloons 6-10 learning activity, because it's the next priority keynode on the map. Accordingly, Prudence's Hub provides her with access to two activities: Trees Pretest 1-5, and Balloons Pretest 6-10. She picks Balloons Pretest 6-10.

Figure 12:
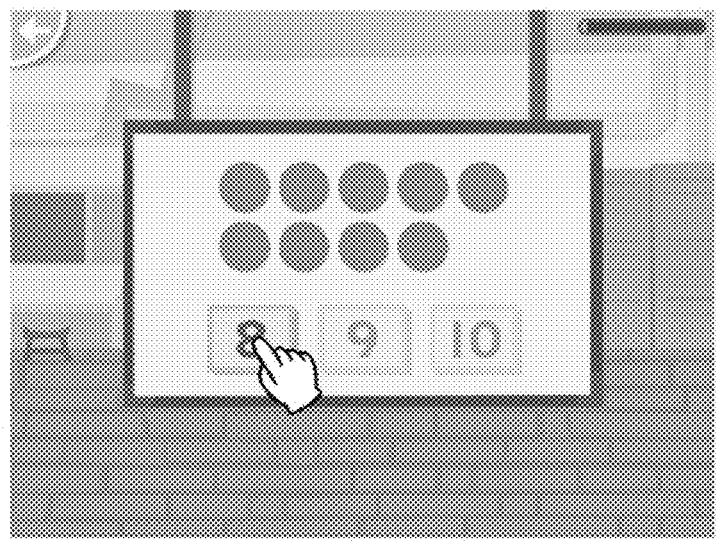

As shown in FIG. 12, in this example, Prudence failed the Balloons 6-10 pretest. That node is now marked as pretested, so it won't come up as a pretest again.

Figure 13A:
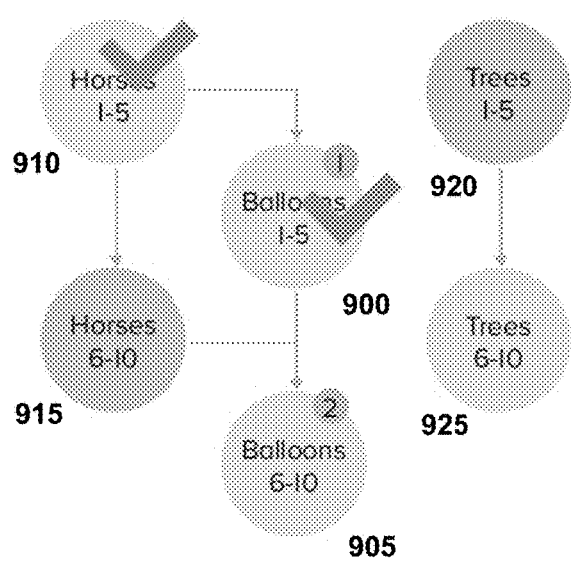
Figure 13B:

As shown in FIG. 13A, in this example, based on the map, Prudence is placed the Horses 6-10 pretest. Horses is a prerequisite to Balloons, and it could be the reason she's having trouble with the harder skill. As shown in FIG. 13B, in this example, Prudence's Hub currently provides her with access to two learning activities: Trees Pretest 1-5 and Horses Pretest 6-10. She picks Horses Pretest 6-10.

Figure 14:
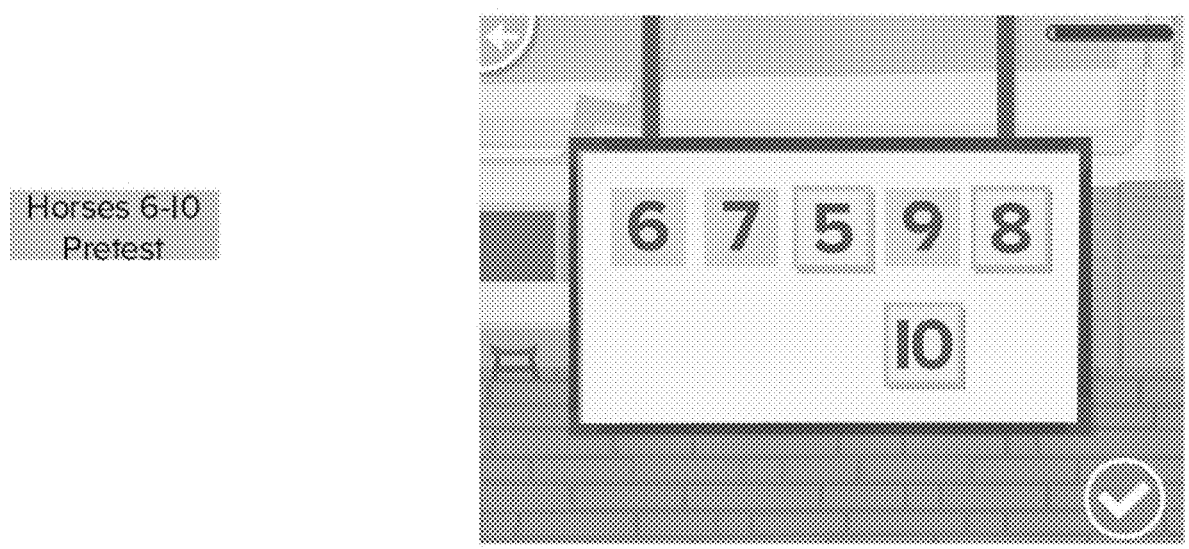

As shown in FIG. 14, in this example, Prudence failed the Horses 6-10 pretest. It looks like that was indeed the reason she had trouble with Balloons.

As shown in FIG. 15A, in this example, since there are no available prerequisite nodes to pretest according to the map, Prudence is placed in Horses 6-10, at the Teaching phase. As shown in FIG. 15B, in this example, Prudence's Hub currently has two activities: Trees Pretest 1-5, and Horses Teaching 6-10. She likes the scientist character, so she continues picking pretest activities to play.

Figure 16:
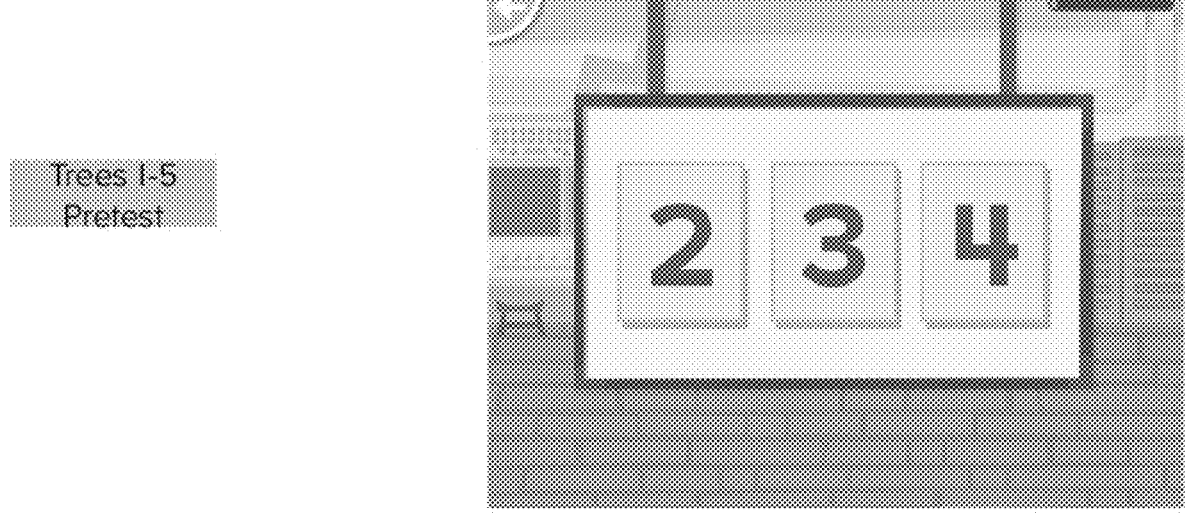

As shown in FIG. 16, in this example, Prudence now starts down the other leg of the map. She plays the Trees 1-5 pretest. She succeeds with a perfect score.

Figure 17A:
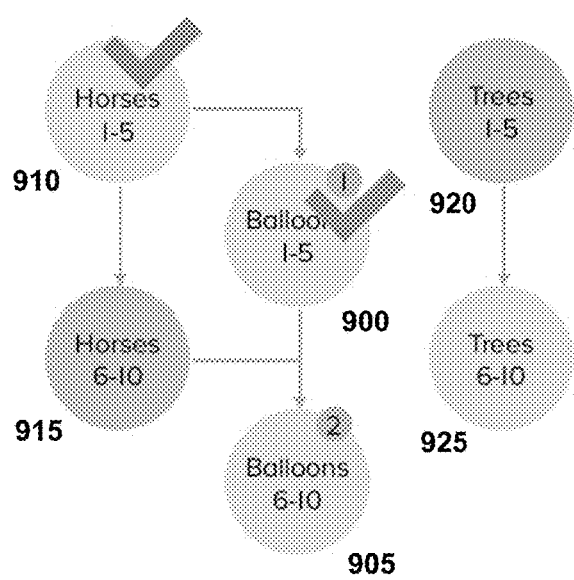
Figure 17B:

As shown in FIG. 17A, in this example, the Trees 1-5 game is a Data game, which means it uses slightly different logic. Instead of moving directly on to the next node, Prudence will first confirm her knowledge by playing the Trees 1-5 Boss activity. As shown in FIG. 17B, in this example, Prudence's Hub currently provides access to two activities: Trees Boss 1-5 and Horses Teaching 6-10.

Figure 18:

As shown in FIG. 18, in this example, Prudence participates in the Trees 1-5 Boss activity and also got a perfect score. Good work, Prudence! Now, her final pretest, Trees 6-10, is activated.

Figure 19A:
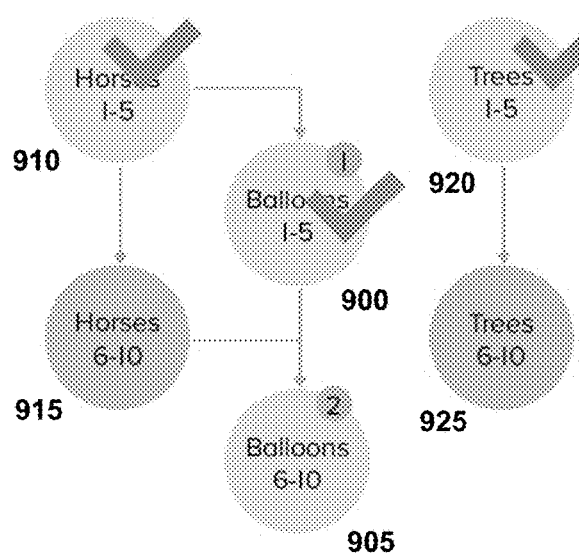
Figure 19B:

As shown in FIG. 19A, in this example, the prerequisite map reflects that Prudence has received credit for Balloons 1-5, Horses 1-5, and Trees 1-5. She is working on Trees 6-10 and must first complete the pretest. As shown in FIG. 19B, in this example, Prudence's Hub currently provides access to two activities: Trees Pretest 6-10 and Horses Teaching 6-10.

Figure 20:

As shown in FIG. 20, in this example, Prudence missed a couple of numbers in the Trees 6-10 pretest.

Figure 21A:
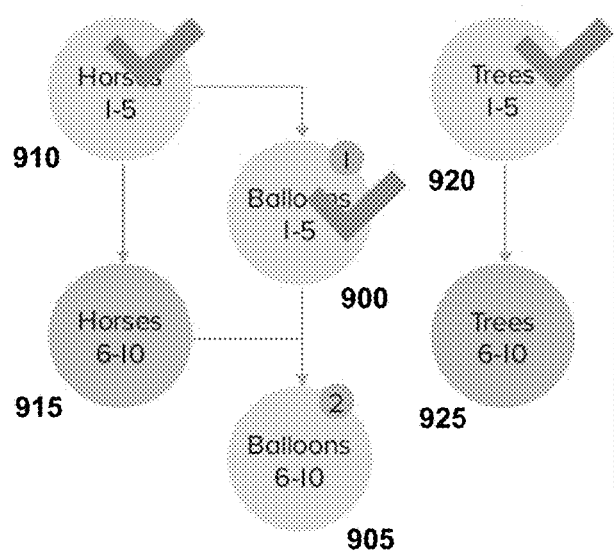
Figure 21B:
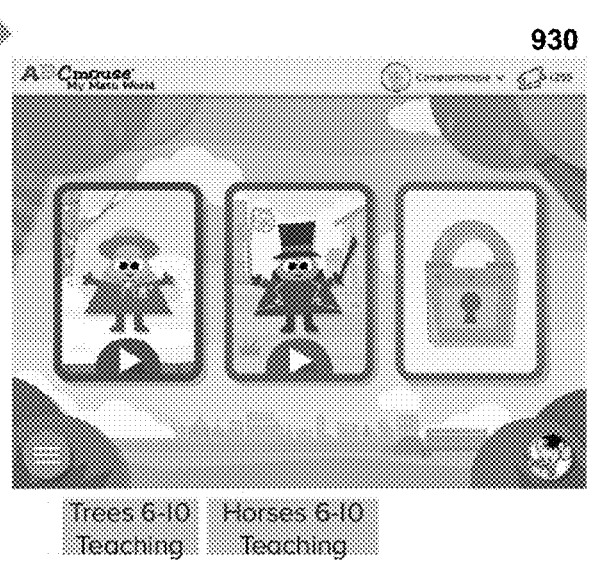

As shown in FIG. 21A, in this example, Prudence is now placed at the Teaching phase of Trees 6-10 according to the map, but will only be taught the numbers she missed. As shown in FIG. 21B, in this example, Prudence's Hub currently provides access to two activities: Trees Teaching 6-10 and Horses Teaching 6-10. Prudence is now completely done with pretesting and her current node on the map, based on her level of mastery, is identified. From here on out, she will progress forward through the nodes, per pass/fail rules described in Examples 1-3 and FIGS. 6F, 7F, and 8F.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A computer-implemented system comprising: a digital processing device comprising: at least one processor, an operating system configured to perform executable instructions, a memory, and a computer program including instructions executable by the digital processing device to create a personalized mastery e-learning application comprising:
   a) a knowledge map describing a subject or topic at a level of learning, the knowledge map comprising a plurality of nodes, each node representing at least one learning objective, wherein the nodes are arranged in the knowledge map hierarchically and so as to represent prerequisite relationships between learning objectives;
   b) a plurality of learning activities, each learning activity comprising one or more graphical user interface (GUI) elements and dynamically variable scaffolding, feedback, and content;
   c) a data storage associating one or more of the nodes with one or more of the learning activities;
   d) an analytics engine generating learner data based on a learner's previous performance from past learning activities;
   e) a learning activity selection module identifying at least one current node on the map for the learner based on the generated learner data and using the at least one current node, generated learner data, and the data storage to select one or more learning activities for the learner; and
   f) a learning activity modification module dynamically varying the scaffolding, feedback, and content on a learning activity GUI of at least one selected learning activity based on the learner's interaction with one or more GUI elements on the learning activity GUI, wherein the dynamic variance of the scaffolding comprises modifying one or more GUI elements within the learning activity of the learning activity GUI until the learner achieves mastery.

2. The system of claim 1, wherein the dynamically variable scaffolding comprises a mode where no scaffolding is provided, a mode where some scaffolding is provided, and a mode where maximum scaffolding is provided.

3. The system of claim 1, wherein scaffolding further comprises modifying an underlying parameter of the at least one selected learning activity.

4. The system of claim 1, wherein the modifying of one or more GUI elements comprises adding, removing, relocating, changing, or manipulating the one or more GUI elements.

5. The system of claim 1, wherein the dynamic variance of the scaffolding comprises modifying one or more audio elements within the learning activity.

6. The system of claim 1, wherein the at least one selected learning activity comprises an airplane game configured to teach composition up to 20, wherein the airplane game comprises an airplane GUI element.

7. The system of claim 6, wherein the modifying of one or more GUI elements comprises adding or removing one or more window GUI elements on the airplane GUI element.

8. The system of claim 1, wherein the at least one selected learning activity comprises a farming game configured to teach counting forward and backward in a row on a number chart, wherein the farming game comprises a numbers chart GUI element.

9. The system of claim 8, wherein the modifying of one or more GUI elements comprises adding or removing one or more arrow GUI elements on the chart GUI element.

10. The system of claim 8, wherein the modifying of one or more GUI elements comprises adding or removing pumpkin GUI elements on the chart GUI element.

11. The system of claim 8, wherein the modifying of one or more GUI elements comprises adding or removing numeral GUI elements on the chart GUI element.

12. The system of claim 11, wherein the modifying of one or more GUI elements comprises changing one or more colors of the numeral GUI elements.

13. The system of claim 1, wherein the at least one selected learning activity comprises a parade game configured to teach counting forward, wherein the parade game comprises a float GUI element.

14. The system of claim 13, wherein the modifying of one or more GUI elements comprises having one or more non-playable characters sitting or standing in front of the float GUI element.

15. The system of claim 13, wherein the modifying of one or more GUI elements comprises adding or removing one or more rows of non-playable characters over the float GUI element.

16. The system of claim 1, wherein the at least one selected learning activity comprises a circus game configured to teach counting forward, wherein the circus game comprises a non-playable character standing on a tightrope GUI element.

17. The system of claim 1, wherein the at least one selected learning activity comprises a warehouse game configured to teach less than, greater than, or equal to symbols, wherein the warehouse game comprises one or more crane GUI elements, one or more warehouse box GUI elements, a greater than sign GUI element, an equal sign GUI element, and a less than sign GUI element.

18. The system of claim 17, wherein the modifying of one or more GUI elements comprises displaying a warehouse window pane over some or all of the one or more warehouse box GUI elements.

19. The system of claim 17, wherein the modifying of one or more GUI elements comprises having the one or more crane GUI elements pick up one or more warehouse box GUI elements.

20. The system of claim 1, wherein the at least one selected learning activity comprises a waterslide game configured to teach counting, wherein the waterslide game comprises a waterslide GUI element and a swimming pool lane divider GUI element.

21. Non-transitory computer-readable storage media encoded with a computer program including instructions executable by a processor to create a personalized mastery e-learning application comprising:
   a) a knowledge map describing a subject or topic at a level of learning, the knowledge map comprising a plurality of nodes, each node representing at least one learning objective, wherein the nodes are arranged in the knowledge map hierarchically and so as to represent prerequisite relationships between learning objectives;
   b) a plurality of learning activities, each learning activity comprising one or more graphical user interface (GUI) elements and dynamically variable scaffolding, feedback, and content;
   c) a data storage associating one or more of the nodes with one or more of the learning activities;
   d) an analytics engine generating learner data based on a learner's previous performance from past learning activities;
   e) a learning activity selection module identifying at least one current node on the map for the learner based on the generated learner data and using the at least one current node, generated learner data, and the data storage to select one or more learning activities for the learner; and
   f) a learning activity modification module dynamically varying the scaffolding, feedback, and content on a learning activity GUI of at least one selected learning activity based on the learner's interaction with one or more GUI elements on the learning activity GUI, wherein the dynamic variance of the scaffolding comprises modifying one or more GUI elements within the learning activity of the learning activity GUI until the learner achieves mastery.

22. The system of claim 21, wherein the dynamically variable scaffolding comprises a mode where no scaffolding is provided, a mode where some scaffolding is provided, and a mode where maximum scaffolding is provided.

23. The system of claim 21, wherein scaffolding further comprises modifying an underlying parameter of the at least one selected learning activity.

24. The system of claim 21, wherein the modifying of one or more GUI elements comprises adding, removing, relocating, changing, or manipulating the one or more GUI elements.

25. The system of claim 21, wherein the dynamic variance of the scaffolding comprises modifying one or more audio elements within the learning activity.

26. A computer-implemented method for personalized mastery e-learning comprising:
   a) providing, in a computer storage, a knowledge map describing a subject or topic at a level of learning, the knowledge map comprising a plurality of nodes, each node representing at least one learning objective, wherein the nodes are arranged in the knowledge map hierarchically and so as to represent prerequisite relationships between learning objectives;
   b) providing, in the computer storage, a plurality of learning activities, each learning activity comprising one or more graphical user interface (GUI) elements and dynamically variable scaffolding, feedback, and content;

c) maintaining, in the computer storage, a database associating one or more of the nodes with one or more of the learning activities;
d) generating, by an analytics engine generating learner data based on a learner's previous performance from past learning activities;
e) identifying, by the computer, at least one current node on the map for the learner based on a past performance of the learner and using the identified at least one current node, generated learner data, and the data storage to select one or more learning activities for the learner; and
f) dynamically varying, by the computer, the scaffolding, feedback, and content on a learning activity GUI of at least one selected learning activity based on the learner's interaction with one or more GUI elements on the learning activity GUI, wherein the dynamic variance of the scaffolding comprises modifying the GUI elements on the learning activity GUI until the learner achieves mastery.

27. The method of claim 26, wherein the dynamically variable scaffolding comprises a mode where no scaffolding is provided, a mode where some scaffolding is provided, and a mode where maximum scaffolding is provided.

28. The method of claim 26, wherein the modifying of one or more GUI elements comprises adding, removing, relocating, changing, or manipulating the one or more GUI elements.

29. A personalized mastery e-learning platform comprising:
  a) a server-side learning activity selection application comprising:
    i) a knowledge map describing a subject or topic at a level of learning, the knowledge map comprising a plurality of nodes, each node representing at least one learning objective, wherein the nodes are arranged in the knowledge map hierarchically and so as to represent prerequisite relationships between learning objectives;
    ii) a plurality of learning activities, each learning activity comprising one or more graphical user interface (GUI) elements and dynamically variable scaffolding, feedback, and content;
    iii) a data storage associating one or more of the nodes with one or more of the learning activities;
    iv) an analytics engine generating learner data based on a learner's previous performance from past learning activities; and
    v) instructions, which when executed by one or more processors, causes the one or more processors to perform: identifying at least one current node on the map for the learner based on the generated learner data and using the at least one current node, generated learner data, and the data storage to select one or more learning activities for the learner;
  b) a client-side learning activity modification application comprising instructions, which when executed by one or more processors, causes the one or more processors to perform: dynamically varying the scaffolding, feedback, and content on a learning activity GUI of at least one selected learning activity based on the learner's interaction with one or more GUI elements on the learning activity GUI, wherein the dynamic variance of the scaffolding comprises modifying one or more GUI elements within the learning activity of the learning activity GUI until the learner achieves mastery.

* * * * *

UNITED STATES PATENT AND TRADEMARK OFFICE
CERTIFICATE OF CORRECTION

PATENT NO. : 11,380,211 B2
APPLICATION NO. : 16/575319
DATED : July 5, 2022
INVENTOR(S) : Doug C. Dohring et al.

It is certified that error appears in the above-identified patent and that said Letters Patent is hereby corrected as shown below:

In the Claims

- Column 36, Line 40, Claim 22, please replace "The system of" with -- The media of --.

- Column 36, Line 44, Claim 23, please replace "The system of" with -- The media of --.

- Column 36, Line 47, Claim 24, please replace "The system of" with -- The media of --.

- Column 36, Line 51, Claim 25, please replace "The system of" with -- The media of --.

Signed and Sealed this
Twenty-fifth Day of October, 2022

Katherine Kelly Vidal
*Director of the United States Patent and Trademark Office*